COMPUTER
Filed Jan. 12, 1960 31 Sheets-Sheet 1
FIG. 1 FLIP-FLOP
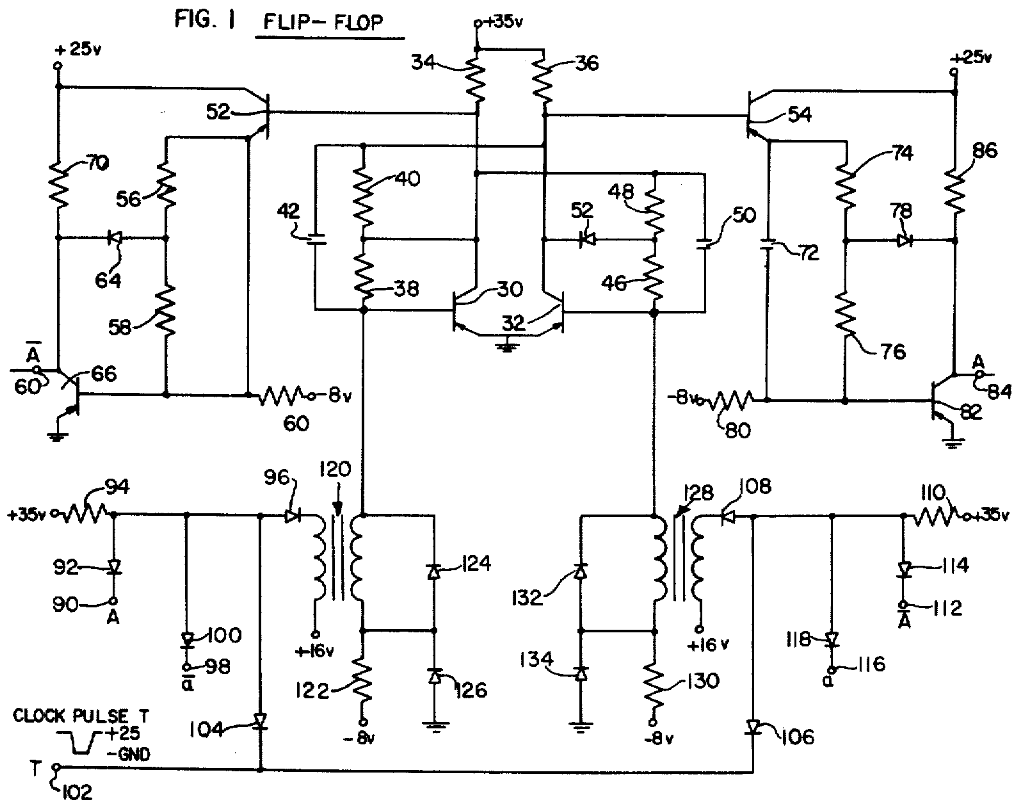
FIG. 2 AND-OR LOGICAL NETWORK
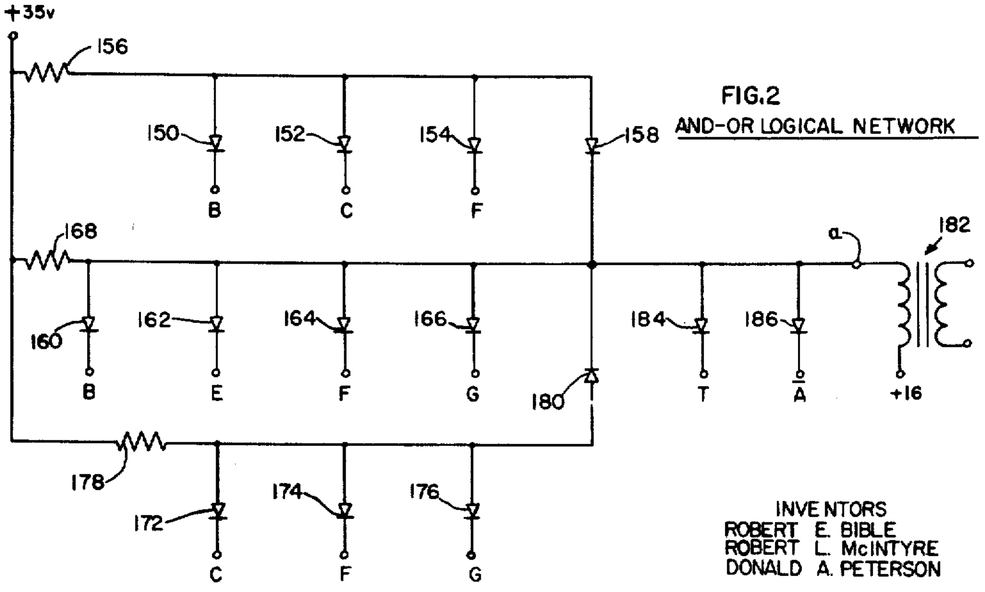
INVENTORS
ROBERT E. BIBLE
ROBERT L. McINTYRE
DONALD A. PETERSON
BY
ATTORNEY

READ AMPLIFIER

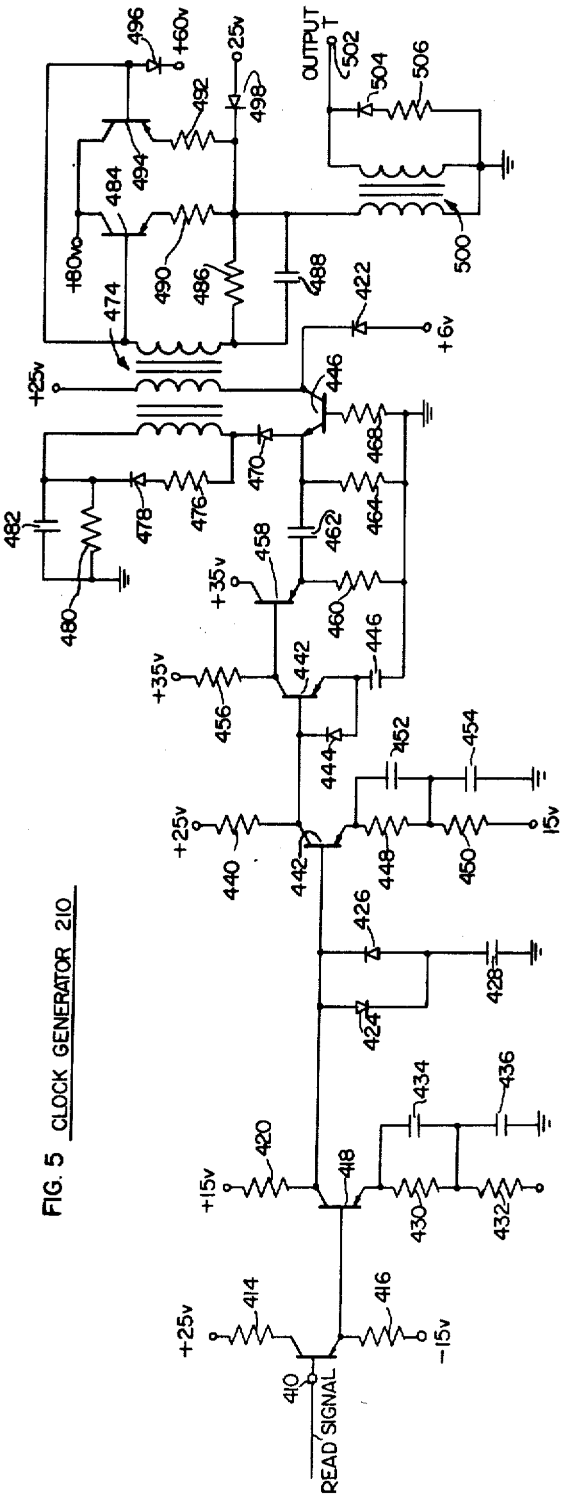
FIG. 5 CLOCK GENERATOR 210
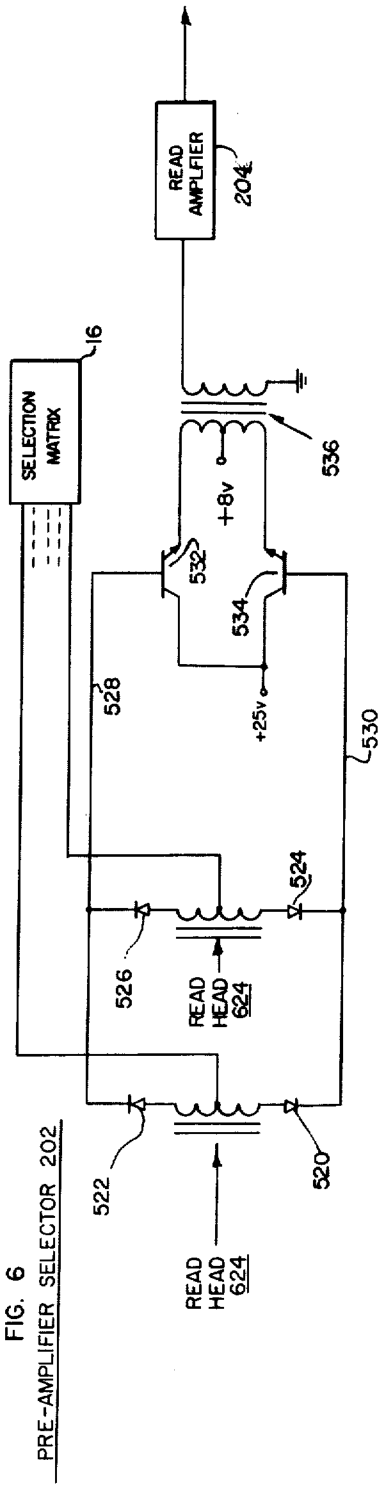
FIG. 6 PRE-AMPLIFIER SELECTOR 202

BIT COUNTER 628

BIT COUNTER TIMING CHART

| T5 | T4 | T3 | T2 | T1 | |
|---|---|---|---|---|---|
| 0 | 1 | 0 | 1 | 0 | P24 |
| 0 | 1 | 0 | 1 | 1 | P23 |
| 0 | 1 | 1 | 0 | 0 | P22 |
| 0 | 1 | 1 | 0 | 1 | P21 |
| 0 | 1 | 1 | 1 | 0 | P20 |
| 0 | 1 | 1 | 1 | 1 | P19 |
| 1 | 1 | 0 | 1 | 1 | P18 |
| 1 | 1 | 1 | 0 | 0 | P17 |
| 1 | 1 | 1 | 0 | 1 | P16 |
| 1 | 1 | 1 | 1 | 0 | P15 |
| 1 | 1 | 1 | 1 | 1 | P14 |
| 1 | 0 | 0 | 1 | 1 | P13 |
| 1 | 0 | 1 | 0 | 0 | P12 |
| 1 | 0 | 1 | 0 | 1 | P11 |
| 1 | 0 | 1 | 1 | 0 | P10 |
| 1 | 0 | 1 | 1 | 1 | P9 |
| 0 | 0 | 0 | 1 | 0 | P8 |
| 0 | 0 | 0 | 1 | 1 | P7 |
| 0 | 0 | 1 | 0 | 0 | P6 |
| 0 | 0 | 1 | 0 | 1 | P5 |
| 0 | 0 | 1 | 1 | 0 | P4 |
| 0 | 0 | 1 | 1 | 1 | P3 |
| 1 | 1 | 0 | 0 | 0 | P2 |
| 1 | 1 | 0 | 0 | 1 | P1 |
| 1 | 1 | 0 | 1 | 0 | P0 |

WORD COUNTER 670

Jan. 22, 1963 R. E. BIBLE ET AL 3,074,638

COMPUTER

Filed Jan. 12, 1960 31 Sheets-Sheet 9

COINCIDENCE DETECTOR FLIP-FLOP -Kc-

CONTROL FLIP-FLOPS 22 K1, K2 AND K3

ORDER REGISTER 14
FLIP-FLOPS O1, O2 AND O3.

Jan. 22, 1963 R. E. BIBLE ET AL 3,074,638
COMPUTER
Filed Jan. 12, 1960 31 Sheets-Sheet 12

FIG. 17 TRACK SELECTOR REGISTER 700
FLIP-FLOPS S1, S2, S3, S4 AND S5

FIG. 19 MULTIPLICAND AND DIVISOR REGISTER "D"
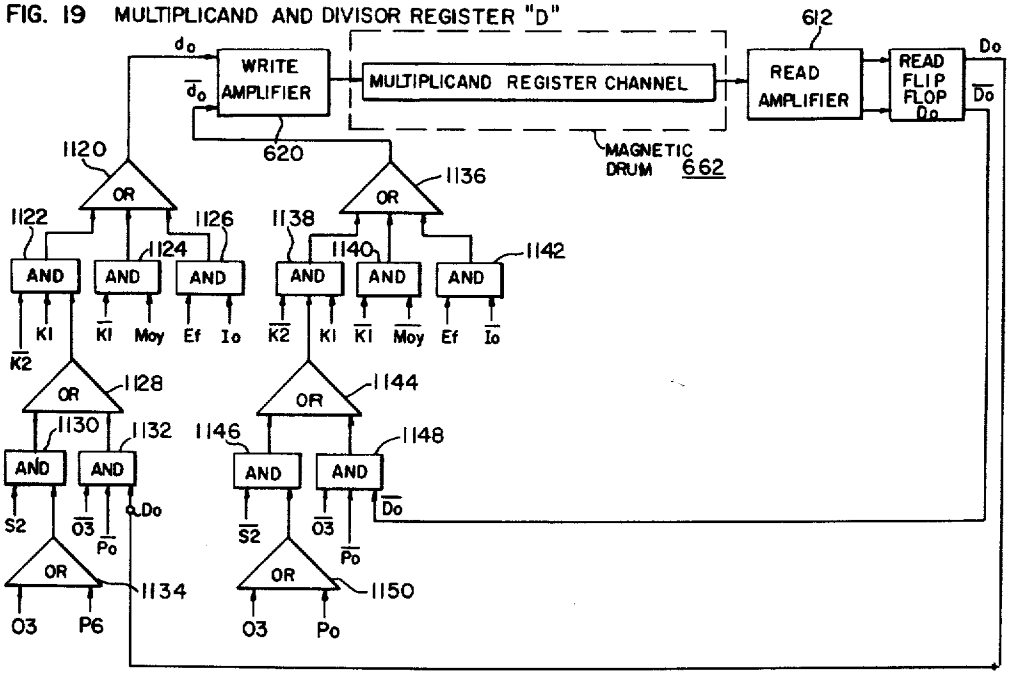
FIG. 20 MULTIPLIER REGISTER -R-
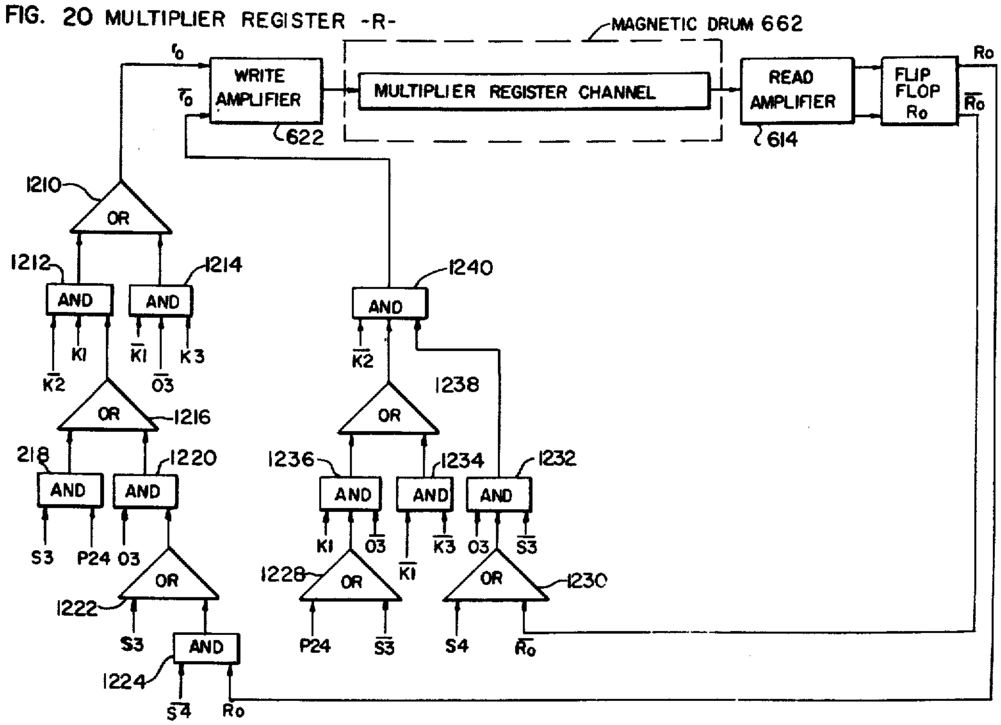

INSTRUCTION REGISTER -Io-

OUTPUT COMPARATOR
FLIP FLOP Cc

FIG. 23 OUTPUT CARRY FLIP-FLOP Cn
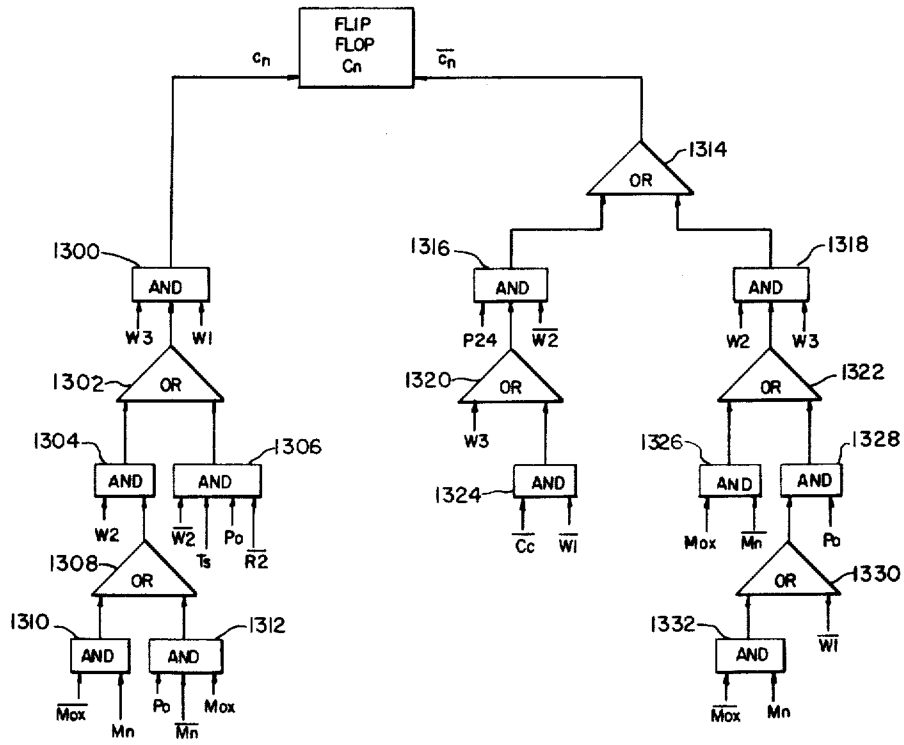
FIG. 24
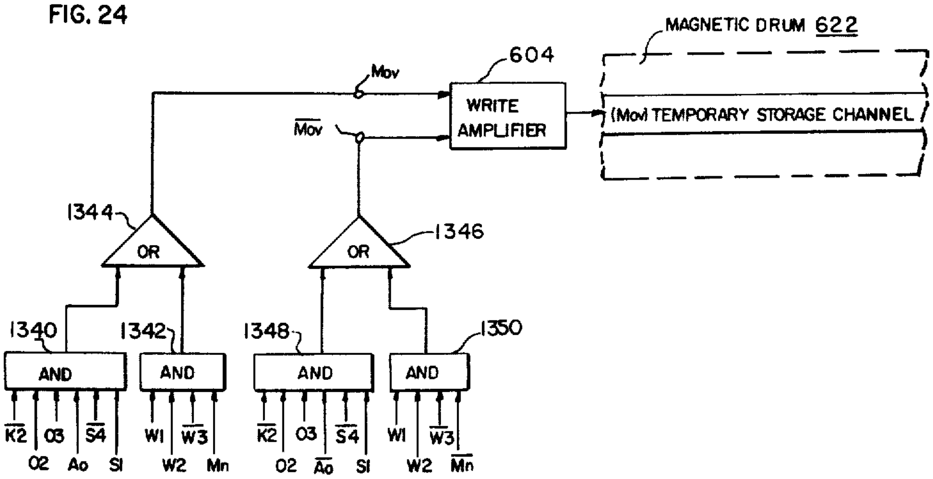

FIG. 25
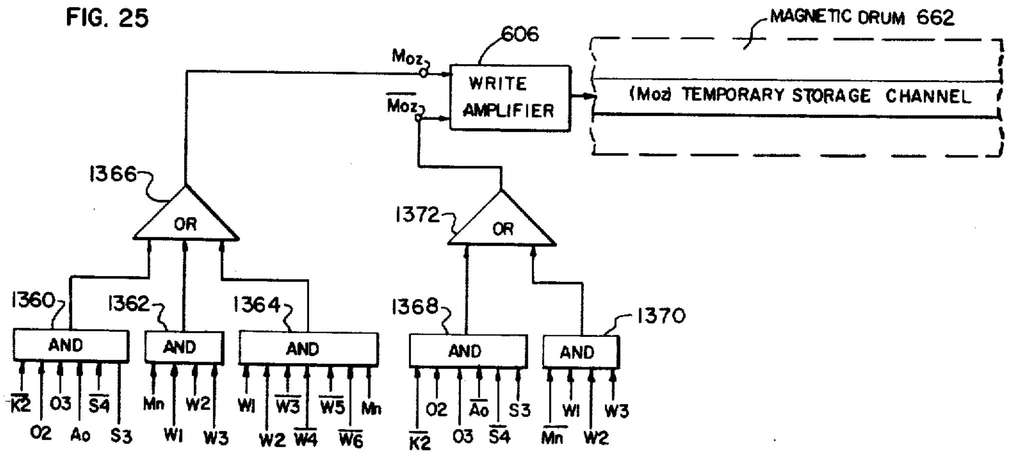
FIG. 26
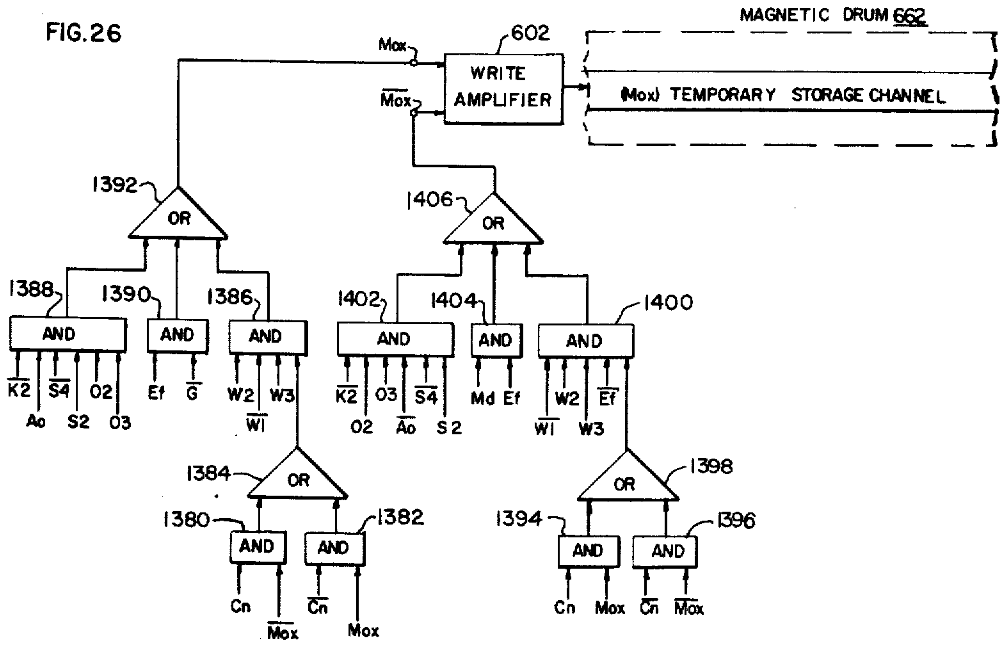
FIG. 27 TIME STANDARD FLIP-FLOP Ts
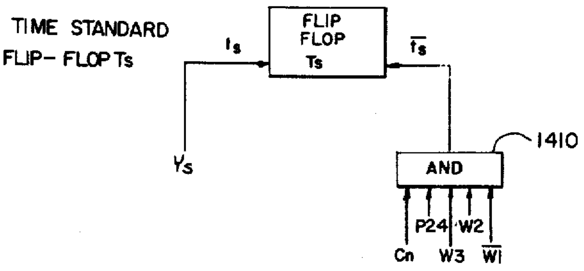

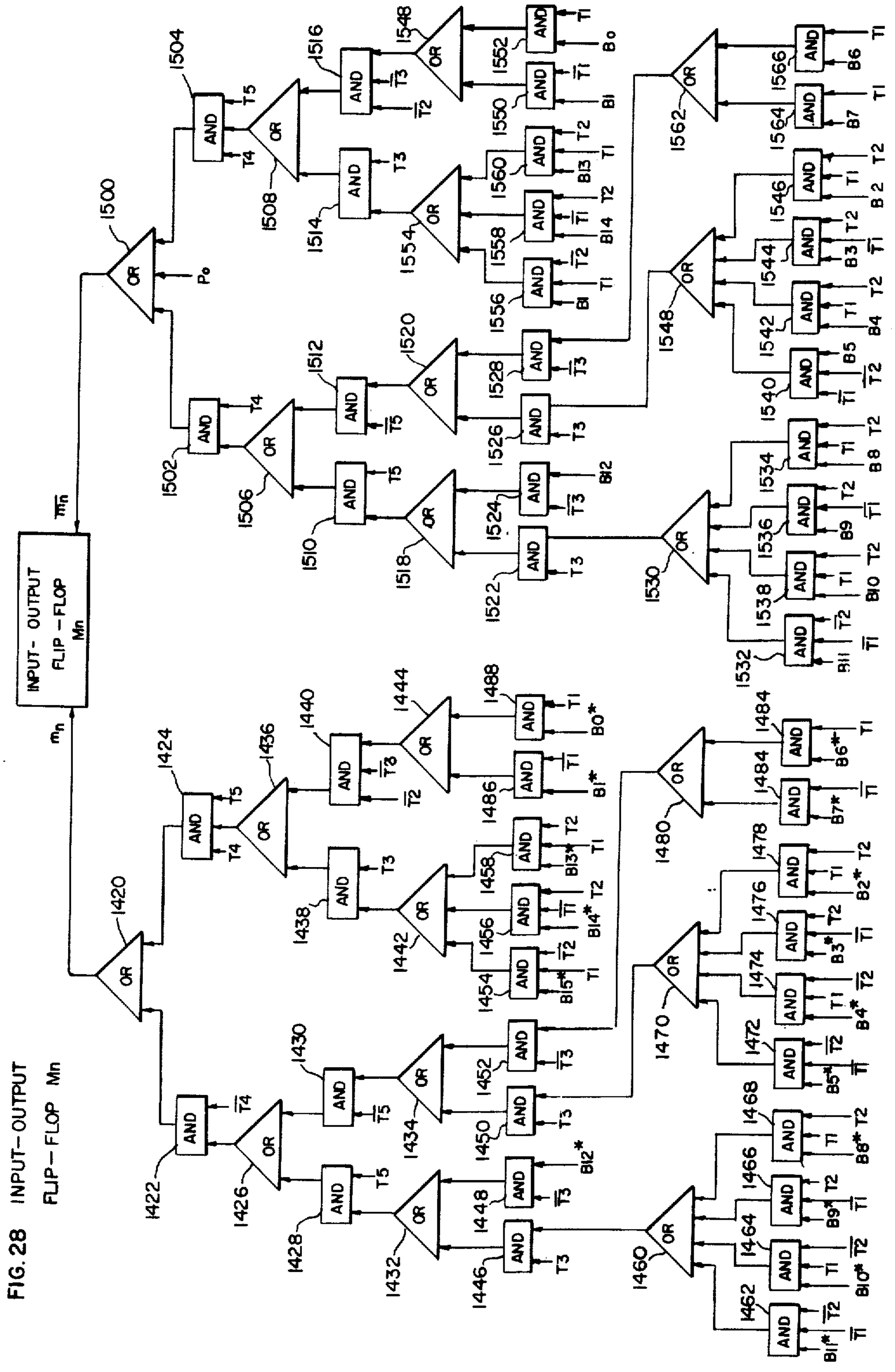
FIG. 28 INPUT-OUTPUT FLIP-FLOP Mn

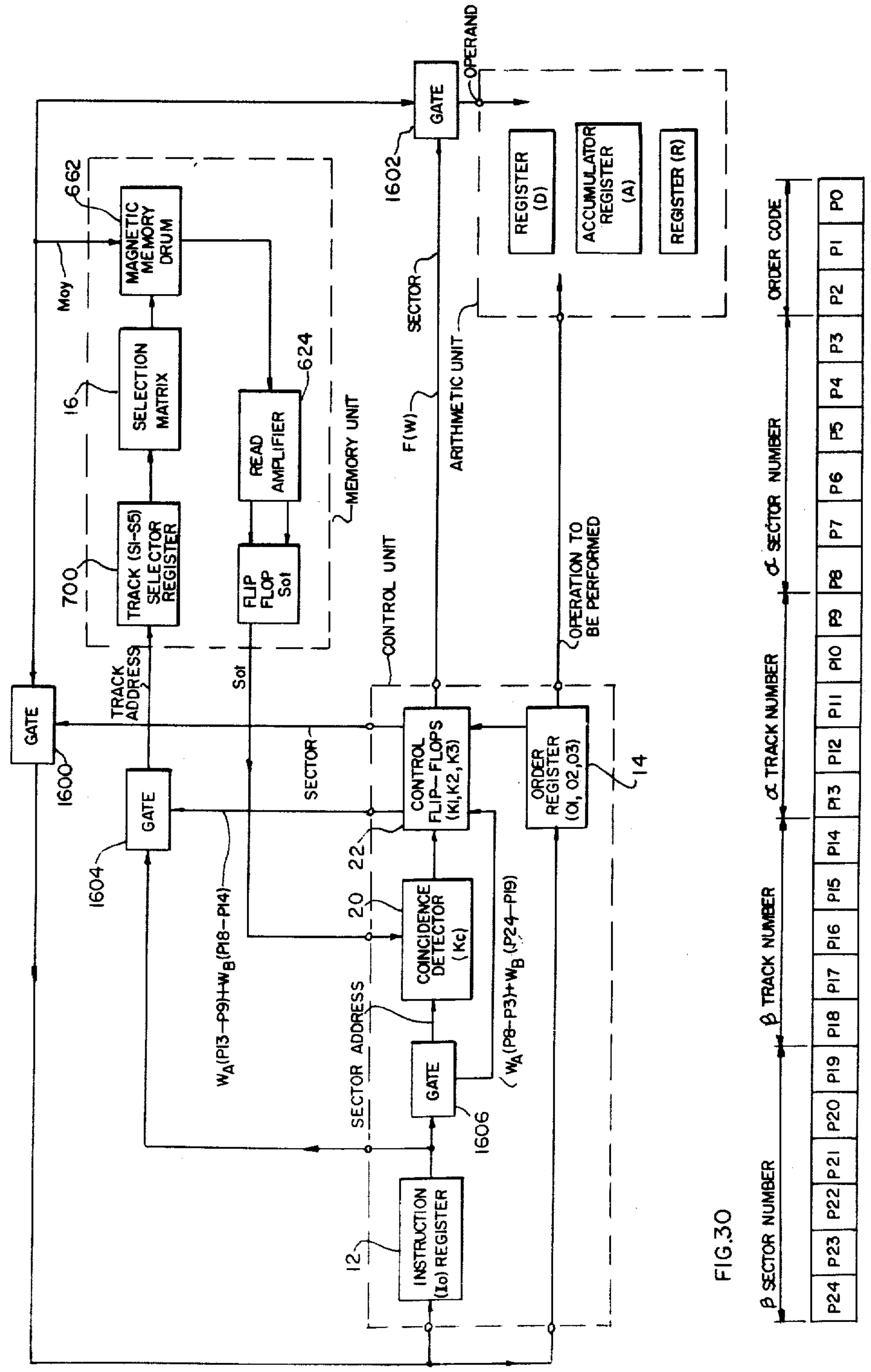
FIG. 29 BLOCK SCHEMATIC — CONTROL AND MEMORY ACCESS, FIG. 30

FIG. 31

| DIGITAL CODE | | | β TRACK PORTION OF INSTRUCTION | | | | ABBREVIATION | DESCRIPTION |
|---|---|---|---|---|---|---|---|---|
| P2 | P1 | P0 | P17 | P16 | P15 | P14 | | |
| 01 | 02 | 03 | S4 | S3 | S2 | S1 | | |
| 0 | 0 | 0 | — | — | — | — | At | CLEAR ACCUMULATOR REGISTER (A) AND TRANSFER CONTENTS OF DESIGNATED MEMORY (Moy) LOCATION TO (A) REGISTER. (ADD TO ZERO) |
| 0 | 0 | 1 | — | — | — | — | Ex | EXTRACT DESIGNATED MEMORY LOCATION (Moy) AND COMPARE WITH CONTENT OF (A) REGISTER ON AN "AND" NETWORK BASIS. |
| 0 | 1 | 0 | — | — | — | — | Mu | MULTIPLY CONTENTS OF DESIGNATED MEMORY LOCATION WITH CONTENTS OF (R) REGISTER AND LEAVE PRODUCT IN (A) REGISTER |
| 0 | 1 | 1 | — | — | — | — | Tc | SELECT NEXT INSTRUCTION FROM MEMORY LOCATION INDICATED BY PORTION (β) OF INSTRUCTION IF CONTENT OF (A) REGISTER ARE GREATER THAN, OR EQUAL TO, ZERO; BUT FROM MEMORY LOCATION INDICATED BY PORTION (δ) IF LESS THAN ZERO (—) |
| 1 | 0 | 0 | — | — | — | — | Ad | ADD CONTENTS OF DESIGNATED MEMORY LOCATION (Moy) TO CONTENTS OF (A) REGISTER AND LEAVE SUM IN (A) REGISTER |
| 1 | 0 | 1 | — | — | — | — | Dv | DIVIDE CONTENTS OF (A) REGISTER BY CONTENTS OF DESIGNATED MEMORY LOCATION (Moy) AND LEAVE RESULT IN (A) REGISTER |
| 1 | 1 | 0 | — | — | — | — | Su | SUBTRACT CONTENTS OF (A) REGISTER FROM DESIGNATED MEMORY LOCATION (Moy) AND LEAVE DIFFERENCE IN (A) REGISTER |
| 1 | 1 | 1 | 0 | — | — | — | Sr | NORMAL STORE CONTENTS OF (A) REGISTER IN DESIGNATED MEMORY LOCATION |
| 1 | 1 | 1 | 1 | 1 | 1 | 1 | | (MODIFIED STORE ORDER)-SHIFT LEFT IN (A) REGISTER THE NUMBER OF BITS SPECIFIED BY THE ALPHA SECTOR NUMBER OF THE INSTRUCTION AND STOP. |
| 1 | 1 | 1 | 1 | 0 | 0 | 0 | | (MODIFIED STORE ORDER) STOP |
| 1 | 1 | 1 | 1 | 0 | 0 | 1 | | (MODIFIED STORE ORDER) RESET MANUAL INPUT RELAY |
| 1 | 1 | 1 | 1 | 0 | 1 | 0 | | (MODIFIED STORE ORDER) SET FIX RELAY |
| 1 | 1 | 1 | 1 | 0 | 1 | 1 | | (MODIFIED STORE ORDER) RESET FIX RELAY |

Jan. 22, 1963 R. E. BIBLE ET AL 3,074,638
COMPUTER
Filed Jan. 12, 1960 31 Sheets-Sheet 21
FIG. 32
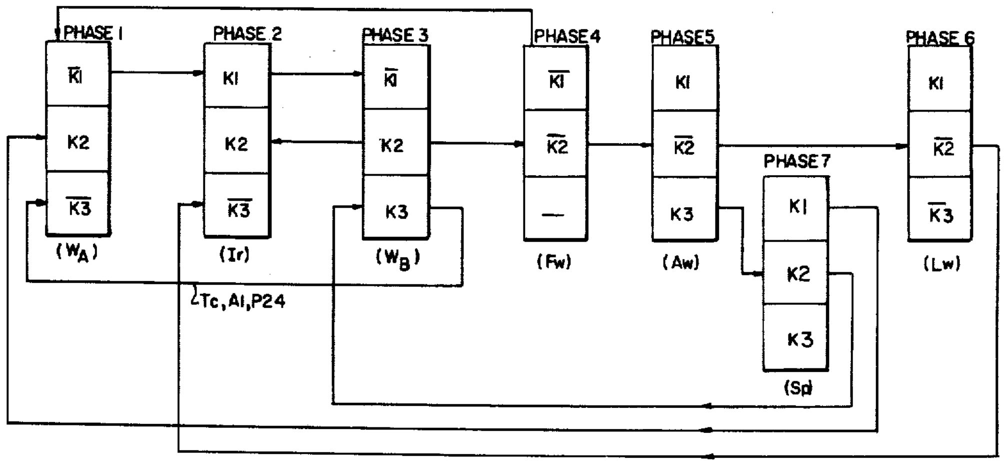
FIG. 33 (At) CLEAR AND TRANSFER INSTRUCTION $\overline{O1}.\overline{O2}.\overline{O3}$.
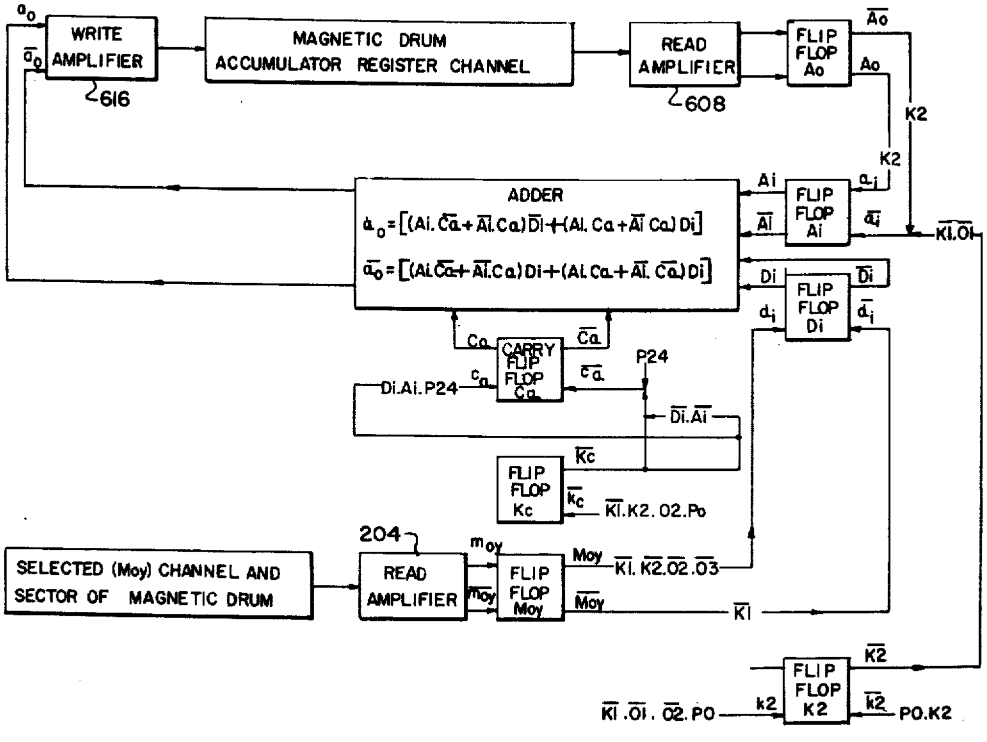

FIG.36 MU-MULTIPLICATION $\overline{O1}.O2\overline{O3}$

"ADDITIONAL WORDS" (Aw) PHASE K1.$\overline{K2}$.K3

FIG. 39 Tc—SELECT—$\overline{O1}$.O2.O3
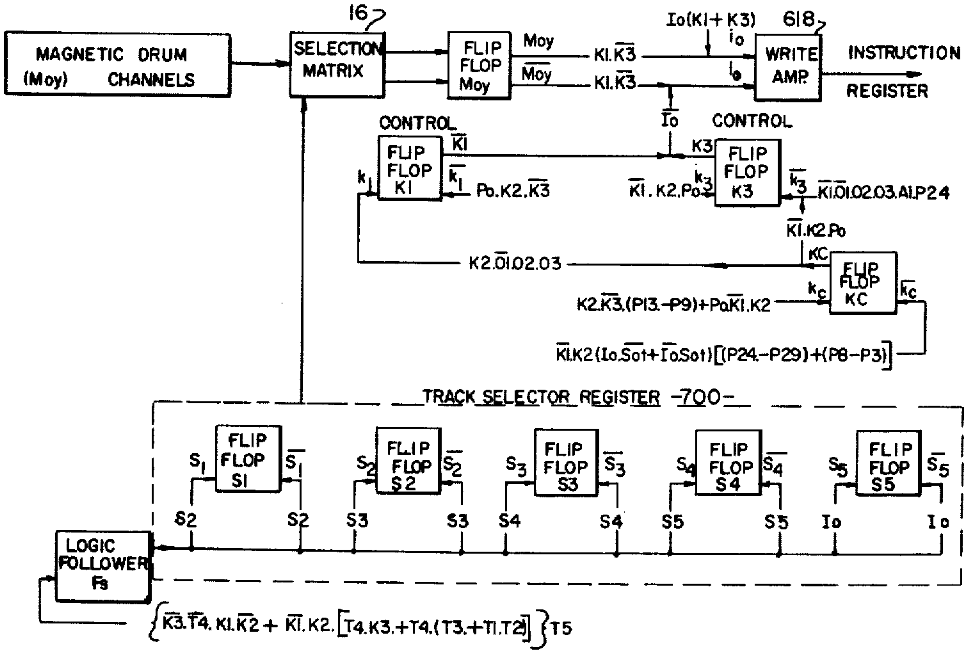
FIG. 40 (Ad) ADD CONTENTS OF DESIGNATED MEMORY LOCATION (Moy) TO CONTENTS OF ACCUMULATER REGISTER (A) AND LEAVE SUM IN REGISTER (A) — O1.$\overline{O2}$.$\overline{O3}$
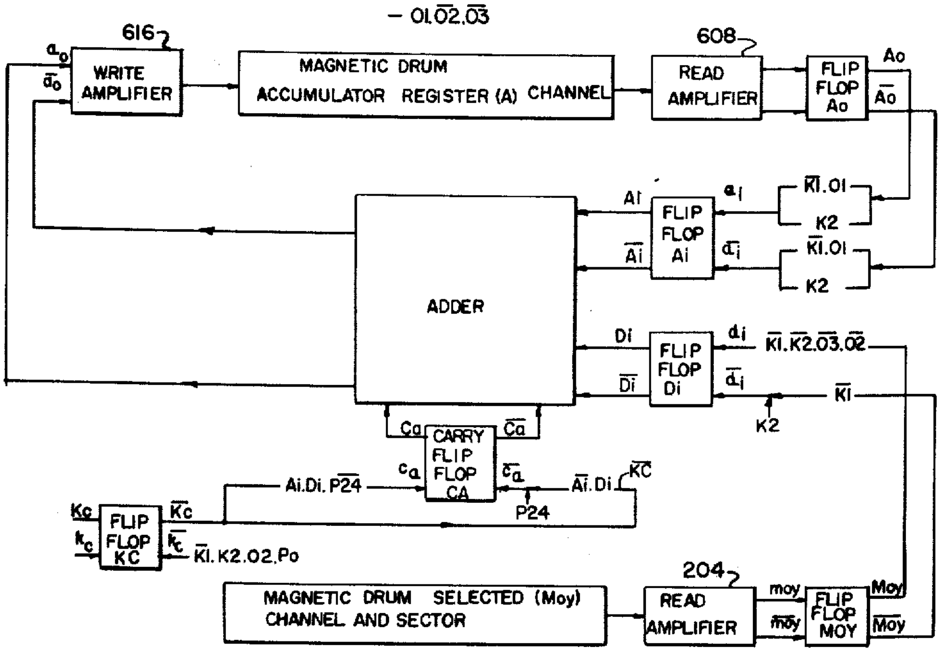

FIG. 41 (SU)-SUBTRACT-CONTENTS OF (A) REGISTER FROM DESIGNATED MEMORY LOCATION (Moy) AND LEAVE DIFFERENCE IN (A) REGISTER (01.02.$\overline{03}$)
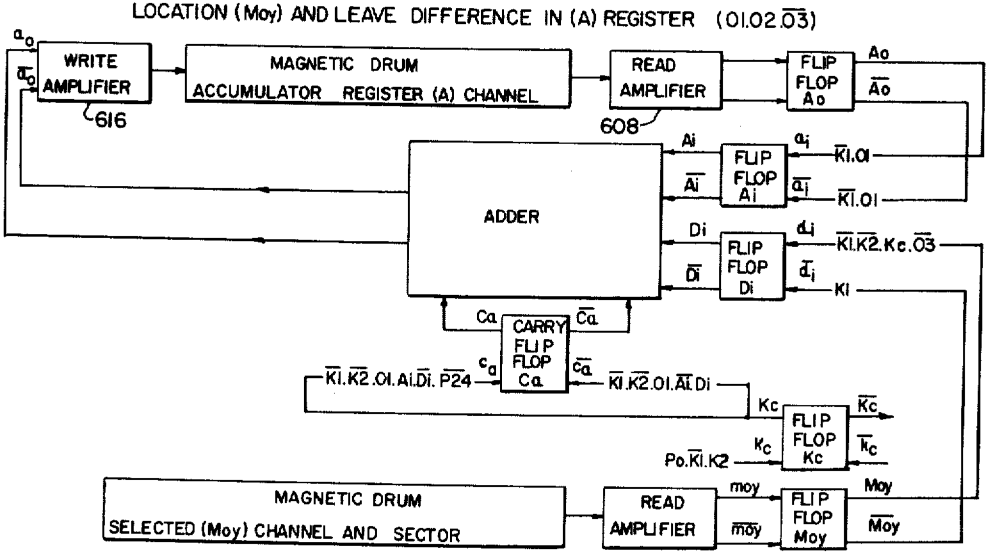
FIG. 42 (Dv) DIVIDE CONTENTS OF REGISTER (A) (DIVIDEND) BY CONTENTS OF DESIGNATED (Moy) MEMORY ADDRESS (DIVISOR) AND PUT RESULTS (QUOTIENT) IN (A) REGISTER (01.$\overline{02}$.03)
FIRST WORD PHASE (Fw) ($\overline{K1}$.$\overline{K2}$)
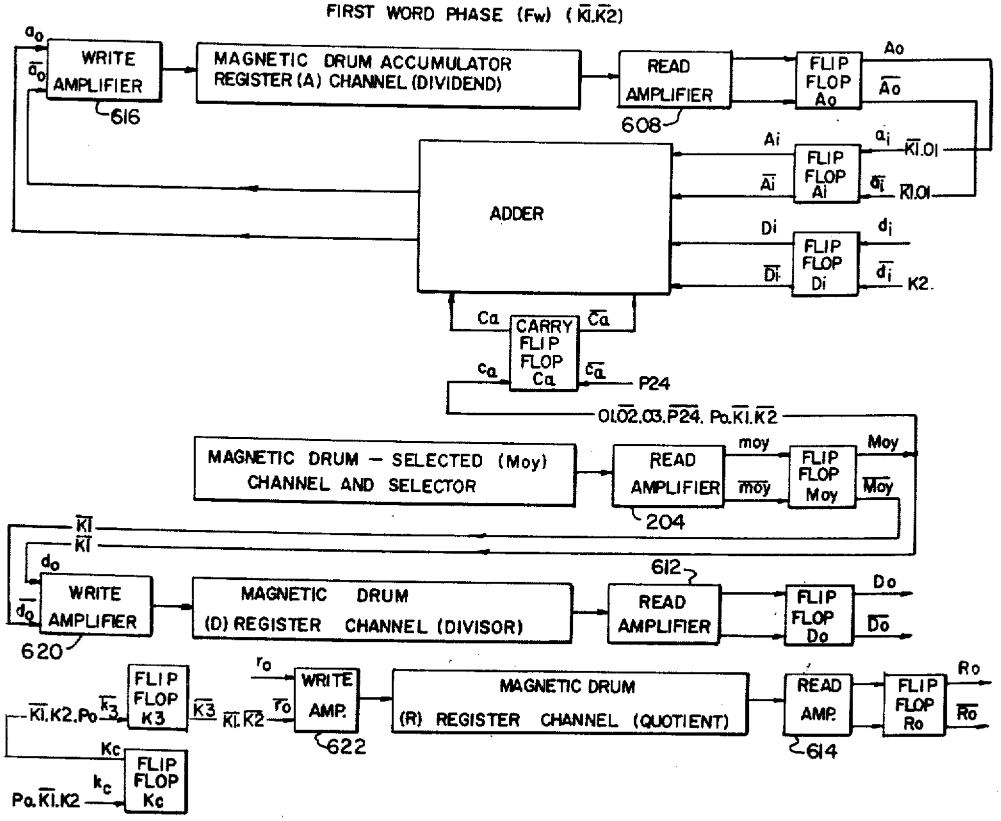

Jan. 22, 1963 R. E. BIBLE ET AL 3,074,638

COMPUTER

Filed Jan. 12, 1960 31 Sheets-Sheet 27

(Dv) DIVIDE INSTRUCTIONS (01.0̄2 03)
LAST WORD PHASE (Lw) (K1.K̄2.K̄3)

(St) STORE INSTRUCTION (NORMAL) (01.02.03)(S4)
FIRST WORD PHASE (Fw) (K1.K2)

FIG. 46 Sr (LEFT SHIFT) MODIFIED STORE ORDER (01.0203.S4.S3.S2S1)
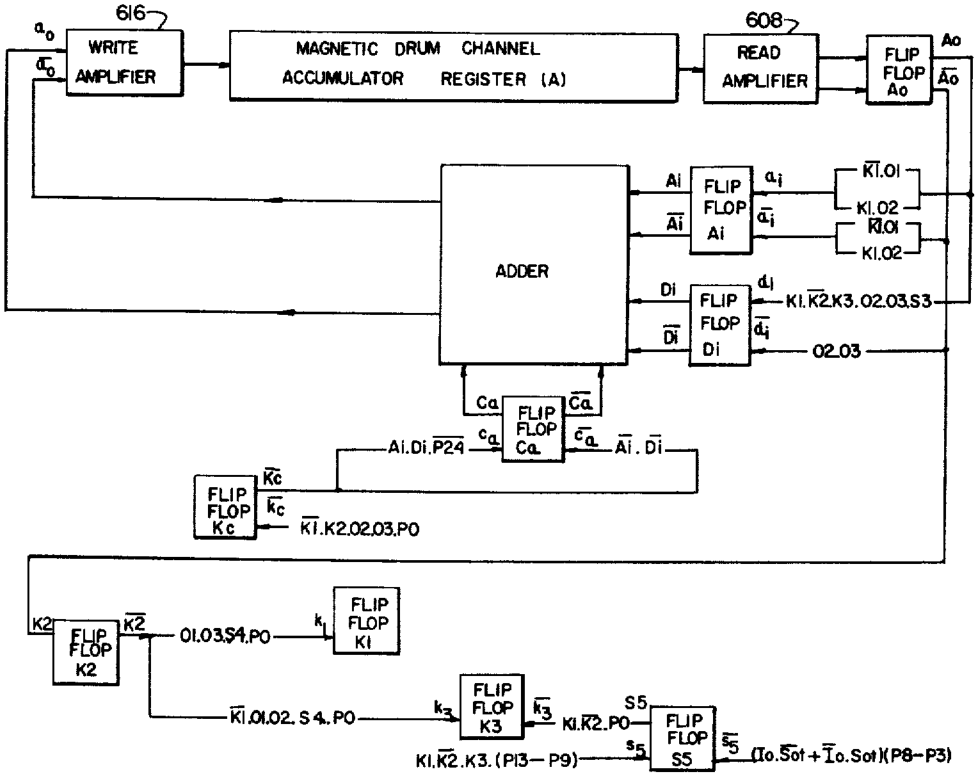
FIG. 47 TIME STANDARD
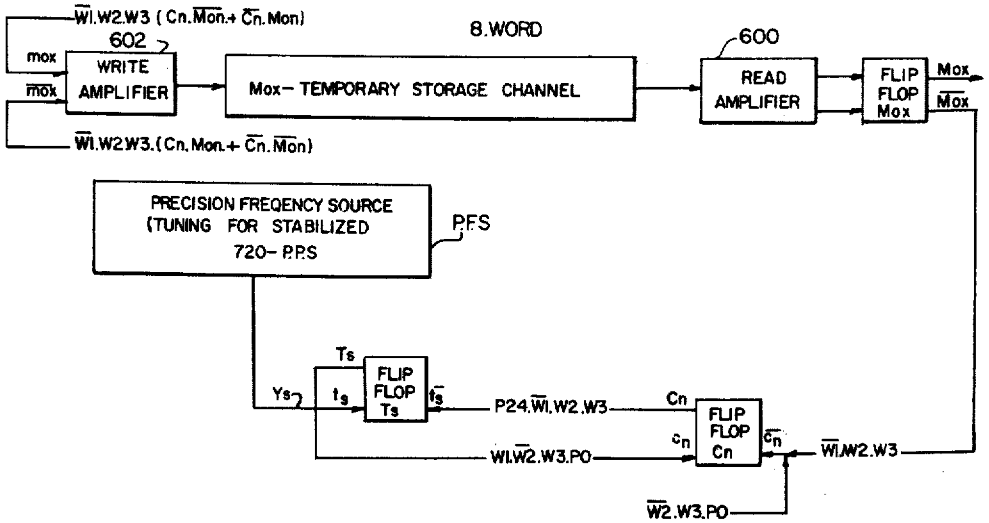

FIG. 48

| | | W1 | W2 | W3 | W4 | W5 | W6 |
|---|---|---|---|---|---|---|---|
| | 0 | 0 | 0 | 0 | 0 | 0 | 0 |
| | 1 | 1 | 0 | 0 | 0 | 0 | 0 |
| | 2 | 0 | 1 | 0 | 0 | 0 | 0 |
| | 3 | 1 | 1 | 0 | 0 | 0 | 0 |
| $\overline{W2}.W3$ | 4 | 0 | 0 | 1 | 0 | 0 | 0 |
| $W1.\overline{W2}.W3$ | 5 | 1 | 0 | 1 | 0 | 0 | 0 |
| $\overline{W1}.W2.W3$ | 6 | 0 | 1 | 1 | 0 | 0 | 0 |
| $W1.W2.W3$ | 7 | 1 | 1 | 1 | 0 | 0 | 0 |
| $\overline{W1}.\overline{W2}\overline{W3}$ | 8 | 0 | 0 | 0 | 1 | 0 | 0 |
| | 9 | 1 | 0 | 0 | 1 | 0 | 0 |
| | 10 | 0 | 1 | 0 | 1 | 0 | 0 |
| | 11 | 1 | 1 | 0 | 1 | 0 | 0 |
| $\overline{W2}W3$ | 12 | 0 | 0 | 1 | 1 | 0 | 0 |
| $W1.\overline{W2}.W3$ | 13 | 1 | 0 | 1 | 1 | 0 | 0 |
| $\overline{W1}.W2.W3$ | 14 | 0 | 1 | 1 | 1 | 0 | 0 |
| $W1.W2.W3.$ | 15 | 1 | 1 | 1 | 1 | 0 | 0 |
| $\overline{W1}.\overline{W2}.\overline{W3}$ | 16 | 0 | 0 | 0 | 0 | 1 | 0 |
| | 17 | 1 | 0 | 0 | 0 | 1 | 0 |
| | 18 | 0 | 1 | 0 | 0 | 1 | 0 |
| | 19 | 1 | 1 | 0 | 0 | 1 | 0 |
| $\overline{W2}W3$ | 20 | 0 | 0 | 1 | 0 | 1 | 0 |
| $W1.\overline{W2}W3$ | 21 | 1 | 0 | 1 | 0 | 1 | 0 |
| $W1.W2.W3$ | 22 | 0 | 1 | 1 | 0 | 1 | 0 |
| $W1.W2.W3$ | 23 | 1 | 1 | 1 | 0 | 1 | 0 |
| $\overline{W1}.\overline{W2}\overline{W3}$ | 24 | 0 | 0 | 0 | 1 | 1 | 0 |
| | 25 | 1 | 0 | 0 | 1 | 1 | 0 |
| | 26 | 0 | 1 | 0 | 1 | 1 | 0 |
| | 27 | 1 | 1 | 0 | 1 | 1 | 0 |
| $\overline{W2}.W3$ | 28 | 0 | 0 | 1 | 1 | 1 | 0 |
| $W1.\overline{W2}.W3$ | 29 | 1 | 0 | 1 | 1 | 1 | 0 |
| $\overline{W1}.W2.W3$ | 30 | 0 | 1 | 1 | 1 | 1 | 0 |
| $W1.W2.W3$ | 31 | 1 | 1 | 1 | 1 | 1 | 0 |
| $\overline{W1}.\overline{W2}\overline{W3}$ | 32 | 0 | 0 | 0 | 0 | 0 | 1 |
| | 33 | 1 | 0 | 0 | 0 | 0 | 1 |
| | 34 | 0 | 1 | 0 | 0 | 0 | 1 |
| | 35 | 1 | 1 | 0 | 0 | 0 | 1 |
| $\overline{W2}W3$ | 36 | 0 | 0 | 1 | 0 | 0 | 1 |
| $W1.\overline{W2}W3$ | 37 | 1 | 0 | 1 | 0 | 0 | 1 |
| $\overline{W1}.W2.W3$ | 38 | 0 | 1 | 1 | 0 | 0 | 1 |
| $W1.W2.W3$ | 39 | 1 | 1 | 1 | 0 | 0 | 1 |
| $W1.W2.\overline{W3}$ | 40 | 0 | 0 | 0 | 1 | 0 | 1 |
| | 41 | 1 | 0 | 0 | 1 | 0 | 1 |
| | 42 | 0 | 1 | 0 | 1 | 0 | 1 |
| | 43 | 1 | 1 | 0 | 1 | 0 | 1 |
| $\overline{W2}W3$ | 44 | 0 | 0 | 1 | 1 | 0 | 1 |
| $W1.\overline{W2}.W3$ | 45 | 1 | 0 | 1 | 1 | 0 | 1 |
| $\overline{W1}.W2.W3$ | 46 | 0 | 1 | 1 | 1 | 0 | 1 |
| $W1.W2.W3$ | 47 | 1 | 1 | 1 | 1 | 0 | 1 |
| $\overline{W1}.\overline{W2}\overline{W3}$ | 48 | 0 | 0 | 0 | 0 | 1 | 1 |
| | 49 | 1 | 0 | 0 | 0 | 1 | 1 |
| | 50 | 0 | 1 | 0 | 0 | 1 | 1 |
| | 51 | 1 | 1 | 0 | 0 | 1 | 1 |
| $\overline{W1}.W3$ | 52 | 0 | 0 | 1 | 0 | 1 | 1 |
| $W1.\overline{W2}W3$ | 53 | 1 | 0 | 1 | 0 | 1 | 1 |
| $\overline{W1}.W2\ W3$ | 54 | 0 | 1 | 1 | 0 | 1 | 1 |
| $W1.W2.W3$ | 55 | 1 | 1 | 1 | 0 | 1 | 1 |
| $\overline{W1}\ \overline{W2}\ \overline{W3}$ | 56 | 0 | 0 | 0 | 1 | 1 | 1 |
| | 57 | 1 | 0 | 0 | 1 | 1 | 1 |
| | 58 | 0 | 1 | 0 | 1 | 1 | 1 |
| | 59 | 1 | 1 | 0 | 1 | 1 | 1 |
| $\overline{W2}\ W3$ | 60 | 0 | 0 | 1 | 1 | 1 | 1 |
| $W1.\overline{W2}.W3$ | 61 | 1 | 0 | 1 | 1 | 1 | 1 |
| $\overline{W1}.W2.W3$ | 62 | 0 | 1 | 1 | 1 | 1 | 1 |
| $W1.W2.W3$ | 63 | 1 | 1 | 1 | 1 | 1 | 1 |

FIG. 49 OUTPUT OPERATION
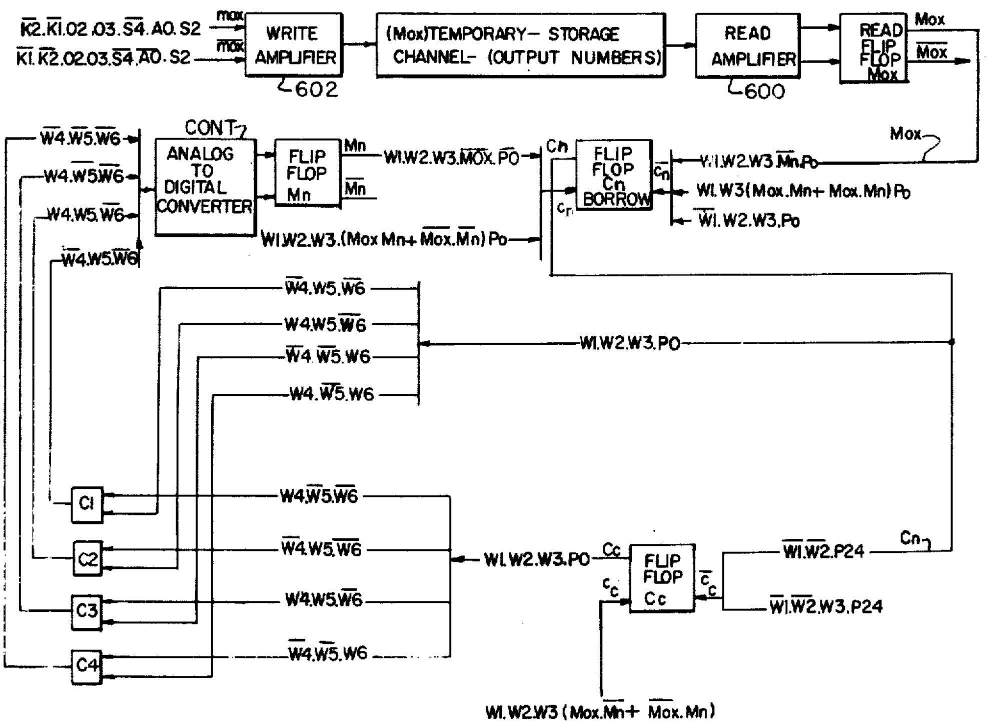
FIG. 50
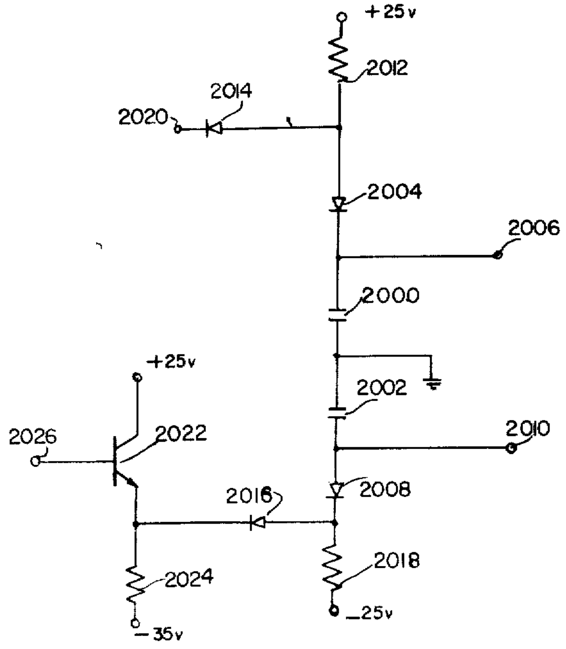

United States Patent Office 3,074,638
Patented Jan. 22, 1963

3,074,638

COMPUTER

Robert E. Bible, Burbank, Robert L. McIntyre, Glendale, and Donald A. Peterson, Santa Clara, Calif., assignors to Librascope, Incorporated, Glendale, Calif., a corporation of California Filed Jan. 12, 1960, Ser. No. 1,969
14 Claims. (Cl. 235—167)

The present invention relates to an improved electronic digital computer which has general purpose utility wherever size, weight and economy are features to be considered.

It is noted above, a major feature of the computer of the invention is that it is light in weight and small in size. In order to achieve these features, the magnetic memory storage of the computer may be constructed in an improved and unique manner, such as described in co-pending application Serial No. 860,282, filed December 17, 1959. In this respect also, and to conserve storage space, the total number of instructions to be handled by the computer under normal circumstances have been reduced to a minimum. However, the computer of the invention is capable of responding to a sufficient number of different instructions so that its general purpose utility is not impaired to any appreciable extent.

The construction of the computer, as will be evident from the following description, is such that the apparatus is physically embodied in a single unit rather than being composed of a plurality of distinct interconnected units. The magnetic memory storage unit, as will be described in detail, is not used for the computer memory alone, but is also used to provide desired delays for re-circulating registers used in the computer and to provide desired timing and control operations. These latter features contribute to the over-all compactness of the computer.

As noted above, the embodiment of the invention which will be described uses a magnetic memory drum. Serial operation is utilized in the control portion of the computer, as well as in the arithmetic operations. The computer functions, for example, at a clock pulse rate between 100 and 200 kilocycles. The computer uses a two-address code. The arithmetic unit of the computer operates in a sequential manner to perform all the arithmetic operations necessary to solve the problems introduced to the machine. The arithmetic unit, inter alia, is capable of performing multiplication, division, addition, subtraction and of making decisions. A constructed embodiment of the invention, for example, is capable of performing 200 multiplications per second, and approximately 2,000 additions or subtractions per second.

The number of flip-flop networks required by the computer of the invention is kept at a minimum by making full use of all the flip-flops in the machine. Time sharing of certain ones of the flip-flops for totally unrelated purposes is carried out to a large extent. This enables flip-flops which otherwise would be idle at certain times to be used for other purposes at those times. This, in turn, creates a saving in the total number of flip-flops required by the computer.

The technique outlined in the preceding paragraph is utilized to obtain additional possible operations for the computer under a general designation of "modified store orders," and this is achieved without the requirement for additional flip-flops in the order register of the apparatus. The embodiment of the invention to be described, for example, uses an order register of three flip-flops to control the execution of all the normal instructions. However, additional "modified store order" instructions may also be executed by the computer by the time-shared use of other flip-flops whose configuration is controlled, in addition to a particular control configuration of the three flip-flops in the order register, to provide for the execution of these additional instructions. This latter feature extends the general purpose utility of the computer without the need for a corresponding increase in the number of components required by the computer with a resulting increase in computer size and weight.

An improved and simplified addition and subtraction technique is used in the computer to be described. This technique simplifies the control sequence required to complement negative numbers, as will be described in detail. As will also be described, an improved multiplication logarithm is used which leads to a simple control sequence. Moreover, a simplified division process is used. To this end, time-shared control flip-flops are added to the loop of the accumulator register of the computer for multiplication and division, as will be described.

In addition to the features of the invention, as outlined above, the computer contains several counters which are synchronized with the magnetic memory drum in an improved and simplified manner. This synchronization enables the counters to provide bit time, and word time counts in synchronism with the data on the magnetic drum.

Other features and advantages of the invention will become evident from a consideration of the following detailed description in conjunction with the attached drawings.

In the embodiment of the invention to be described, each computer word is assumed to be composed of 25 binary bits or digits. This is made the equivalent of one sector of the magnetic memory drum. The drum, for example, has 64 sectors in each track or channel, and it is rotated at 100 revolutions per second to provide a 160 kilocycle pulse rate.

In the drawings:

FIGURE 1 is a circuit diagram of one of a plurality of flip-flop networks which are used in the logic circuitry of the embodiment of the invention to be described;

FIGURE 2 is a circuit diagram of typical and/or gates which are used in the logic circuitry of the embodiment of the invention to be described;

FIGURE 5 is a clock generator suitable for use in the computer to be described;

FIGURE 6 is a circuit diagram of a selection matrix for connecting a group of read heads selectively to a common read amplifier;

FIGURE 19 is a representation of the multiplicand and divisor register of the computer;

FIGURE 20 is a representation of the multiplier and quotient register;

FIGURE 23 is a representation of an output carry flip-flop and the logic associated with that flip-flop;

FIGURE 24 is a logic representation of the signals which are introduced to one of the write amplifiers of FIGURE 7;

FIGURE 25 is a logic representation of the signals which are introduced to another of the write amplifiers of FIGURE 7;

FIGURE 26 is a logic representation of the signals which are introduced to yet another of the write amplifiers of FIGURE 7;

FIGURE 27 is a representation of a time standard flip-flop and its associated logic;

FIGURE 28 is a representation of an input-output flip-flop and its associated circuitry;

FIGURE 29 is a schematic block diagram of the control and memory units of the computer to be described;

FIGURE 30 is a representation of the composition of a typical instruction which is used in the computer;

FIGURE 31 is a table of a suitable instruction or order code which may be used in the embodiment of the invention to be described;

FIGURE 32 is a diagrammatic representation of the different phases of operation of the computer;

FIGURE 33 is a diagrammatic representation of the components and circuitry required to execute one of the instructions of the computer designated $A_t$;

FIGURE 39 illustrates the logic required to execute the "select" instruction;

FIGURE 40 illustrates the logic required to execute an instruction designated $A_d$ by which the contents of a designated memory location are added to the contents of the accumulator register;

FIGURE 41 is a representation of the logic required to execute the subtract instruction;

FIGURES 42, 43 and 44 illustrate the logic circuitry and components required to execute the divide instruction;

FIGURE 46 represents the logic necessary to perform a first "modified" store order;

FIGURE 47 is a representation of the system used in the computer of the invention for recording total elapsed time;

FIGURE 48 is a table illustrating the different configurations of the flip-flops of the word counter of FIGURE 13;

FIGURE 49 is a diagram illustrating the logic required to perform a typical output operation; and FIG. 50 is a suitable circuit for the capacitor units in FIGURE 49.

Figure 3:
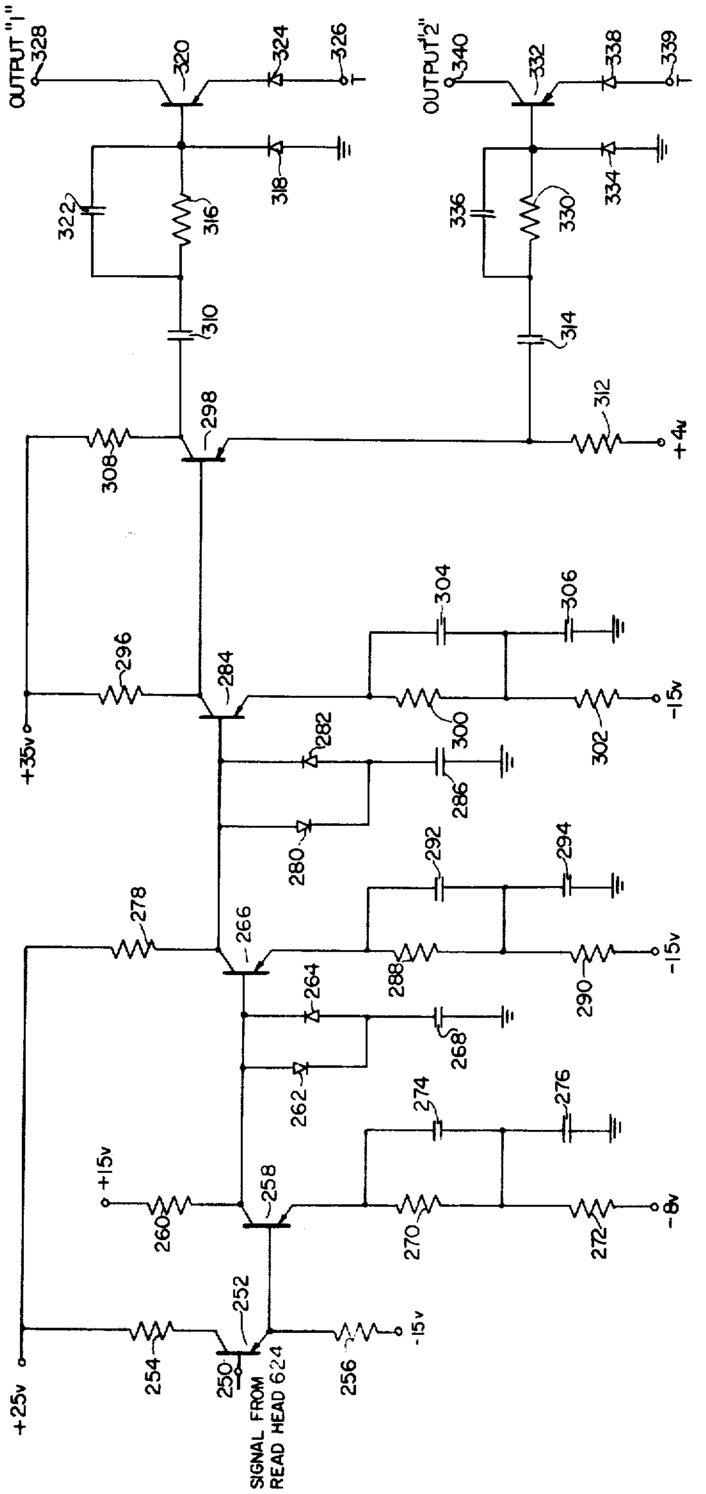
FIGURE 3 is a circuit diagram of a typical read amplifier for use in conjunction with one of the read heads of the magnetic memory unit of the embodiment of the invention to be described.

Flip-flops are bi-stable networks which are widely used at present in electronic digital computers, and in many other types of electronic and electrical apparatus. The flip-flop network may be triggered to a first stable operating condition, generally referred to as a "true" state at which a high voltage is developed at a first of the two output terminals and a low voltage is developed at a second output terminal. The flip-flop network may also be triggered to a second stable operating condition, generally referred to as a "false" state at which the high voltage is developed at the second output terminal and the low voltage is developed at the first output terminal.

The triggering of the flip-flop network from its true state to its false state is accomplished by the introduction of an appropriate input signal to a first of its two input terminals. The flip-flop will then remain in its false state indefinitely, and until it is returned to its true state by the introduction of an input signal to the second of its two input terminals.

An improved flip-flop, which is well suited for use in the computer of the present invention, is disclosed and claimed in copending application Serial No. 831,277, filed August 3, 1959. The circuitry of the flip-flop is shown in FIGURE 1. The illustrated flip-flop network is a high-temperature, static, silicon transistor flip-flop which operates reliably with a high degree of transistor interchangeability from −55° C. to 125° C., and with a clock pulse repetition frequency from 0 to 200 kilocycles.

The flip-flop illustrated in FIGURE 1 is a modified Eccles-Jordan type with output emitter-follower buffer stages, and with power amplifier stages. The transistors utilized in the flip-flop may be silicon junction transistors of the type presently designated as 2N263 for the Eccles-Jordan section of the flip-flop, 2N118 for the emitter follower section, and 2N246 for the power amplifier section. The clock pulses utilized to trigger the transistor may have a 15 volt amplitude, a 1–2 microsecond duration, and a power level of 5 milliwatts. The output from the flip-flop is capable, for example, of driving forty logic gates at 0.5 milliampere per gate.

The operation of the flip-flop illustrated in FIGURE 1 is independent of wide variations of transistor parameters, such that transistors with characteristics beyond the end points of the manufacturer's tolerance limits operate reliably in the network. Also, other types of transistors for which the flip-flop was not specifically designed may be operated successfully in the network. The circuit is designed for interchangeability of transistors and it also is designed to prevent transistor saturation to compensate for transistor gain variations and to compensate for transistor leakage currents.

In the flip-flop circuit of FIGURE 1, as fully described in the copending case (Serial No. 831,277 filed August 3, 1959), a pair of NPN transistors 30 and 32 are connected to form the Eccles-Jordan section of the flip-flop network. The emitters of these transistors are both grounded, and their collectors are connected respectively to a pair of resistors 34 and 36, the resistors being connected to the positive terminal of a 35 volt direct voltage source. The base of the transistor 30 is connected to a resistor 38 which, in turn, connects with a resistor 40, the latter resistor being connected to the collector of the transistor 32. The resistors 38 and 40 are shunted by a capacitor 42, and their common junction is connected to the anode of a diode 44, the cathode of which is connected to the collector of the transistor 30.

In like manner, the base of the transistor 32 is connected to a resistor 46. The resistor 46 is connected to a resistor 48 which, in turn, is connected to the collector of the transistor 30. The resistors 46 and 48 are shunted by a capacitor 50, and their common junction is connected to the anode of a diode 52. The cathode of the diode 52 is connected to the collector of the transistor 32.

The collector of the transistor 30 is connected to the base of a transistor 52, and the collector of the transistor 32 is connected to the base of a transistor 54. The transistors 52 and 54 are NPN transistors, and they are connected as emitter followers. The collector of the transistor 52 is connected to the positive terminal of a 25 volt direct voltage source, and the emitter of that transistor is connected to a resistor 56. The resistor 56 is connected to a resistor 58 which, in turn, connects with a resistor 60. The resistor 60 is connected to the negative terminal of an 8 volt direct voltage source.

The resistors 56 and 58 are shunted by a capacitor 62, the common junction of these resistors is connected to the anode of a diode 64. The cathode of the diode 64 is connected to the collector of an NPN type power transistor 66, and the junction of the resistors 58 and 60 is connected to the base of that transistor. The emitter of the transistor 66 is grounded, and its collector is further connected to an output terminal 68 and to a resistor 70. The resistor 70 is connected to the positive terminal of the 25 volt direct voltage source. A term $(\bar{A})$ is developed at the output terminal 68.

In like manner, the collector of the transistor 54 is connected to the positive terminal of the 25 volt direct voltage source, and its emitter is connected to a capacitor 72 and to a resistor 74. The resistor 74 connects with a resistor 76 and with the anode of a diode 78. The capacitor 72 and the resistor 76 are connected to a resistor 80 and to the base of an NPN power transistor 82. The resistor 80 is connected to the negative terminal of the 8 volt direct voltage source.

The cathode of the emitter of the power transistor 82 is grounded, and the collector of that transistor is connected to an output terminal 84. A term (A) is developed at the output terminal 84. The collector of the transistor 82 is also connected to the cathode of the diode 78 and to a resistor 86. The resistor 86 is connected to the positive terminal of the 25 volt direct voltage source.

The flip-flop network of FIGURE 1 has an input terminal 90 which is connected back to the output terminal 84 to receive the term (A). The input terminal 90 connects with the cathode of a diode 92, the anode of which is connected to a resistor 94 and to the anode of a diode 96. The flip-flop also includes an input terminal 98 which receives an input signal $(\bar{a})$. The input terminal 98 is connected to the cathode of a diode 100, the anode of the diode being connected to the resistor 94. The flip-flop network also includes an input terminal 102 which receives the clock pulses (T). This input terminal is connected to the cathode of a diode 104 and to the cathode of a diode 106. The anode of the diode 104 is connected to the resistor 94, and the anode of the diode 106 is connected to the anode of a diode 108 and to a resistor 110. The resistor 110 is connected to the positive terminal of the 35 volt direct voltage source.

The flip-flop network also includes an input terminal 112 which is connected back to the output terminal 68 to receive the $(\bar{A})$ term. The input terminal 112 is connected to the cathode of a diode 114. The anode of the diode is connected to the resistor 110. The network also includes an input terminal 116. This latter input terminal receives an input signal $(a)$ and it is connected to the base of a diode 118. The anode of the diode 118 is connected to the resistor 110.

The cathode of the diode 96 is connected to the primary of a transformer 120, the other terminal of the primary being connected to the positive terminal of a 16 volt direct voltage source. The secondary of the transformer 120 is connected to the base of the transistor 30 and to a resistor 122. The resistor 122 is connected to the negative terminal of the 8 volt direct voltage source. A diode 124 has its cathode connected to the top side of the secondary of the transformer 120, and the anode of the diode connects with the lower side of the secondary, and with the cathode of a diode 126. The anode of the diode 126 is grounded.

In like manner, the cathode of the diode 108 connects with the primary of a transformer 128. The transformers 120 and 128 may have a turns ratio of, for example, 3:1. The other terminal of the primary of the transformer 128 is connected to the positive terminal of the 16 volt direct voltage source. The secondary of the transformer 128 is connected to the base of the transistor 32 and to a resistor 130. The resistor 130 is connected to the negative terminal of the 8 volt direct voltage source. The secondary of the transformer 128 is shunted by a diode 132, the anode of the diode being connected to the cathode of a diode 134, and the anode of the latter diode being grounded.

The resistors and capacitors of the flip-flop circuit of FIGURE 1 may have the following values.

| | | |
|---|---|---|
| Resistor **34** | kilo-ohms | 15 |
| Resistor **36** | do | 15 |
| Resistor **40** | do | 15 |
| Resistor **38** | do | 3 |
| Resistor **48** | do | 15 |
| Resistor **46** | do | 3 |
| Capacitor **42** | micro-microfarads | 20 |
| Capacitor **50** | do | 20 |
| Capacitor **62** | do | 150 |
| Resistor **56** | kilo-ohms | 1.6 |
| Resistor **60** | do | 13 |
| Resistor **70** | do | 20 |
| Capacitor **72** | micro-microfarads | 150 |
| Resistor **74** | kilo-ohms | 1.6 |
| Resistor **80** | do | 13 |
| Resistor **86** | do | 20 |
| Resistor **122** | do | 36 |
| Resistor **130** | do | 36 |

The operation of the flip-flop is fully described in the copending case Serial No. 831,277 filed August 3, 1959 and will not be repeated here.

As noted above, one of the fundamental functions of the arithmetic and control sections of the computer is to perform decisions. As also stated, these decisions are performed in the constructed embodiment of the invention by silicon diode logic gates. That is, the decision functions are performed by utilizing coincidence and mixing circuits, more commonly called logical "and" and logical "or" gates, respectively. The form assumed by the networks is that of a logical "and-or" pyramid at the apex of which is the transistor flip-flop, as illustrated in FIGURE 1, or some other device for power amplification such as write amplifiers for the memory. The logic networks in a constructed embodiment of the invention are composed entirely of silicon diodes of the type presently designated 1N628, and of resistors.

A typical "and-or" logical network terminating, for example, at the input transformer of a flip-flop, such as the flip-flop of FIGURE 1, is illustrated in FIGURE 2. The logical network of FIGURE 2 includes three diodes 150, 152 and 154. The anodes of all these diodes are connected to a resistor 156 and to the anode of a diode 158. The resistor 156 is connected to the positive terminal of the 35 volt direct voltage source. The terms B, C and F are respectively introduced to the cathodes of the diodes 150, 152 and 154. These terms each have a first (false) value of the order of 0 or ground potential, and they each have a second (true) value approaching 35 volts. If any one of the terms B, C or F is at its first value of ground potential, the anode of the diode 158 is established at that potential, and the diode 158 is rendered non-conductive. However, when all of the terms B, C and F have their second, or true, value which approaches 35 volts, the anode of the diode 158 is established at that positive voltage, and the diode is rendered conductive.

A group of four diodes are illustrated in FIGURE 2, these diodes being designated as 160, 162, 164 and 166. The anode of each of these diodes is connected to a resistor 168 and to the anode of a diode 170. The resistor 168 is connected to the positive terminal of the 35 volt direct voltage source. The terms B, E, F and G are introduced to the cathodes of the diodes 160, 162, 164 and 166 respectively.

Each of the terms B, E, F and G, as before, has a first condition at which it has a potential of substantially 0 or ground potential, and each of these terms has a second condition at which it has a potential approaching 35 volts. As in the previous instance, only when all of the terms B, E, F and G are in their second condition is the diode 170 conditioned for conduction. On the other hand, when any of these terms is at its first or ground condition, the anode of the diode 170 is established at 0 or ground potential, and the diode is rendered non-conductive.

A third group of diodes 172, 174 and 176 are also illustrated in FIGURE 2. The anodes of each of these latter diodes are connected to a resistor 178 and to the anode of a diode 180. The resistor 178 also is connected to the positive terminal of the 35 voltage source. The terms C, F and G are introduced to the cathodes of the diodes 172, 174 and 176 respectively. As before, these latter terms each have a first value of 0 or ground potential, and a second value at a positive potential approximating 35 volts. Only when all of the terms C, F, and G are at the second value, is the diode 180 conditioned for conduction.

The cathodes of the diodes 158, 170 and 180 are all connected to an input terminal designated (*a*). This input terminal is connected to the primary of a transformer 182, the other terminal of the primary being connected to the positive terminal of a 16 volt direct voltage source. The transformer 182 may be similar to the transformers 120 or 128 in FIGURE 1, and may constitute the input transformer of a flip-flop. A diode 184 has its anode connected to the input terminal (*a*), and a diode 186 also has its anode connected to the terminal (*a*). The clock pulses (T) are introduced to the cathode of the diode 184, and the output term ($\overline{A}$) developed at the output terminal 68 of the flip-flop of FIGURE 23 may be introduced to the cathode of the diode 186.

It is apparent that when the terms B, C and F introduced to the cathodes of the diodes 150, 152 and 154 are true or when the terms B, E, F and G introduced to the cathodes of the diodes 160, 162, 164 and 166, respectively are true; or when the terms C, F and G introduced to the cathodes of the diodes 172, 174 and 176, respectively are true; and when the term ($\overline{A}$) introduced to the cathode of the diode 186 is at a relatively high positive potential; then a negative clock pulse introduced to the cathode of the diode 184 is capable of interrupting the current through the secondary of the transfer 182 to trigger the flip-flop connected to that transformer.

The group of diodes 150, 152 and 154; the group of diodes 160, 162, 164 and 166; and the group of diodes 172, 174 and 176 are each connected as an "and" gate. The three "and" gates formed by the three groups of diodes are connected to form an "or" gate, and the resulting "or" gate is connected in circuit with the diodes 184 and 186 to form a further "and" gate. The Boolean expression for the over-all networks is, therefore, in the form:

$$a=(B.C.F+B.E.F.G+C.F.G)\overline{A}.T$$

where:

*a*—is the input to the flip-flop connected to the transformer 182

T—represents the clock pulses

B, C, E, F and G—represent voltage levels from the other flip-flops.

The operation of the gating structure of FIGURE 2 is such that when the output from the gate is at a positive potential as a result of a coincidence of positive levels of all inputs of any one of the individual "and" gates, a charging current is supplied to the primary winding of the input transformer 182. The next clock pulse can then inhibit the transformer current and trigger the flip-flop connected to the transformer, in the manner described above. The illustrated method of gating allows the rise time of the inputs to the different gates to occur in the time interval between successive clock pulses. This permits the use of large "pull-up" resistors for the "and" gates, and as a result, a single flip-flop is capable of driving 40 gates of this type.

A typical read amplifier is shown in circuit detail in FIGURE 3. This read amplifier uses NPN silicon junction transistors, such as those designated 2N263. The read amplifier circuit includes an input terminal 250 which, for example, receives the output signal from the preamplifier of a corresponding read head 624 associated with the memory drum of the computer, as will be described. This input terminal is connected to the base of a first transistor 252. The collector of the transistor 252 is connected to a resistor 254 and to a resistor 256, the emitter of the transistor 252 also being connected to the base of a transistor 258. The resistor 254 is connected to the positive terminal of a 25 volt direct voltage source, and the resistor 256 is connected to the negative terminal of a 15 volt direct voltage source.

The collector of the transistor 258 is connected to a resistor 260, to the anode of a diode 262, to the cathode of a diode 264 and to the base of a transistor 266. The cathode of the diode 262 and the anode of the diode 264 are both connected to a grounded capacitor 268. The emitter of the transistor 258 is connected to a resistor 270, and a resistor 272 is connected to the resistor 270 and to the negative terminal of an 8 volt direct voltage source. A capacitor 274 is shunted across the resistor 270, and this capacitor is connected to a grounded capacitor 276.

The collector of the transistor 266 is connected to a resistor 278, to the anode of a diode 280, to the cathode of a dide 282 and to the base of a transistor 284. The cathode of the diode 280 and the anode of the diode 282 are connected to a grounded capacitor 286.

The emitter of the transistor 266 is connected to a resistor 288, and the resistor 288 is connected to a resistor 290, the latter resistor being connected to the negative terminal of the 15 volt direct voltage source. A capacitor 292 is shunted across the resistor 288, and the capacitor 292 is connected to a grounded capacitor 294.

The collector of the transistor 284 is connected to a resistor 296, and to the base of a transistor 298. The resistor 296 is connected to the positive terminal of a 35 volt direct voltage source.

The emitter of the transistor 284 is connected to a resistor 300, and the resistor 300 is connected to a resistor 302. The latter resistor is connected to the negative terminal of the 15 volt direct voltage source. A capacitor 304 is shunted across the resistor 300, and the junction of the resistors 300 and 302 is connected to a grounded capacitor 306.

The collector of the transistor 298 is connected to a resistor 308 and to a capacitor 310. The resistor 308 is connected to the positive terminal of the 35 volt direct voltage source. The emitter of the transistor 298 is connected to a resistor 312 and to a capacitor 314. The resistor 312 is connected to the positive terminal of a 4 volt direct voltage source.

The capacitor 310 is connected to a resistor 316, which in turn, is connected to the cathode of a diode 318 and to the base of a transistor 320. A capacitor 322 is shunted across the resistor 316, and the anode of the diode 318 is grounded.

The emitter of the transistor 320 is connected to the cathode of a diode 324, the anode of the diode is connected to an input terminal 326 which receives the clock pulses (T). The collector of the transistor 320 is connected to a first output terminal 328.

The capacitor 314 is connected to a resistor 330 which, in turn, is connected to the base of a transistor 332 and to the cathode of a diode 334. The anode of the diode 334 is grounded. A capacitor 336 is shunted across the resistor 330. The emitter of the transistor 332 is connected to the cathode of a diode 338. The clock pulses (T) are introduced by way of an input terminal 339, to the anode of the diode 338. The collector of the transistor 332 is connected to a second output terminal 340.

The first stage of the amplifier of FIGURE 3, which incorporates the circuitry associated with the transistor 252, is essentially an emitter follower which provides current gain and an impedance match to the head signal. The emitter follower is followed by three stages of voltage amplification, these stages including the transistors 258, 266 and 284. Symmetrical clipping of the signal at the base of the transistor 266 is provided by the diodes 262 and 264. Similar symmetrical clipping of the signal at the base of the transistor 284 is provided by the diodes 280 and 282.

The circuitry of the transistor 298 also functions as a phase splitter, so that signals of a first phase are introduced to the base of the transistor 320, and signals of opposite phase are introduced to the base of the transistor 332. Each of the output phases is gated by the clock pulses (T) introduced to the input terminals 326 and 339.

The read amplifier of FIGURE 3 provides that one of the transistors 320 and 332 is conductive to the clock pulses (T) of the computer when a binary 1 is read from the magnetic memory drum, and the other of these transistors is conductive to the clock pulses (T) when a binary 0 is read from the drum. Therefore, the flip-flop 206 is triggered to one operating state whenever a binary 0 is read following a binary 1, and the flip-flop is returned to its first stable operating state whenever a 1 is read following a binary 0.

Figure 4:
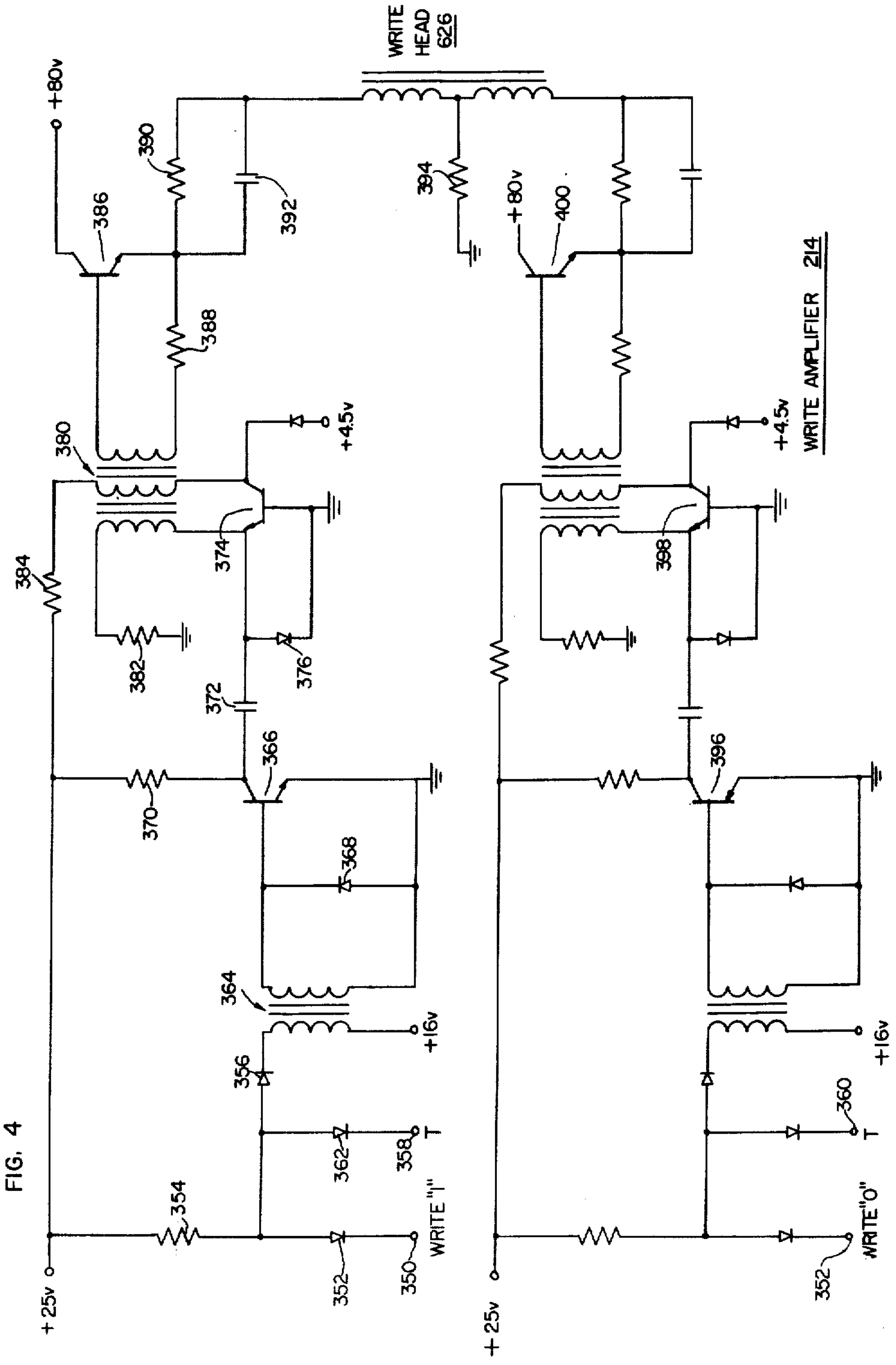
FIGURE 4 is a circuit diagram of a suitable amplifier circuit for use in conjunction with one of the write heads of the magnetic memory unit of the embodiment of the invention to be described.

Suitable circuitry for use as a write amplifier is shown in FIGURE 4. The circuitry includes a blocking oscillator driving a transistorized power stage on each side of a center-tapped read head winding. As in the read amplifier, silicon junction transistors of the type presently designated 2N263 may be used in the blocking oscillators and in the circuits for triggering the blocking oscillators. In like manner, power transistors of the NPN silicon junction type, such as are presently designated by the Texas Instrument Company as "970," may be used in the power stages.

The input gating provided to the record or write amplifier 214 is identical with that of a flip-flop. Therefore, an additional write flip-flop is not necessary, since the desired waveform can be generated directly at the input of the record amplifier.

The write amplifier of FIGURE 4 includes a first input terminal 350 and a second input terminal 352. Whenever the input signal introduced to the input terminal 350 goes positive, a 1 will be recorded by the write head 626 associated with the illustrated write amplifier. Likewise, whenever the input signal introduced to the input terminal 352 goes positive, a 0 is written on the magnetic drum 202 by the write head 626.

The input terminal 350 is connected to the cathode of a diode 352, the anode of the diode being connected to a resistor 354 and to the anode of a diode 356. The resistor 354 is connected to the positive terminal of a 25 volt direct voltage source. The clock pulses T are introduced to an input terminal 358 and to an input terminal 360. The input terminal 358 is connected to the cathode of a diode 362, the anode of which is connected to the resistor 354.

The cathode of the diode 356 is connected to the primary winding of a transformer 364, the other terminal of the primary winding being connected to the positive terminal of a 16 volt direct voltage source. One terminal of the secondary of the transformer 364 is connected to the base of a transistor 366, and the other terminal of the secondary is grounded. A diode 368 is connected across the secondary of the transformer 364.

The emitter of the transistor 366 is grounded, and the collector of the transistor is connected to a resistor 370, the resistor being connected back to the positive terminal of the 25 volt direct voltage source. The collector of the transistor 366 is also connected to a coupling capacitor 372, and the coupling capacitor connects with the emitter of a transistor 374 and the anode of a diode 376. The base of the transistor 374 and the cathode of the diode 376 are both grounded. The collector of the transistor 374 is connected to the cathode of a diode 378, the anode of the diode being connected to the positive terminal a 4.5 volt direct voltage source.

The transistor 374 is connected as a blocking oscillator. Its emitter is connected to one terminal of a first winding of a blocking oscillator transformer 380, and its collector is connected to one terminal of a second winding of the blocking oscillator transformer. The other terminal of the first winding of the transformer 380 is connected to a grounded resistor 382, and the second winding of the transformer is connected to a resistor 384. The resistor 384 is connected to the positive terminal of the 25 volt direct voltage source.

The blocking oscillator transformer 380 has a third winding which is connected to the base of a power transistor 386 and to a resistor 388. The resistor 388 is connected to the emitter of the transistor 386. The collector of the transistor 386 is connected to the positive terminal of an 80 volt direct voltage source.

The emitter of the transistor 386 is connected to a resistor 390 which, in turn, is connected to one terminal of the winding of the corresponding write head 626. The resistor 390 is shunted by a capacitor 392. The winding of the write head 626 is center-tapped, and the center tap of the winding is connected to a grounded resistor 394.

The input terminals 352 and 360 are connected to the circuitry associated with a transistor 396. This circuitry is similar to the circuitry associated with the transistor 366. Likewise, the transistor 396 is coupled to a transistor 398. The latter transistor, like the transistor 374, is connected as a blocking oscillator. The output from the blocking oscillator circuit associated with the transistor 398 is connected to a power transistor 400. The power transistor 400 is connected to the other terminal of the winding of the write head 626.

As mentioned, the "write 1" and "write 0" circuits of the write amplifier of FIGURE 4 are identical. Each consists of a first stage which is used to trigger a blocking oscillator which, in turn, drives a grounded collector power stage. The blocking oscillators are pulse width controlled by external circuit parameters to permit interchangeability of transistors in these stages.

Therefore, to write a "1" on the magnetic memory drum 200 by means of the associated write head 626, the input signal at the input terminal 350 goes plus to permit the next clock pulse to be passed through the circuitry of the transistor 366 to trigger the blocking oscillator associated with the transistor 374. The resulting output pulse from the blocking oscillator is amplified by the power amplifier transistor 386, and a current flows through the top section of the winding of the write head 626 so that the resulting magnetic recording will have the polarity corresponding to a binary "1." Conversely, when the signal introduced to the input terminal 352 goes plus, the next clock pulse "T" is amplified by the transistor 396 to trigger the blocking oscillator circuit of the transistor 394. The resulting output pulse is amplified by the power transistor 400 and a current flows in the opposite direction through the lower section of the winding of the associated write head 626. This latter current causes a magnetic recording corresponding to a binary "0" to be made on the corresponding channel of the magnetic memory drum.

The circuitry of a suitable clock generator for the computer is illustrated in FIGURE 5. This generator likewise may use silicon junction N-P-N transistors of the 2N263 type, in conjunction with a final power output stage which may use silicon junction N-P-N power transistors of this type designated 953 by the Texas Instrument Company. The pulse repetition frequency may be of the order of 100–200 kilocycles, as mentioned above.

The signals from one of the read heads 624 is introduced through an input terminal 410, this particular read head being coupled to a clock channel on the magnetic memory drum. The input terminal 410 is connected to the base of a transistor 412. The collector of the transistor 412 is connected to a resistor 414, and the emitter of the transistor 412 is connected to a resistor 416 and to the base of a transistor 418. The resistor 414 is connected to the positive terminal of the 25 volt direct voltage source, and resistor 416 is connected to the negative terminal of the 15 volt direct voltage source.

The collector of the transistor 418 is connected to a resistor 420 and to the base of a transistor 422. The collector is also connected to the anode of a diode 424 and to the cathode of a diode 426. The cathode of the diode 424 and the anode of the diode 426 are connected to a grounded capacitor 428.

The emitter of the transistor 418 is connected to a resistor 430 which, in turn, connects with a resistor 432. The resistor 430 is shunted by a capacitor 434, and the junction of the resistors 430 and 432 is connected to a grounded capacitor 436.

The collector of the transistor 422 is connected to a resistor 440 and to the base of a transistor 442. The base of the transistor 442 is connected to the cathode of a diode 444, the anode of which is connected to the emitter of the transistor 442 and to a grounded capacitor 446.

The emitter of the transistor 422 is connected to a resistor 448, the resistor 448 being connected to a resistor 450, and the resistor 450 being connected to the negative terminal of the 15 volt direct voltage source. A capacitor 452 is shunted across the resistor 448, and the capacitor 452 is connected to a grounded capacitor 454.

The collector of the transistor 442 is connected to a resistor 456 and to the base of a transistor 458. The resistor 456 is connected to the positive terminal of the 35 volt direct voltage source. The collector of the transistor 458 is also connected to the positive terminal of the 35 volt direct voltage source. The emitter of the transistor 458 is connected to a grounded resistor 460 and to a capacitor 462. The capacitor 462 is connected to a grounded resistor 464 and to the emitter of a transistor 466. The transistor 466 is connected as a blocking oscillator. The base of the latter transistor is connected to a grounded resistor 468. The emitter of the transistor is connected to the anode of a diode 470, and the collector is connected to the cathode of a diode 472. The anode of the latter diode is connected to the positive terminal of a 6 volt direct voltage source.

The cathode of the diode 470 is connected to a first winding of a blocking oscillator transformer 474. The collector of the transistor 466 is connected to a second winding of the transformer 474. The other terminal of the second winding of the transformer 474 is connected to the positive terminal of the 25 volt direct voltage source.

The cathode of the diode 470 is further connected to a resistor 476 which, in turn, is connected to the anode of a diode 478. The cathode of the diode 478, and the other terminal of the first winding of the transformer 474, are connected to a grounded resistor 480. A capacitor 482 is shunted across the resistor 480.

The transformer 474 has a third winding which is connected to the base of a transistor 484 and to a resistor 486, the resistor being shunted by a capacitor 488. The resistor 486 is connected to a first resistor 490 and to a second resistor 492. The resistor 490 is connected to the emitter of the transistor 484 and the resistor 492 is connected to the emitter of a transistor 494. The transistors 484 and 494 are power transistors, and their collectors are connected to the positive terminal of the 80 volt direct voltage source. The base electrodes of the transistors 484 and 494 are connected together and to the anode of a diode 496. The cathode of the diode 496 is connected to the positive terminal of the 60 volt direct voltage source.

The resistor 486 is also connected to the cathode of a diode 498, the anode of which is connected to the negative terminal of a 25 volt direct voltage source. The resistor also connects with the primary winding of a transformer 500, the other terminal of that primary winding being grounded. The secondary winding of the transformer 500 is connected to ground and to an output terminal 502. The output terminal produces the clock pulses (T). This output terminal also connects with the cathode of a diode 504, the anode of which is connected to a grounded resistor 506.

It will be observed that the first three stages of the clock generator 210 are similar to the circuitry of the read amplifier illustrated in FIGURE 4, with certain modifications. The fourth and fifth stages, which include the circuitry of the transistors 442 and 458 shape the clock signal and provide triggering pulses for the blocking oscillator circuit associated with the transistor 466. The output pulses from the blocking oscillator drive the power stage which is made up of the power transistors 484 and 494. The resulting output pulses from the power stage are introduced to the primary of the transformer 500, so that the negative-going clock pulses (T) may be produced at the output terminal 502.

Extreme care is taken to control the pulse width of the output clock pulses by preventing saturation of all the transistors, and by minimizing the effect of variations of transistor parameters with external circuit components. As a result, the output pulse width variation in the constructed embodiment of the invention is less than .5 microsecond throughout the temperature range of from −55° C. to +120° C.

As illustrated in FIGURE 6, a selection matrix connects with a center tap connection on each of a group of read heads 624 which are controlled by that matrix. The other terminals of one of the read heads are connected to the anodes of a pair of diodes 520 and 522 respectively. In like manner, the other terminals of another of the read heads 624 are connected to the anode of a diode 524 and to the anode of a diode 526. Still other ones of the read heads are similarly connected to like diodes.

The cathodes of all the diodes associated with one of the terminals of the read heads, such as the diodes 522 and 526, are connected to a common lead 528. Likewise, the cathodes of all the diodes connected to the other terminals of the read heads, such as the diodes 520 and 524, are connected to a common lead 530. The lead 528 is connected to the base of an NPN transistor 532, and the lead 530 is connected to the base of an NPN transistor 534.

The collectors of the transistors 532 and 534 are connected to the positive terminal of a 25 volt direct voltage source. The emitter of the transistor 534 is connected to one terminal of the primary of an output transformer 536, and the emitter of the transistor 532 is connected to the other terminal of the primary. The center tap of the primary of the transformer 536 is connected to the positive terminal of an 8 volt direct voltage source. One terminal of the secondary winding of the transformer 536 is grounded, and the other terminal is connected to a read amplifier 204.

In the illustrated switching circuitry of FIGURE 6, a particular one of the read heads is selected by the matrix in the unit 16 which biases the diodes of the selected head in the forward direction, all the other diodes being biased in the reverse direction. The selected head signal is superimposed on the direct current biasing current, and it drives the push-pull grounded collector stage of the transistors 532 and 534. This stage is coupled through the transformer 536 to the read amplifier 204. The push-pull output stage is used to cancel switching transients and noise which would overload the read amplifier and increase the time between track selection and reading. The effect of the variations of diode forward voltage is also minimized by the push-pull arrangement.

Figure 7:
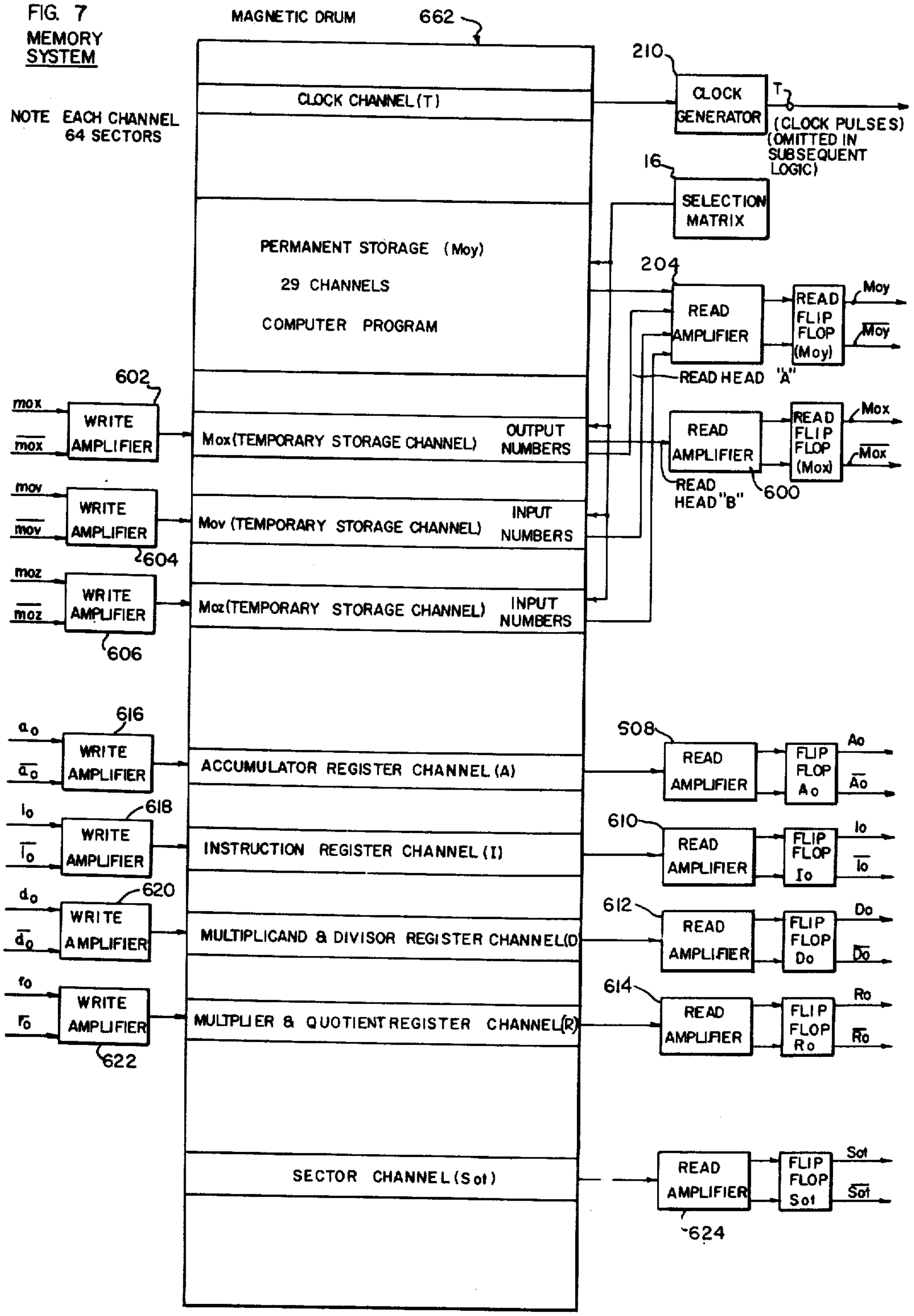
FIGURE 7 is a schematic representation of the memory system of the embodiment of the invention to be described, this representation showing the different channels on the magnetic memory drum and the amplifiers and other elements associated with those channels.

The memory system of the computer is illustrated in the schematic representation of FIGURE 7. As noted above, the different information is recorded on the magnetic drum 662 in a plurality of imaginary tracks, or channels, which are spaced axially along the drum adjacent one another. These tracks have corresponding read heads (not shown) which read the information recorded on the individual tracks. Moreover, certain ones of the tracks have corresponding write heads (not shown) which can be controlled to write data on the tracks with which they are associated. As also mentioned, each of the channels or tracks on the drum has sixty-four sectors, and a twenty-five digit word may be recorded in each sector.

The uppermost channel on the drum in FIGURE 7 is the clock channel (T). This channel, as mentioned above, contains a plurality of recordings which are spaced from one another by an interval corresponding to a binary bit or digit. The recordings in the clock channel (T) are read by an appropriate read head and introduced to the clock generator 210 (described in conjunction with FIGURE 5). The clock generator develops a plurality of clock pulses designated (T). These clock pulses are used to time the actual triggering of all the flip-flops in the computer. For purposes of convenience, in some instances the clock pulses are omitted in the ensuing description of the logic circuitry used in the computer of the invention. However, it is to be remembered that the timing of substantially all the flip-flops is under the control of the clock pulses (T).

The magnetic drum 662 also contains twenty-nine channels which constitute the permanent storage for the computer, and on which the various commands are recorded. These channels will be referred to as the (M*oy*) channels. Adjacent the (M*oy*) channels is a temporary storage channel for the output numbers which is designated the (M*ox*) channel. The magnetic drum 662 also includes an (M*ov*) temporary channel for the input numbers, and it includes an (M*oz*) temporary storage channel for the input numbers. The selection matrix 16 (FIGURE 6) is coupled to the read heads associated with the (M*oy*) channels, and it is also coupled to the read heads associated with the (M*ox*), (M*ov*) and (M*oz*) channels in the manner described in conjunction with FIGURE 6. These read heads are all coupled to the read amplifier 204, which, in turn, is coupled to a read flip-flop (M*oy*). Any one of the read heads associated with the different (M*oy*) channels, or any one of the read heads associated with the (M*ox*), (M*ov*) and (M*oz*) channels, may be selected by the selection matrix 16, so that its output signals may be introduced to the read amplifier 204 to actuate the read flip-flop (M*oy*). The terms (M*oy*) and ($\overline{Moy}$) may be derived from the read flip-flop (M*oy*).

The (M*ox*) temporary storage channel has an additional read head which is coupled to a read amplifier 600, the read amplifier, in turn, being coupled to the input terminals of a read flip-flop (M*ox*). The read flip-flop (M*ox*) produces (M*ox*) and ($\overline{Mox}$) terms at its output terminals, regardless of the control exerted on the other read heads by the selection matrix 16.

The (M*ox*), (M*ov*) and (M*oz*) channels include respective write amplifiers 602, 604 and 606 which are connected to corresponding ones of the write heads associated with these channels. The amplifiers 602, 604 and 606 may be connected in the manner described in conjunction with FIGURE 4. These amplifiers each have two input terminals, and they each include a pair of blocking oscillators. When a term is introduced to one input terminal a corresponding binary "0" is written in the corresponding channel, and when an input term is introduced to the other input terminal a binary "1" is written in the corresponding channel. The term ($m_{ox}$) and the term ($\overline{m_{ox}}$) are introduced to the respective input terminals of the write amplifier 602. Likewise, the terms ($m_{ov}$) and ($\overline{m_{ov}}$) are introduced to the input terminals of the write amplifier 604, and the terms ($m_{oz}$) and ($\overline{m_{oz}}$) are introduced to the input terminals of the write amplifier 606.

As also described above, the magnetic drum 662 includes an accumulator register channel (A), an instruction register channel (I), a multiplicand and divisor register channel (D) and a multiplier and quotient register channel (R). The instruction register channel provides a twenty-five bit delay and the multiplier channel (R) and multiplicand register channel (D) provide a twenty-four bit delay so that, in a manner to be described in more detail, a word of information may be circulated in these registers. The read heads associated with the various register channels are coupled to a corresponding plurality of read amplifiers 608, 610, 612 and 614. These read amplifiers may be connected in a manner similar to that described in conjunction with FIGURE 4.

The read amplifier 608 controls a flip-flop (A*o*) which is included in the accumulator register (A). This flip-flop provides the output terms A*o* and $\overline{Ao}$. The read amplifier 610 controls a flip-flop (I*o*) which is included in the instruction register (I). The flip-flop (I*o*) produces the output terms I*o* and $\overline{Io}$. The read amplifier 612 controls a flip-flop (D*o*) which is included in the multiplicand and divisor register (D). This latter flip-flop provides the terms D*o* and $\overline{Do}$. The read amplifier 614 controls the flip-flop (R*o*), this latter flip-flop being included in the multiplier and quotient register channel (R). The flip-flop (R*o*) supplies the output terms R*o* and $\overline{Ro}$.

A plurality of write amplifiers 616, 618, 620 and 622 are respectively coupled to the write heads associated with respective ones of the register channels. The input terminals of the write amplifiers 616 are designated $a_o$ and $\overline{a_o}$ respectively. This amplifier, and the amplifiers 618, 620 and 622 may be similar in their construction to the write amplifier described in conjunction with FIGURE 4. The input terminals of the write amplifier 618 are designated $i_o$ and $\overline{i_o}$. The input terminals of the write amplifier 620 are designated $d_o$ and $\overline{d_o}$ respectively. The input terminals of the write amplifier 622 are designated $r_o$ and $\overline{r_o}$ respectively.

The magnetic drum 662 also includes a sector channel which is designated as (S*ot*). This sector channel (S*ot*) has binary numbers recorded in it which constitute the addresses of the different sixty-four sectors of the drum. The read head associated with the sector channel is coupled to a read amplifier 624 which may be similar in its construction to the read amplifiers described above. The read amplifier 624 controls a flip-flop (S*ot*). The latter flip-flop provides the terms S*ot* and $\overline{Sot}$.

Figure 8:
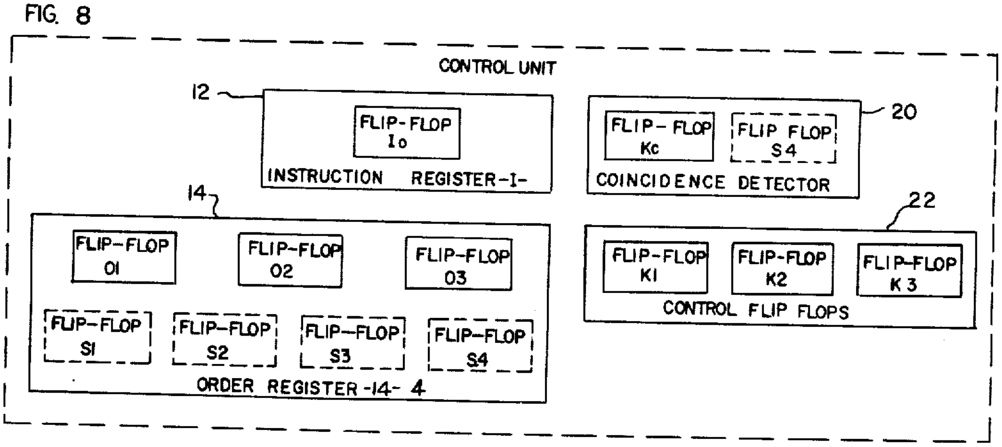
FIGURE 8 is a block diagram of the different flip-flops which are included in a control unit portion of the computer to be described.
Figure 9:
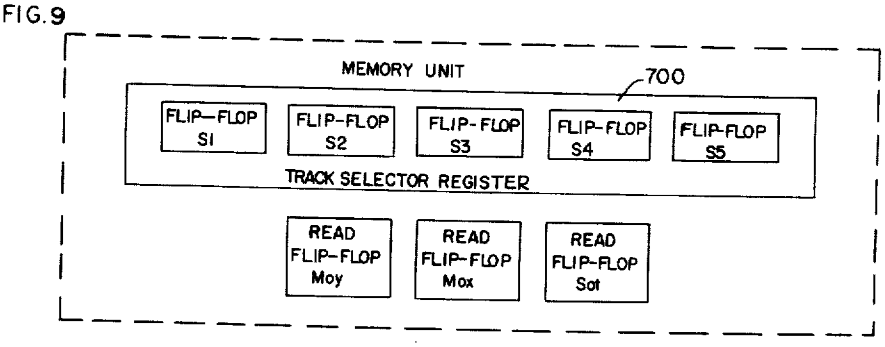
FIGURE 9 is a block diagram of the different flip-flops which are included in the memory unit portion of the computer to be described.

The computer of the invention may be considered to be composed functionally of a control unit, a memory unit and an arithmetic unit. Each of these units includes a plurality of flip-flops, and the disposition of these flip-flops in the several units is illustrated in FIGURES 8, 9 and 10. In some instances, a flip-flop is used in more than one unit and on a time-shared basis. Whenever a flip-flop has a secondary use, such secondary use is shown in dotted form in these figures and in the appropriate unit.

The control unit of FIGURE 8 includes the instruction register (I), which is designated as 12; and it also includes a coincidence detector 20, an order register 14, and a group of control flip-flops represented by a block 22.

The instruction register includes the flip-flop (I*o*) which was described in conjunction with FIGURE 7. The order register 14 includes a group of three flip-flops which are designated O1, O2, and O3. The order register also uses a group of flip-flops S1, S2, S3 and S4 from a track selector register 700 (FIGURE 9) on a time-shared basis. The coincidence detector 20 includes a flip-flop (K*c*) and it also uses the flip-flop (S4) from the track selector register. The block 22 includes a group of three control flip-flops which are designated K1, K2 and K3.

The memory unit of FIGURE 9 includes the track selector register 700 referred to above. This register includes the flip-flops S1–S4 referred to above, and it includes an additional flip-flop S5. Also included in the memory unit are the read flip-flops M*oy*, M*ox* and S*ot* of FIGURE 7.

Figure 10:
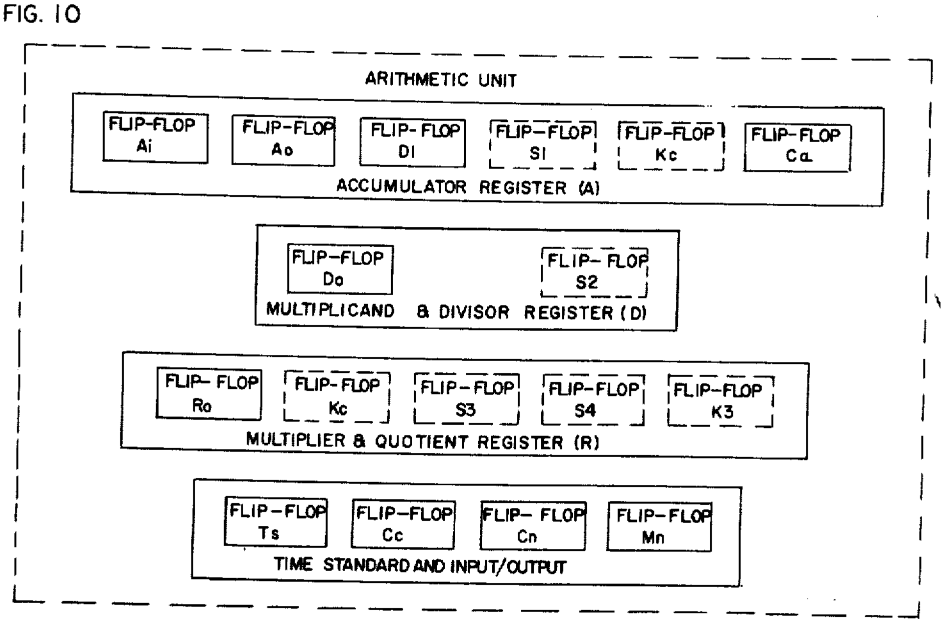
FIGURE 10 is a block diagram of the different flip-flops which are included in the arithmetic unit portion of the computer to be described.

The arithmetic unit of FIGURE 10 includes the accumulator register (A), the multiplicand and divisor register (D), the multiplier and quotient register (R), and an auxiliary arithmetic unit for time standard and input/output operation is also included. The accumulator register (A) includes the read flip-flop (A*o*) of FIGURE 7, and it also includes a flip-flop (A*i*), a flip-flop (D*i*), and a carry flip-flop (C*a*). Moreover, the accumulator register uses the track selector flip-flop (S1) and the coincidence detector flip-flop (K*c*) on a time-shared basis.

The (D) register includes the flip-flop (D*o*) of FIGURE 7, and it uses the track selector flip-flop (S2) on a time-shared basis. The (R) register, on the other hand, includes the flip-flop (R*o*) of FIGURE 7, and it also uses the coincidence flip-flop (K*c*), and the control flip-flop (K3) and the track selector flip-flops (S3) and (S4) on a timed-shared basis. The auxiliary arithmetic unit includes a time standard flip-flop (T*s*), an output comparator flip-flop (C*c*), an output carry flip-flop (C*n*), and an input/output flip-flop (M*n*).

Figures 11, 12:
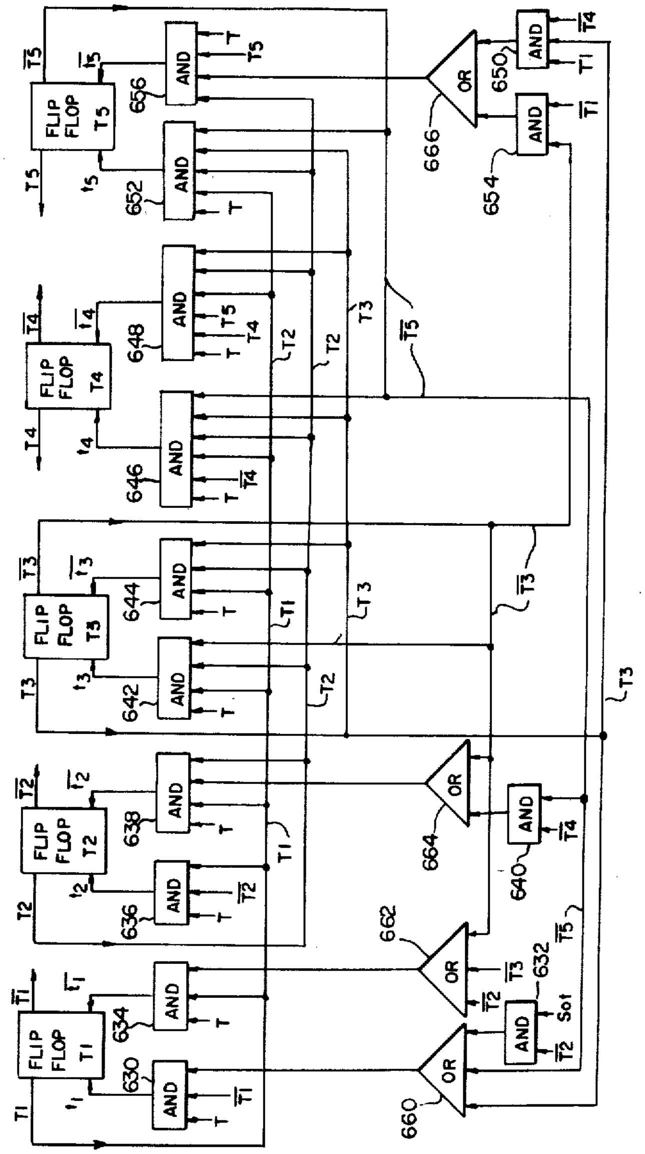
FIGURE 11 is a logic block diagram of a bit counter which is included in the computer to be described.
FIGURE 12 is a timing chart illustrating the different flip-flop configurations in the bit counter of FIGURE 33.

The computer of the invention includes a bit counter 628 which is illustrated in FIGURE 11. This bit counter is controlled to provide different configurations for each bit time during each word as the drum 662 of FIGURE 7 rotates. As noted previously, each word on the drum contains twenty-five digits, and there are sixty-four words for each channel. The bit counter of FIGURE 11 is controlled therefore to count from $P_{24}$ to $P_0$ to provide twenty-five different configurations each representing a different bit, or digit time. In a manner to be described, the bit counter of FIGURE 11 is controlled so that it may conveniently be synchronized with the sector channel ($S_{ot}$) on the drum so that the digit times represented by the bit counter will conform with the digit times of the commands in the permanent storage channels (M*oy*) as represented by the binary numbers in the sector channel.

The bit counter of FIGURE 11 includes a plurality of flip-flop networks which are designated T1, T2, T3, T4 and T5 respectively. The flip-flops may be constructed in accordance with the circuitry described in conjunction with FIGURE 1. A plurality of "and" gates and a plurality of "or" gates are coupled to the flip-flops in the bit counter. The "and" gates are designated as 630, 632, 634, 636, 638, 640, 642, 644, 646, 648, 650, 652, 654 and 656 respectively; and the "or" gates are designated as 660, 662, 664 and 666 respectively.

The "and" and "or" gates are connected to the different flip-flops T1, T2, T3, T4 and T5 in the manner illustrated in FIGURE 11 and in accordance with the following logical equations. The "or" gates and the "and" gates may be connected together in the manner described in conjunction with FIGURE 24.

$$t_1=\overline{T}_5+\overline{T}_3+\overline{T}_2.S_{OT}$$
$$\overline{t}_1=\overline{T}_4+\overline{T}_3+\overline{T}_2$$
$$t_2=T_1$$
$$\overline{t}_2=T_1(\overline{T}_4.\overline{T}_5+\overline{T}_3)$$
$$t_3=T_1.T_2$$
$$\overline{t}_3=T_1.T_2$$
$$t_4=T_1.T_2.T_3.\overline{T}_5$$
$$\overline{t}_4=T_1.T_2.T_3.T_5$$
$$t_5=T_1.T_2.T_3$$
$$\overline{t}_5=T_2(\overline{T}_3.\overline{T}_1+\overline{T}_4.T_3.T_1)$$

The logic illustrated in FIGURE 11, and set forth in the above equations, controls the flip-flops $T_1$, $T_2$, $T_3$, $T_4$ and $T_5$ so that the bit counter has successive configurations as shown by the timing chart of FIGURE 12. It will be noted that the clock pulses (T) are omitted from the logic equations, as are the cross output terms of the individual flip-flops. However, these terms are illustrated in FIGURE 11. That is, the terms T and $T_1$ are shown as introduced to the "and" gate 630, the terms T and $T_1$ are introduced to the "and" gate 634, the terms T and $\overline{T}_2$ are introduced to the "and" gate 636, the terms T and $T_2$ are introduced to the "and" gate 638, and so on where "T" represents the clock pulses; and $T_1$, $T_2$ . . . , $\overline{T}_1$, $\overline{T}_2$ . . . represent the output terms.

The bit counter of FIGURE 11 normally counts down from the digit time $P_{24}$ to the digit time $P_0$. An examination of the circuitry will reveal that when the bit counter reaches the $P_2$ configuration, it can reach the $P_1$ configuration only when the ($S_{OT}$) term is a 1. The recordings in the sector channel of the drum 662 in FIGURE 32 are arbitrarily arranged so that only in the $P_2$ bit position in that channel do all sixty-four words on the drum contain a 1. All other bit positions contain at least one 0.

Therefore, as the drum 662 rotates, after the computer has first been put into operation, the bit counter of FIGURE 11 will start counting, and it will continue to count down from $P_{24}$ until it reaches its $P_2$ configuration. Then, if it encounters a 1 from the flip-flop ($S_{OT}$), it will continue ot its $P_0$ position. However, if for the next word, it does not encounter a 1 at its $P_2$ configuration, it will stop until it does so. This shift between the count of the bit counter and the sector channel will continue until the $P_2$ bit position of each word in the sector channel corresponds with the $P_2$ bit configuration of the counter. At that time, the counter will be synchronized with the sector channel and will proceed to repeat its digit count for each word. It will be noted that this synchronizing of the bit counter with the sector channel is obtained in the computer of the invention without the requirement of the addition of any identifying bits on the magnetic drum.

Figure 13:
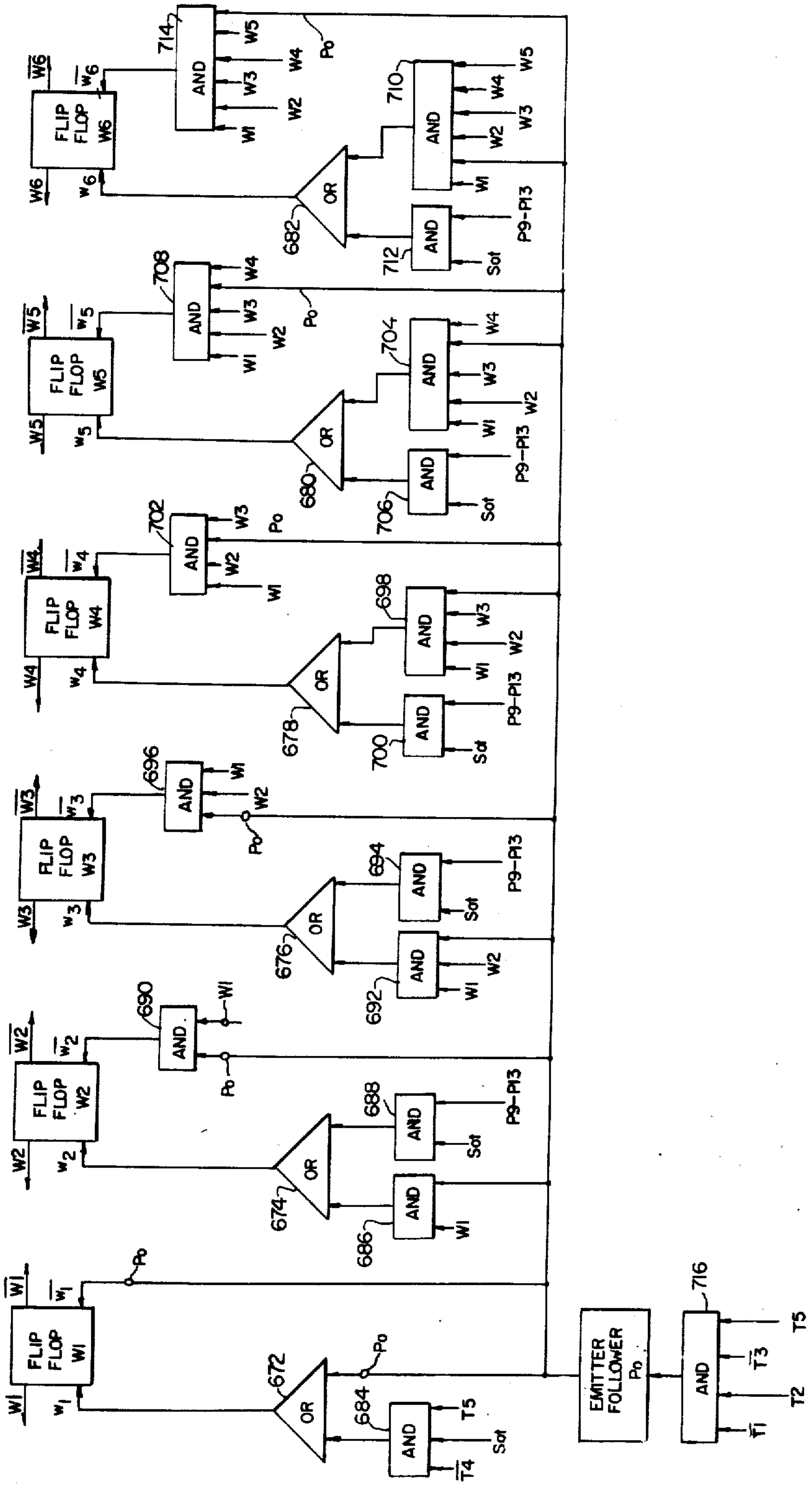
FIGURE 13 is a logic block diagram of a word counter which is included in the computer to be described.

In addition to the bit counter of FIGURE 11 and which shall be designated generally as 628, the computer of the invention includes a word counter 670 which is illustrated in FIGURE 13. This word counter counts from W0 to W63 word times, and then repeats. The sector numbers in the sector channel (S*ot*) on the magnetic drum are synchronized as will be described with their binary-coded equivalents in the word counter.

The word counter 670 includes a group of six flip-flops which are designated W1, W2, W3, W4, W5 and W6. A plurality of "or" gates 672, 674, 676, 678, 680, and 682; and a plurality of "and" gates 684, 686, 688, 690, 692, 694, 696, 698, 700, 702, 704, 706, 708, 710, 712 and 714 are connected to the flip-flops in the manner illustrated in FIGURE 35 and as represented by the following logic equations.

The logic circuitry of the counter 670 also includes an emitter follower which is designated $P_0$, and which provides an output term $P_0$ at 0 digit time. An "and" gate 716 is connected to the input terminal of the emitter follower $P_0$, and the terms $\overline{T}_1$, $T_2$, $\overline{T}_3$ and $T_5$ are introduced to the "and" gate 716. It will be realized that these terms correspond to the configuration of the bit counter 628 of FIGURE 11 at $P_0$ digit time, as shown by the chart of FIGURE 12. The following logic equations are applicable to the word counter 670:

$$w_1=P_0+Sot.T_5.\overline{T}_4$$
$$\overline{w}_1=P_0$$
$$w_2=P_0.W_1+Sot(P_9-P_{13})$$
$$\overline{w}_2=P_0.W_1$$
$$w_3=P_0.W_1.W_2+Sot(P_9-P_{13})$$
$$\overline{w}_3=P_0.W_1.W_2$$
$$w_4=P_0.W_1.W_2.W_3+Sot(P_9-P_{13})$$
$$\overline{w}_4=P_0.W_1.W_2.W_3$$
$$w_5=P_0.W_1.W_2.W_3.W_4+Sot(P_9-P_{13})$$
$$\overline{w}_5=P_0.W_1.W_2.W_3.W_4$$
$$w_6=P_0.W_1.W_2.W_3.W_4.W_5+Sot(P_9-P_{13})$$
$$\overline{w}_6=P_0.W_1.W_2.W_3.W_4.W_5$$

As before, the clock pulses (T) and the cross terms for the individual flip-flops have been omitted from the logic equations. To simplify the illustrated circuitry, these terms have also been omitted from FIGURE 13.

The logic involved with the word counter is simple counter logic, with $W_1$ representing the least significant digit of the sector number and $W_6$ representing the most significant digit of that number.

The term $Sot.T5.\overline{T}4$ is the synchronizing signal which sets the counter after the bit counter 628 is properly synchronized and in response to signals from sector 63 of the sector identifying channel ($Sot$) which occur during the digit period $P13-P9$. Synchronization is accomplished by storing a "1" in each of the digit positions $P_{13}-P_9$ of sector 63, in the ($S_{OT}$) channel but storing a "0" in the respective $P_{13}-P_9$ positions of the other sectors of that channel. The word counter 670 of FIGURE 13 is not synchronized with the number 63 sector until the bit counter of FIGURE 11 is in synchronism with the sector channel ($S_{OT}$), as described above. Only then will the bit counter properly identify the $P_{13}-P_9$ digits of the sector channel by the terms $\overline{T}_4.T_5$. When that occurs, the word counter 670 is set to 1111111. At each $P_0$ time, the word counter undergoes a transition, and it counts through a series of 64 steps at which time it again reaches the 1111111 configuration by the recordings in the sector 63 of the channel ($Sot$).

To sum up the action of the sector channel ($Sot$), and the bit counter of FIGURE 11 and the word counter of FIGURE 12, it should again be pointed out: the sector address channel ($Sot$) is a permanent channel on the magnetic memory drum 662 as described in conjunction with FIGURE 7. This channel contains the sector address number, and the sector address number is recorded in the channel as two 6-bit serial codes. In addition, the sector channel ($Sot$) has a 1 at the P2 digit position of each sector, this 1 being used to synchronize the bit counter 628 of FIGURE 11 in the described manner. As also described, the P2 digit time is the only position on the ($Sot$) track of the magnetic memory drum which contains a 1 in every word.

Therefore, if the bit counter 628 of FIGURE 11 is set into operation at a point such that the P2 configuration of the counter occurs at any other digit time with respect to the magnetic memory drum, it will find at least one "0" at that time as it moves from word to word. The counter will then stay in the P2 configuration until it finds a 1 at a later time, thereby skipping one or more counts. This shifts the P2 configuration of the counter relative to the words on the magnetic drum 662. The process is continued until the $P_2$ configuration of the counter occurs at the $P_2$ time of the words on the drum. At this time, the counter can no longer shift with respect to the words on the drum as there is always a "1" on the ($Sot$) track at this pulse time of every word. This system enables the bit counter 628 to synchronize with the words on the magnetic memory drum after a maximum lag of one drum revolution.

As also described in conjunction with FIGURE 13, the ($Sot$) track of the magnetic memory drum is further used to synchronize the word counter 670. This latter synchronizing is accomplished as noted, by placing at one "1" in the digit positions $P_{13}-P_9$ of sector 63, and all "0's" at these digit positions in all other sectors. It can take at most one drum revolution after the bit counter 628 of FIGURE 11 is synchronized to synchronize the word counter 670 of FIGURE 13, so that both counters will be synchronized in a maximum of two drum revolutions. The "1's" in the $P_{13}-P_9$ digit times of the word 63 sets all the flip-flops $W_1-W_6$ of the word counter 670 to "1."

Figure 14:
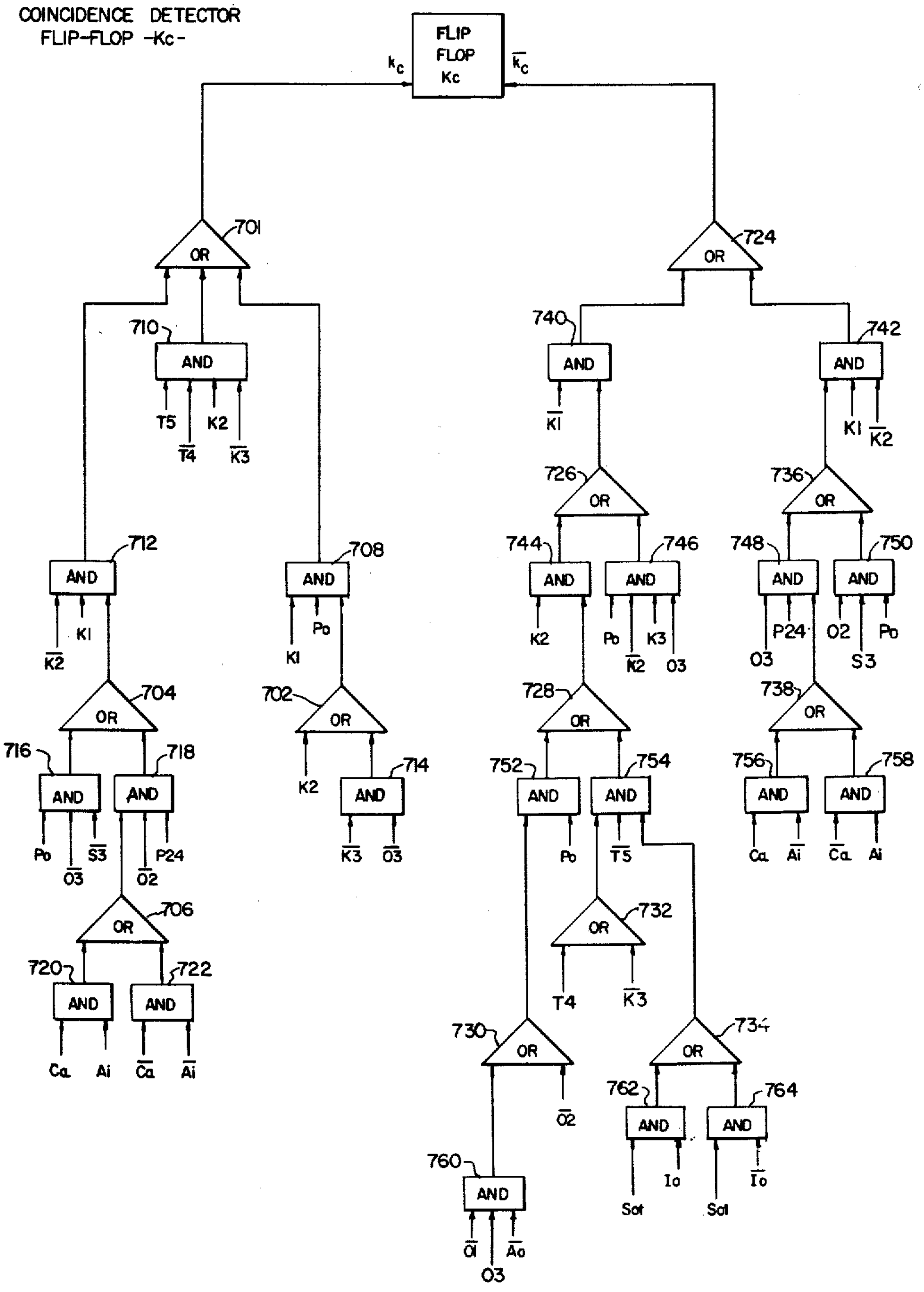
FIGURE 14 illustrates a coincidence detector flip-flop which is used in the computer, and the logic associated with that flip-flop is also illustrated.

The logic associated with the coincidence detector flip-flop $K_c$ of FIGURE 8 is illustrated in FIGURE 14. The left input terminal ($k_c$) of the flip-flop has a plurality of "or" gates 701, 702, 704 and 706 associated with it, and that input terminal has a plurality of "and" gates 708, 710, 721, 741, 716, 718, 720 and 722 also associated with it. The "and" gates and "or" gates are connected to one another and to the left input terminal of the flip-flop in the manner illustrated in FIGURE 14 and in accordance with the following logic equations:

$$k_c=P0\overline{K}1(K2+\overline{K3}.\overline{O3})+T5.\overline{T4}.K2,$$
$$K3+K1.\overline{K2}(P0.\overline{O3}.\overline{S3}+\overline{O2}.\overline{Fa}.P24)$$

The right input terminal ($\overline{k}_c$) of the flip-flop ($Kc$) has a group of "or" gates 723, 726, 728, 730, 732, 734, 736 and 738 associated with it, and that input terminal has a plurality of "and" gates 740, 742, 744, 746, 748, 750, 752, 754, 756, 758, 760, 762 and 764 also associated with it. The latter group of "or" gates and "and" gates are interconnected with one another and to the right input terminal $\overline{k}_c$ of the flip-flop ($Kc$) in the manner illustrated in FIGURE 14 and in accordance with the following logic equation:

$$\overline{k}_c=\overline{K1}\{K2[P0(\overline{O2}+O3+\overline{O1}.\overline{Ao})+F1\overline{T5}(T4+\overline{K3})]$$
$$+\overline{K2}.K3.\overline{O3}.P0\}+K1.\overline{K2}(O3.Fa.P24+O2.S3.P0)$$

Figure 15:
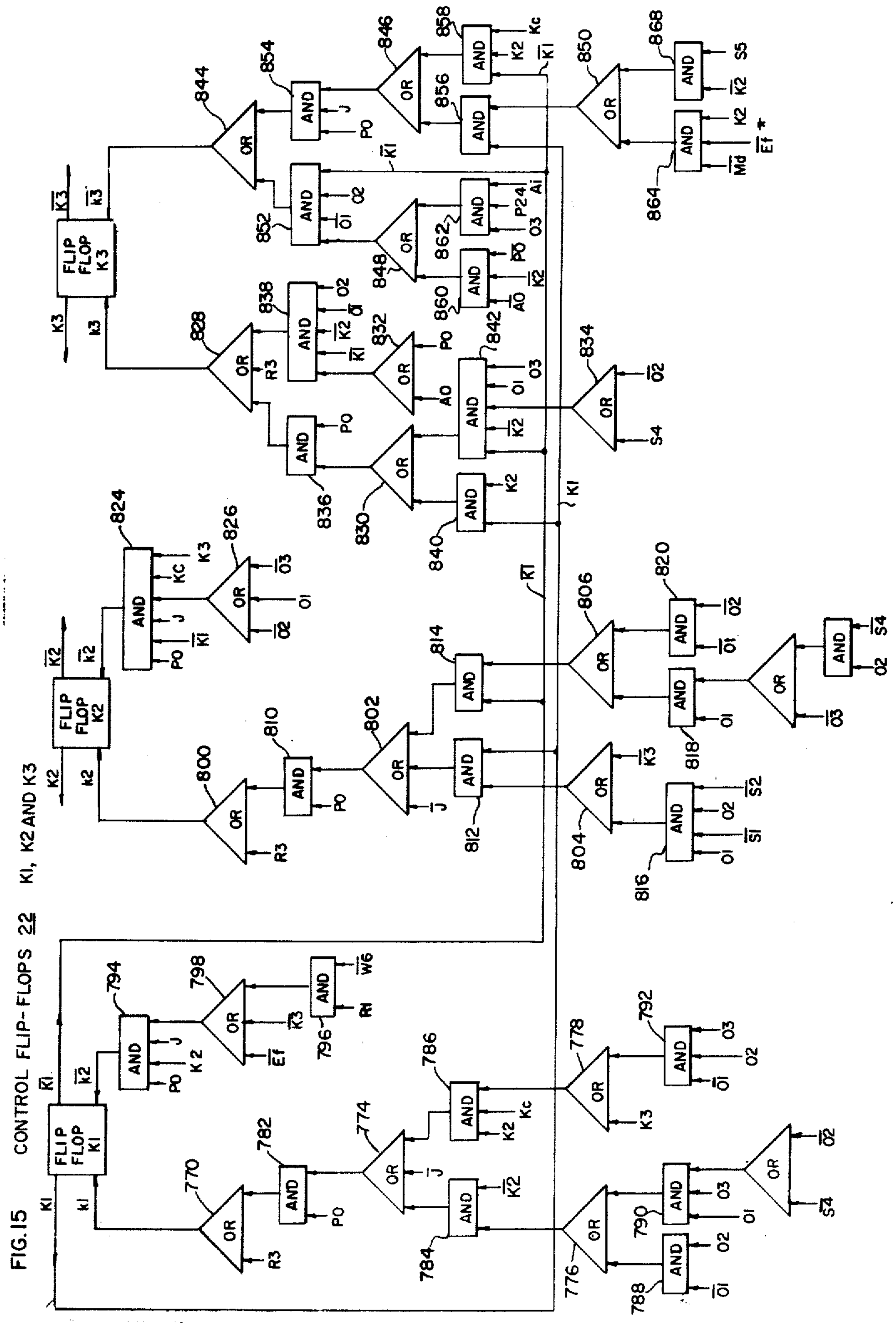
FIGURE 15 illustrates a plurality of control flip-flops which are used in the computer and the logic associated with those flip-flops.

The logic associated with the control flip-flops in the block 22 of FIGURE 8 is illustrated in FIGURE 15. There are three of these flip-flops and they are designated K1, K2 and K3. The input terminal $k_1$ of the flip-flop (K1) has a plurality of "or" gates 770, 774, 776, 778 and 780 associated with it, and that input terminal has a plurality of "and" gates 782, 784, 786, 788, 790 and 792 also associated with it. These "and" gates and "or" gates are connected to one another and to the input terminal $k_1$ of the flip-flop (K1) in the manner illustrated in FIGURE 15 and in accordance with the following logic equation:

$$k_1=R3+P0\{\overline{K2}[\overline{O1}.O2+O1.O3(S4+\overline{O2}]$$
$$+K2.Kc(\overline{K3}+\overline{O1}.O2.O3)+J\}$$

A pair of "and" gates 794 and 796, and an "or" gate 798 are connected to one another and to the right input terminal ($\overline{k}_1$) in the manner illustrated in FIGURE 15 and in accordance with the following logic equation:

$$\overline{k}_1=P0.J(\overline{E}f+R1.\overline{W6}+\overline{K3})K2$$

A plurality of "or" gates 800, 802, 804, 806 and 808, and a pluralityy of "and" gates 810, 812, 814, 816, 818, 820 and 822 are connected to one another and to the input terminal $k_2$ of the flip-flop (K2) in the manner illustrated in FIGURE 15 and in accordance with the following logic equation:

$$k_2=R_3+P0\{J+K2(\overline{K3}+O1.O2.\overline{S2}.\overline{S1})$$
$$+K1[O1(\overline{O3}+O2.\overline{S4})+\overline{O1}.\overline{O2}]\}$$

An "and" network 824 and an "or" network 826 are connected to one another and to the input terminal $\overline{k_2}$ of the flip-flop (K2) in accordance with the following logic equation:

$$\overline{k_2}=\overline{K1}.K3.Kc.J(\overline{O3}+O1+\overline{O2})P0$$

A plurality of "or" networks 828, 830, 832, and 834, and a plurality of "and" networks 836, 838, 840 and 842 are connected to one another and to the input terminal $k_3$ of the flip-flop ($K_3$) in accordance with the following logic equation:

$$k_3=R_3+P0\{J+K1.K2+\overline{K1}.\overline{K2}.O1.O3(S4+\overline{O2})\}+\overline{K1}.\overline{K2}.\overline{O1}.O2[Ao+P0]$$

A plurality of "or" gates 844, 846, 848, and 850, and a plurality of "and" gates 852, 854, 856, 858, 860, 862, 864 and 866 are connected to the input terminal $\overline{k_3}$ of the flip-flop (K3) in accordance with the following logic equation:

$$\overline{k_3}=\overline{K1}.\overline{O1}.O2[\overline{Ao}.\overline{K2}.\overline{P0}+O3.Ai.P24]+P0\{K1[\overline{K2}.S5+Md.K2.\overline{Ef^*}]+\overline{K}1.K2.Kc\}J$$

Figure 16:
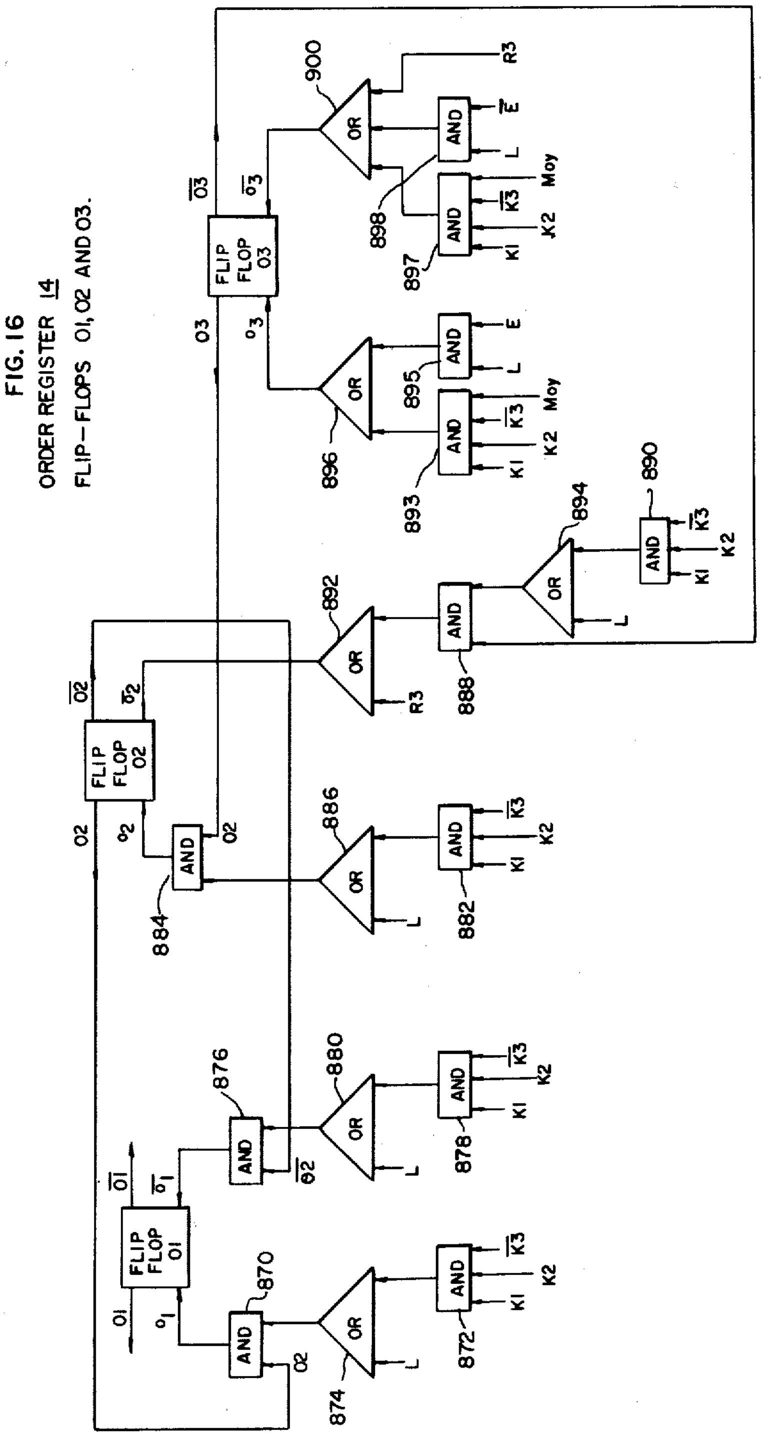
FIGURE 16 is an illustration of an order register which is included in the computer and which includes a plurality of flip-flops.

The logic included in the order register 14 of FIGURE 8 is illustrated in FIGURE 16. As noted above, this register contains three flip-flops which are designated O1, O2 and O3.

A pair of "and" gates 870 and 872 and an "or" gate 874 are connected in a logic circuit to the input terminal $o_1$ of the flip-flop (O1). The input terminal $\overline{o_1}$ of that flip-flop has a pair of "and' gates 876 and 878 and an "or" gate 880 associated with it.

Likewise, a pair of "and" gates 882 and 884, and an "or" gate 886 are connected in a logic circuit to the input terminal $o_2$ of the flip-flop (O2). Similarly, a pair of "and" gates 888 and 890, and a pair of "or" gates 892 and 894 are connected to one another and to the input terminal $\overline{o_2}$ of the flip-flop (O2).

A pair of "and" gates 893 and 895, and an "or" gate 896 are connected in a logic circuit to the input terminal $o_3$ of the flip-flop (O3). A pair of "and" networks 896 and 898, and an "or" network 900 are connected in a logic circuit to the input terminal $\overline{o_3}$ of the flip-flop (O3).

The "and" gates and the "or" gates associated with the flip-flops O1, O2 and O3 are connected to those flip-flops and to one another in the manner illustrated in FIGURE 16, and in accordance with the following logic equations:

$$0_1=(K1.K3.\overline{K3}+L)O2$$
$$\overline{o_1}=(K1.K2.\overline{K3}+L)\overline{O2}$$
$$o_2=(K1.K2.K3+L)O3$$
$$\overline{o_2}=(K1.K2.\overline{K3}+L)\overline{O3}+R3$$
$$o_3=(K1.K2.\overline{K3}.Moy+L.E.)$$
$$\overline{o_3}=(K1.K2.\overline{K3}.\overline{Moy}+L.\overline{E}.+R3)$$

As mentioned in conjunction with FIGURE 9, the memory unit includes a track selector register 700 which controls the selection matrix 16 of FIGURE 7. The logic circuitry incorporated in the track selector register 700 is set out in FIGURE 17. As noted above, this register includes a group of five flip-flops which are designated S1, S2, S3, S4 and S5.

An "or" network 900 is connected to the input terminal $s_1$ of the flip-flop (S1) and a pair of "and" networks 902 and 904 are connected to the "or" network 900. An emitter follower ($F_S$) is connected to the "and" gate 904. The components described above are connected to one another and to the input terminal $s_1$ of the flip-flop (S1) in accordance with the following equation:

$$s_1=K1.\overline{K}2.K3.Ao.\overline{O}2+S2.FS$$

A plurality of "or" gates 906, 908, and 910 and a plurality of "and" gates 912, 914, 916, 918, and 920 are connected to one another and to the emitter follower (F*s*). These "and" gates and "or" gates are connected in accordance with the following equation:

$$f_s=\overline{K3}.\overline{T4}.\overline{K1}.\overline{K2}+K1.K2\overline{T4}.\overline{K3}+T4(T3+T1.T2)TS$$

A pair of "and" gates 922 and 924 are connected to an "or" gate 926, the "or" gate being connected to the input terminal $\overline{s_1}$ of the flip-flop S1. These latter components are connected in the manner illustrated in FIGURE 17 and in accordance with the following logic equation:

$$\overline{s_1}=K1.\overline{K2}.K3.\overline{Ao}.\overline{O2}+\overline{S2}.FS$$

The input terminal $s_2$ of the flip-flop (S2), and the input terminal $s_2$ of that flip-flop have a plurality of "or" gates and "and" gates connected to them, these gates being designated as 928, 930, 932, 934, 936, 938, 940, 942, 944, and 946. The gates associated with the input terminals of the flip-flop (S2) are connected in a logic circuit in the manner illustrated in FIGURE 17 in accordance with the following logic equations:

$$s_2=Do\overline{K2}[\overline{K1}.\overline{O2}.P0+K1.K3(\overline{O2}+\overline{O3})]+S3Fs$$
$$\overline{s_2}=\overline{Do}.\overline{K2}[\overline{K1}.\overline{O2}.P0+\overline{K1}.\overline{K3}(\overline{O2}+\overline{O3})]+\overline{S3}.Fs$$

A plurality of "and" gates and "or" gates 948, 950, 952, 954, 956, 958, 960, 962, 964 and 966 are connected to one another and to the input terminal $s_3$ of the flip-flop (S3). Similarly, a plurality of "and" gates and "or" gates 968, 970, 972, 974, 976, 978, 980 and 982 are connected together and to the input terminal $\overline{s_3}$ of that flip-flop. The gates associated with the input terminals of the flip-flop (S3) are connected in the logic circuitry illustrated in FIGURE 17 and in accordance with the following logic equations:

$$s_3=\overline{K2}\{K1.\overline{K3}[\overline{O2}.P0(Kc+S4)+\overline{O1}.S4]+\overline{K1}.\overline{O2}.P0\}+S4.Fs$$
$$\overline{s_3}=K1.\overline{K2}.K3\{\overline{S4}(\overline{O2}.\overline{Kc}+\overline{O1})+\overline{O2}.\overline{P0}\}+\overline{S4}.Fs$$

Figure 17:
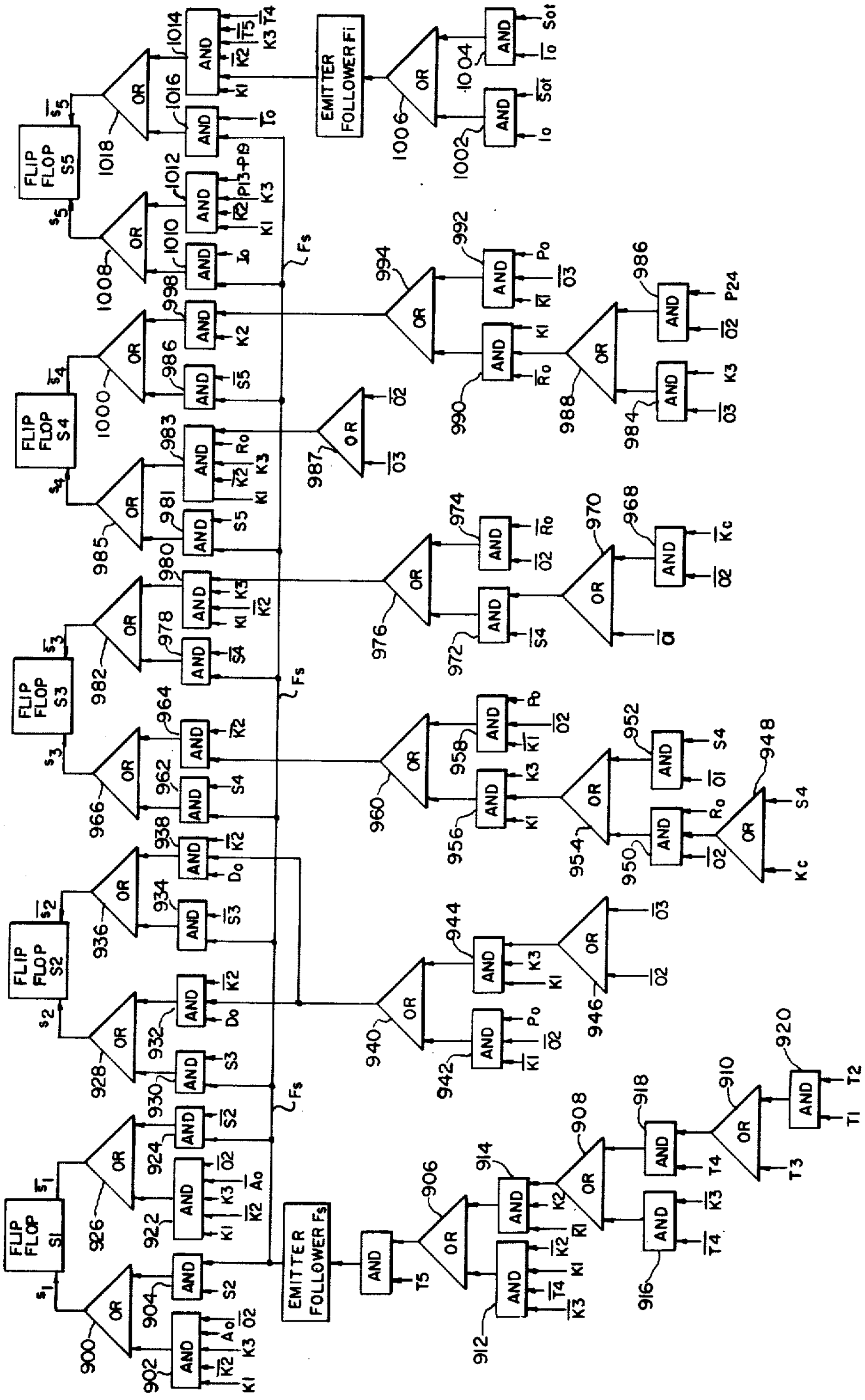
FIGURE 17 is a logic diagram of a track, or channel, selector which is used in the computer in conjunction with the memory unit.

A plurality of "or" gates and of "and" gates 981, 983, 984, 985, 986, 987, 988, 990, 992, 994, 996, 998 and 1000 are logically connected in the manner illustrated in FIGURE 17, and these gates are associated with the input terminal $s_4$ and the input terminal $\overline{s_4}$ of the flip-flop (S4). The latter logic circuitry may be represented by the following logic equations:

$$s_4=K1.\overline{K2}.K3.Ro(\overline{O3}+\overline{O2})+S5.Fs$$
$$\overline{s_4}=\overline{K2}[\overline{Ro}.K1(\overline{O3}.K3+\overline{O2}.P24)+\overline{K1}.\overline{O3}.P0]+\overline{S5}Fs$$

A pair of "and" gates 1002 and 1004, and an "or" gate 1006 are connected to an emitter follower (F*i*) in the manner illustrated in FIGURE 17 and in accordance with the following logic equation:

$$f_i=Io.\overline{Sot}+\overline{Io}.Sot$$

The input terminals $s_5$, $\overline{s_5}$ of the flip-flop (S5) have the following "and" gates and "or" gates associated with them, these gates being designated as 1008, 1010, 1012, 1014, 1016 and 1018. The gates are interconnected in a logic circuitry in accordance with the following equations:

$$s_5=K1.\overline{K2}.K3(P9-P13)+Io.FS$$
$$s_5=K1.\overline{K2}.K3.Fi.\overline{T5}.\overline{Tr}+\overline{Io}.FS$$

Figure 18:
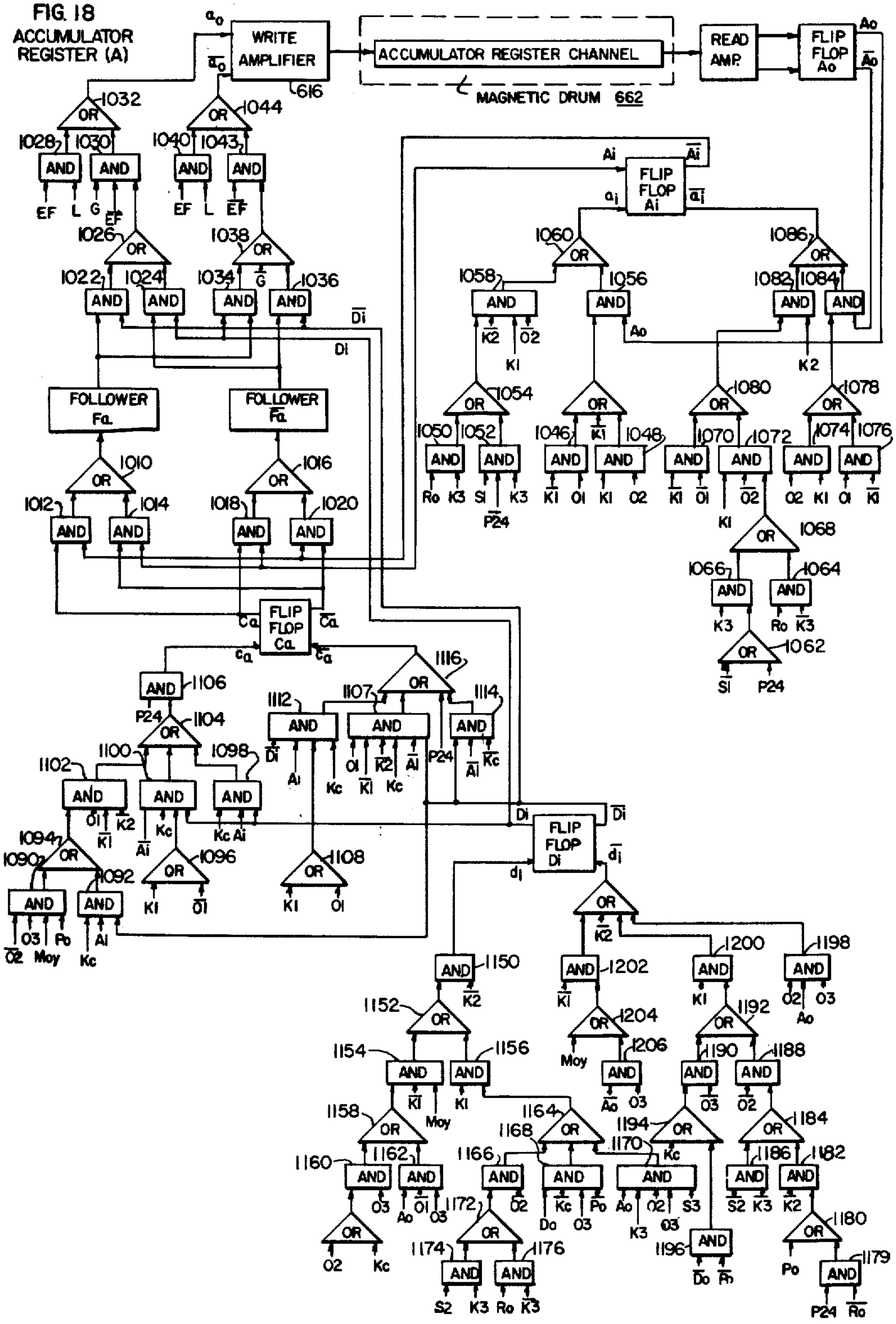
FIGURE 18 is a representation of the accumulator register of the embodiment of the invention to be described.

The accumulator register (A) of FIGURE 10 is set out in more detail in FIGURE 18. As noted above, this register includes a channel on the magnetic drum 662, and it also includes the write amplifier 616, and the read amplifier 608. The accumulator register also includes the flip-flops A*o*, A*i*, D*i* and the carry flip-flop (C*a*). It also time shares the flip-flops (S1) and (K*c*) as noted. The logic associated with the latter flip-flops will be described elsewhere herein. The flip-flop (A*i*) is included to shape the pulses fed into the logic circuitry associated with the write amplifier 616. The channel on the magnetic drum 662 provides a 24-bit delay, and the flip-flop A*i* provides an additional bit delay. Therefore, the accumulator register (A) is capable of circulating a 25-bit computer word.

The accumulator register (A) includes an emitter follower (F*a*) and an emitter follower ($\overline{Fa}$). An "or" gate 1010 is connected to the follower ($Fa$) and a pair of "and" gates 1012 and 1014 are connected to the "or" gate 1010. An "or" gate 1016 is connected to the follower ($\overline{Fa}$), and a pair of "and" gates 1018 and 1020 are connected to the "or" gate 1016. The illustrated components associated with the emitter follows ($Fa$) and ($\overline{Fa}$) are connected in accordance with the following logic equations:

$$f_a=(Ca.\overline{Ai}+\overline{Ca}.Ai)$$
$$\overline{f_a}=(Ca.Ai+\overline{Ca}.\overline{Ai})$$

The write amplifier 616 has a first input terminal designated $a_o$, and it has a second input terminal designated $\overline{a}_o$. An input pulse to the terminal $a_o$ causes the flip-flop ($Ao$) to be triggered true after an interval of 23-bit times. Likewise, an input to the terminal ($\overline{a}_o$ causes the flip-flop ($Ao$) to be triggered false after the 23-bit interval. A plurality of "and" gates and "or" gates 1022, 1024, 1026, 1028, 1030 and 1032 are associated with the input terminal ($a_o$) of the write amplifier 616. A plurality of "and" gates and "or" gates 1034, 1036, 1038, 1040, 1042 and 1044 are associated with the input terminal $\overline{a}_o$ of the write amplifier 616. These logic components are connected in accordance with following logic equations:

$$a_o=G(Fa.\overline{Di}+\overline{F}a.Di)\overline{E}f+Ef.L$$
$$\overline{a}_o=(\overline{G}+Fa.Di+\overline{F}a.\overline{D}i)\overline{E}f+Ef.L$$

A plurality of "and" gates and "or" gates 1046, 1048, 1050, 1052, 1054, 1056, 1058 and 1060 are associated with the input terminal ($a_i$) of the flip-flop ($Ai$). Likewise a plurality of "and" gates and "or" gates 1062, 1064, 1066, 1068, 1070, 1072, 1074, 1076, 1078, 1080, 1082, 1084 and 1086 are associated with the input terminal ($\overline{a}_i$) of the flip-flop ($Ai$). These "and" gates and "or" gates are interconnected in the illustrated logic sequence, and in accordance with the following equations:

$$\overline{a}_i=\overline{A}o[K2+\overline{K}1.O1+K1.\overline{O}2]+\overline{K}2\{K1.\overline{O2}[Ro.\overline{K3}+S1.\overline{P24}.K3]\}$$

$$\overline{a}_i=\overline{A}o[K2+\overline{K}1.O1+K1.O2]+\overline{K}2\{K1.\overline{O2}[\overline{R}o.\overline{K}3+K3(\overline{S}1+P24]+\overline{K1}.\overline{O}1\}$$

The flip-flop ($Di$) has its input terminal $d_i$ connected to a plurality of "and" gates and "or" gates 1150, 1152, 1154, 1156, 1158, 1160, 1162, 1164, 1166, 1168, 1170, 1172, 1174 and 1176. Likewise, a plurality of "and" gates and "or" gates 1178, 1180, 1182, 1184, 1186, 1188, 1190, 1192, 1194, 1196, 1198, 1200, 1202, 1204 and 1206 are associated with the input terminal $\overline{d}_i$ of that flip-flop. The gates associated with the input terminals $d_i$ and $\overline{d}_i$ of the flip-flop ($Di$) are connected in accordance with the following logic equations:

$$d_i=KL(K1.Moy[\overline{O}3(\overline{O}2+Kc)+AD.\overline{O}1.O3]+K1(\overline{O}2[S2.K3+Do.\overline{K3}]+Do.\overline{K}c.\overline{O}3.\overline{P}0+Ao.K3.O2.O3.S3)$$
$$\overline{d}_i=K2+\overline{K1}(\overline{M}oy+\overline{A}o.O3+K1)\overline{O3}[\overline{D}o.\overline{P0}+Kc]+\overline{O}2[K3.\overline{S}2+\overline{K}3(P0+P24.Ro)]+Ao.O2.O3$$

The carry flip-flop ($Ca$) has a plurality of "and" gates and "or" gates 1090, 1092, 1094, 1096, 1098, 1100, 1102, 1104, and 1106 associated with its input terminal $c_a$. This flip-flop has a plurality of "and'" gates and "or" gates 1108, 1110, 1112, 1114 and 1116 associated with its input terminal $\overline{c}_a$. The gates are interconnected in accordance with the following logic equations, and as illustrated in FIGURE 18:

$$c_a=\overline{P}24\{\overline{K1}.\overline{K2}.O1(\overline{O2}.O3.Moy.P0+Kc.Ai.\overline{Di})+Kc.\overline{A}i.Di(K1+\overline{O}1)+\overline{Kc}.Ai.Di\}$$
$$\overline{c}_a=P24+\overline{K1}.\overline{K2}.O1.Kc.\overline{Ai}.Di+Kc.Ai.\overline{Di}(K1+\overline{O1})+Kc.\overline{Ai}.\overline{Di}$$

The logic circuitry of the multiplicand and divisor register (D) of FIGURE 10 is shown in FIGURE 19. This register incorporates a channel on the magnetic drum 662, as described above (FIGURE 7), and this channel provides a 24-bit delay for the register.

The write amplifier 620 has its first input terminal $d_o$ connected to a logic control circuit. This logic circuit includes a plurality of "and" networks and "or" networks 1120, 1122, 1124, 1126, 1128, 1130, 1132 and 1134. Similarly, the input terminal $\overline{d_o}$ of the write amplifier is associated with a plurality of "and" gates and "or" gates 1136, 1138, 1140, 1142, 1144, 1146, 1148 and 1150.

The logic control circuitry associated with the write amplifier 620 is shown in FIGURE 19, and that circuitry functions in accordance with the following logic equations:

$$d_o=\overline{K}2.K1[S2(O3+P0)+O3.Do.P0]+K1.Moy+Ef.Io$$
$$\overline{d}_o=\overline{K}2.K1[\overline{S}2(O3+P0)+\overline{O}3.\overline{D}o.\overline{P}0]+\overline{K}1.Moy+Ef.\overline{I}o$$

The multiplier and quotient register (R) of FIGURE 12 is set out in more detail in FIGURE 20. As described in conjunction with FIGURE 7, this register includes a channel on the magnetic drum 662. This channel provides a 25-bit delay, so that a 25-bit computer word may be circulated through the register and through the flip-flop ($Ro$).

The write amplifier 622 has a plurality of "and" gates and "or" gates 1210, 1212, 1214, 1216, 1218, 1220, 1222 and 1224 associated with its input terminal $r_o$. This amplifier has a further plurality of "or" gates and "and" gates 1228, 1230, 1232, 1234, 1236, 1238 and 1240 associated with its input terminal $\overline{r}_o$.

The "and" gates associated with the amplifier 662 are connected in the logic circuit illustrated in FIGURE 20 and in accordance with the following equations:

$$r_o=\overline{K}2.K1\{S3.\overline{P24}+O3(S3+\overline{S4}.Ro)\}+\overline{K}1.\overline{O3}.K3$$
$$\overline{r}_o=[K1.\overline{O}3(P24+\overline{S}3)+\overline{K}1.\overline{K}3+O3.\overline{S}3(S4+\overline{R}o)]\overline{K}2$$

Figure 21:
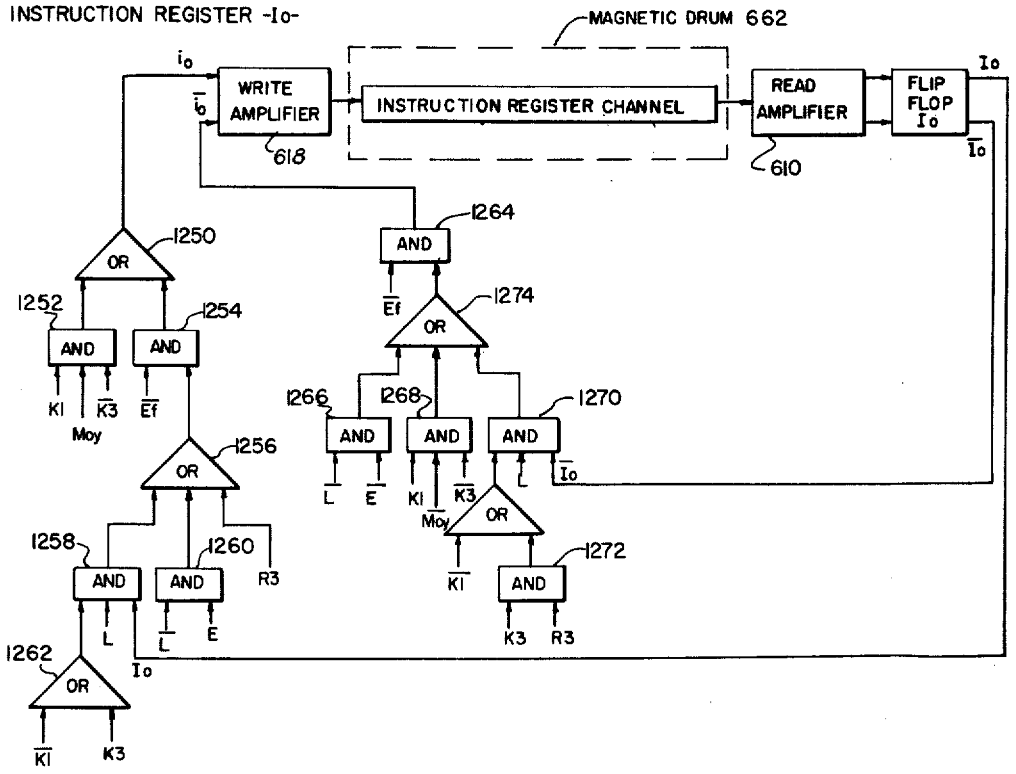
FIGURE 21 is a representation of the instruction register of the computer.

The instruction register (I) of FIGURE 8 is illustrated in FIGURE 21. As described in conjunction with FIGURE 7, this register includes a channel on the magnetic drum 662. The channel on the drum provides a 25-bit delay, so that a 25-bit word may be circulated through the register, and through a recirculating path including the flip-flop ($Io$).

The input terminal $i_o$ of the write amplifier 618 has a plurality of "or" gates and "and" gates 1250, 1252, 1254, 1256, 1258, 1260 and 1262 associated with it. The input terminal $\overline{i}_o$ of the write amplifier 618 has a plurality of "and" gates 1264, 1266, 1268, 1270 and 1272, and a pair of "or" gates 1274 and 1276 associated with it. The "and" gates and "or" gates associated with the write amplifier 618 are connected in accordance with the following logic equations:

$$i_o=K1.\overline{K}3.Moy+\{L(\overline{K}1+K3)Io+\overline{L}.\overline{E}.\}\overline{E}f+R3$$
$$\overline{i}_o=\{\overline{L}.\overline{E}.+K1.K3.\overline{M}oy+L(\overline{K}1+K3.\overline{R}3)\overline{I}o\}\overline{E}F$$

Figure 22:
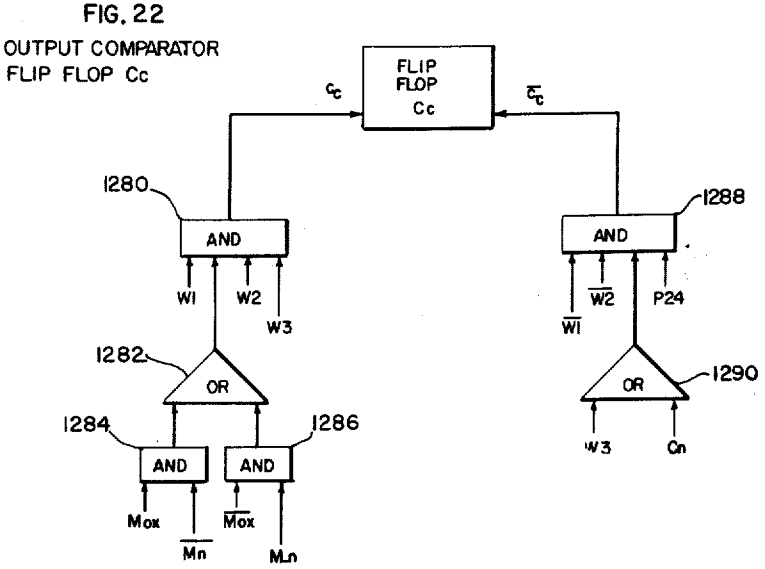
FIGURE 22 shows an output comparator flip-flop which is used in the system of the invention, and the logic associated with that flip-flop is also shown.

The logic associated with the output comparator flip-flop ($Cc$) is shown in FIGURE 22. A plurality of "and" gates and "or" gates 1280, 1282, 1284 and 1286 are connected to the input terminal $c_c$ of the flip-flop in the manner illustrated in FIGURE 22. These gates receive inputs in accordance with the following logic equation:

$$c_c=W1.W2.W3(Mox.\overline{M}n+\overline{Mox}.Mn)$$

In like manner, an "and" gate 1288 is connected to the input terminal $\overline{c}_c$ of the flip-flop ($Cc$), and an "or" gate 1290 is connected to the "and" gate. The input terms of the latter gates are in accord with the following logic equation:

$$\overline{c}_c=\overline{W1}.\overline{W2}.P24(W3+Cn)$$

The logic circuitry associated with the output carry flip-flop ($Cn$) of FIGURE 10 is set out in FIGURE 23. This flip-flop has a plurality of "and" gates and "or" gates 1300, 1302, 1304, 1306, 1308, 1310 and 1312 connected to its input terminal $c_n$. The flip-flop (C$n$) has a plurality of "or" gates and "and" gates 1314, 1316, 1318, 1320, 1322, 1324, 1326, 1328, 1330 and 1332 connected to its input terminal $\overline{c}_n$. The "and" gates and "or" gates referred to above receive input terms in accordance with the following logic equation:

$$c_n = W3.W1\{W2[\overline{M}ox.Mn+P0.Mox.\overline{M}n]+\overline{W}2.Ts.P0.\overline{R}2\}$$
$$\overline{c}_n = (W3+\overline{C}c.\overline{W}1)P24.\overline{W}2 +W2.W3\{Mox.\overline{M}n+P0[Mox.Mn+\overline{W}1]\}$$

The input terms to the write amplifier 604 of FIGURE 7 are set out in FIGURE 24. As mentioned in conjunction with FIGURE 7, this amplifier is associated with the temporary storage channel (M$ov$) of the magnetic drum 662. A plurality of "and" gates and "or" gates 1340, 1342 and 1344 are connected to the input terminal $m_{ov}$ of the write amplifier 604. Likewise, a plurality of "and" gates 1346, 1348 and 1350 are connected to the input terminals $\overline{m}_{ov}$ of the amplifier. These "and" gates and "or" gates receive input terms in accordance with the following logic equations:

$$m_{ov} = \overline{K}2.02.03.Ao.\overline{S}4.S1+W1.W2.\overline{W3}.\overline{Mn}$$
$$\overline{m}_{ov} = K2.02.03.\overline{A}o.\overline{S}4.S1+W1.W2.\overline{W3}.\overline{Mn}$$

The logic associated with the write amplifier 606 of FIGURE 7 is set out in FIGURE 25. As mentioned previously, this amplifier is coupled to the temporary storage channel (M$oz$) of the magnetic drum channel 662. A plurality of "and" gates 1360, 1362 and 1364 are connected to an "or" gate 1366 which, in turn, is connected to the input terminal $m_{oz}$ of the write amplifier 606. Likewise, a pair of "and" gates 1368 and 1370 are connected to an "or" gate 1372 which, in turn, is connected to the input terminal $\overline{m}_{oz}$ of the amplifier 606. The "and" gates receive input terms in accordance with the following logic equations:

$$m_{oz} = \overline{K}2.02.03.Ao.\overline{S}4.S3+Mn.W1.W2.W3 +W1.W2.\overline{W}3.\overline{W}4.\overline{W}5.\overline{W}6.Mn$$

$$\overline{m}_{oz} = \overline{K}2.02.03.\overline{A}o.\overline{S}4.S3+\overline{M}n.W1.W2.W3$$

The logic associated with the write amplifier 602 of FIGURE 7 is illustrated in FIGURE 26. This latter amplier was described in conjunction with FIGURE 7 as being coupled to the temporary storage channel (M$ox$) of the magnetic drum 662. A pair of "and" gates 1380 and 1382 are connected to an "or" gate 1384 which, in turn, is connected to an "and" gate 1386. The "and" gate 1386, and a pair of additional "and" gates 1388 and 1390, are connected to an "or" gate 1392. The "or" gate 1392 is connected to the input terminal $m_{ox}$ of the write amplifier 602.

Likewise, a pair of "and" gates 1394 and 1396 are connected to an "or" gate 1398. The "or" gate 1398 is connected to an "and" gate 1400. The "and" gate 1400, and a pair of "and" gates 1402 and 1404 are connected to an "or" gate 1406. The "or" gate 1406 is connected to the input terminal ($\overline{m}_{ox}$) of the write amplifier 602. The input terminals terms to the "and" gates may be expressed by the following logic equations:

$$m_{ox} = \overline{K}2.Ao.\overline{S}4.S2.O2.O3+Ef.\overline{G} +\{W2.\overline{W}1.W3(Cn.\overline{M}ox+\overline{C}n.Mox\}Ef$$

$$\overline{m}_{ox} = \overline{K}2.O2.O3.\overline{A}o.\overline{S}4.S2+\overline{W}1.W2.W3.\overline{E}f(Cn.Mox +\overline{C}n.\overline{M}ox)+Md.Ef$$

The time standard flip-flop (T$s$) of FIGURE 10 is again illustrated in FIGURE 27. The flip-flop includes a term Y$s$ which is introduced to its input terminal $t_s$. An "and" gate 1410 is connected to the other input terminal $\overline{t}_s$ of the flip-flop. The terms C$n$, P24, W3, W2 and $\overline{W1}$ are all introduced to the "and" gate 1410.

The input-output flip-flop (M$n$) of FIGURE 10 is connected in the manner illustrated in FIGURE 28 to a first set of brushes designated $B_1$–$B_{15}$ of an analog-to-digital converter incorporated in the system, and to a second set of brushes designated $B^*_1$–$B^*_{15}$ of that converter. This converter may be of the dual-brush, non-ambiguous type described in co-pending application Serial No. 836,537, filed Aug. 27, 1959, or any other suitable type of analog-to-digital converter may be used. The flip-flop (M$n$) has a plurality of "and" gates and "or" gates 1420, 1422, 1424, 1426, 1428, 1430, 1432, 1434, 1436, 1438, 1440, 1442, 1444, 1446, 1448, 1450, 1452, 1454, 1456, 1458, 1460, 1462, 1464, 1466, 1468, 1470, 1472, 1474, 1476, 1478, 1480, 1482, 1484 1486 and 1488 associated with its input terminal $m_n$. These "and" gates and "or" gates are connected in the manner shown in FIGURE 28, and they receive input terms in accordance with the following logic equation:

$$m_n = \overline{T4}\{T5[T3(B^*_1\overline{T1}.\overline{T2}+B^*_{10}T1.\overline{T2}+B^*_9.\overline{T1}.T2 +B^*_8.T1.T2)+\overline{T3}.B^*_{12}]+\overline{T5}[T3(B^*_5.\overline{T1}.\overline{T2} +B^*_4.T1.\overline{T2}+B^*_3.\overline{T1}.T2+B^*_2.T1.T2) +\overline{T3}(B^*_7.\overline{T1}+B^*_6.T1)]\}+T4.T5\{T3(B^*_{15}.T1.\overline{T2} +B^*_{14}.\overline{T1}.T2+T1.T2.B^{*13})+\overline{T2}.\overline{T3}(B^*_1.\overline{T1}+B^*_0.T1)\}$$

In like manner, the following "and" gates and "or" gates are associated with the input terminal $m_n$ of the flip-flop (M$n$: 1500, 1502, 1504, 1506, 1508, 1510, 1512, 1514, 1516, 1518, 1520, 1522, 1524, 1526, 1528, 1530, 1532, 1534, 1536, 1538, 1540, 1542, 1544, 1546, 1548, 1550, 1552, 1554, 1556, 1558, 1560, 1562, 1564 and 1566. The latter group of "and" gates and "or" gates receive input terms in accordance with the following logic equation:

$$\overline{m}_n = \overline{T4}\{T5[T3(B11.\overline{T1}.\overline{T2}+B10.T1.\overline{T2}+B9.\overline{T1}.T2 +B8.T1.T2)+\overline{T3}.B12]+\overline{T5}[T3(B5.\overline{T1}.\overline{T2}+B4.T1.\overline{T2} +B3.\overline{T1}.T2+B2.T1.T2)+\overline{T3}(B7.\overline{T1}+B6.T1)]\} +T4.T5\{T2.T3(B14.\overline{T1}+T1.B13) +\overline{T2}.\overline{T3}(B1.T1+B0.T1)\}+P0$$

A block schematic diagram showing the control and memory units of the computer is illustrated in FIGURE 29. The composition of a typical instruction is illustrated in FIGURE 30. The instruction includes an alpha sector number (P8–P3) and an alpha track number (P13–P9) which are used to specify the address of the next instruction. The instruction also includes a beta sector number P24–P19 and a beta track number P18–P14 which are used to specify the address of the operand. The bit times at which the alpha track number and the alpha sector number, and the bit times at which the beta track number and the beta sector number appear in a typical instruction are shown in FIGURE 30. The instruction also includes at the three least significant bit positions P2–P0 the order number. This order number appears in the flip-flops O1, O2 and O3 of the order register 14 of the FIGURE 30, and the resulting configuration of these flip-flops specifies the types of operation to be performed in accordance with the order code of FIGURE 31.

In the schematic diagram of FIGURE 29, the control unit is shown as including the instruction register 12 (flip-flop I$o$) the coincidence detector 20 (flip-flop K$c$), the control flip-flops 22 (K1, K2 and K3), and the order register 14 (flip-flops O1, O2 and O3). A gate 1606 is interposed between the instruction register 12 and the coincidence detector 20.

The memory unit is illustrated in FIGURE 29 as including the track selector register 700 (flip-flops S1–S5). The selection matrix 16, the magnetic memory drum 662, the read amplifier 624, and its associated flip-flop (S$ot$). The (M$oy$) flip-flop of the magnetic memory drum 662 introduces its output signals to a pair of gates 1600 and 1602. These gates are under the control of the control flip-flops (K1, K2 and K3) in the block 22. The gate 1600 is connected to the instruction register 12 and to the order register 14. The gate 1602, on the other hand, introduces its output to the arithmetic unit. The arithmetic unit includes the registers A, D and R.

In a manner to be described, the gate 1600 is controlled by the control flip-flops K1, K2 and K3 in the block 22 to cause successive instructions to be read into the instruction register 12. As the instructions are read into the instruction register, they are concurrently shifted through the order register 14. At the completion of the instruction read-in operation, the last three digits (corresponding to the order code) remain in the order register. The gate 1604 is controlled by the control flip-flops 22 so that the track address of each instruction to be executed may be fed from the instruction register 12 to the track selector register 700 in the memory unit. This latter register causes the selection matrix 16 to select a particular track or channel from the (M*oy*) group on the magnetic memory drum 662.

The gate 1606 passes the sector numbers to the coincidence detector 20, so that the sector numbers from each instruction may be compared with the sector numbers from the (S*ot*) track on the magnetic memory drum 662. This will be described in more detail subsequently.

The gate 1602 is controlled by the control flip-flops K1, K2 and K3 of the block 22 so that selected operands may be passed to the arithmetic unit. The order register 14 then specifies the operations to be performed on these operands in the arithmetic unit.

The instruction code that may typically be used in the computer of the invention is illustrated in FIGURE 31. It will be noted from an examination of the table in FIGURE 31 that the top seven instructions are completely under the control of the three flip-flops O1, O2 and O3 in the order register. The eighth instruction is (S*r*), the normal store order, and it is executed upon an O1.O2.O3 configuration of the order register flip-flops, and when the track selector flip-flop (S4) is set to zero. For this instruction, and for an additional five instructions, the track selector flip-flops are used to obtain an additional group of instructions which are designated generally as "modified store orders."

The modified store orders are carried out when the beta address portion of the instruction is passed by the gate 1604 of FIGURE 29 to the track selector register. For other instructions, this normally would cause an operand to be passed by the gate 1602 to the arithmetic unit. However, for the modified store instruction, the track selector register completes an overall configuration with the order register so that the specified modified store orders may be carried out.

There are seven different phases which may occur in the computer of the invention. However, these seven phases do not all occur for any one operation. The normal sequence in which the phase occurs is as follows:

(1) The wait alpha phase ($W_A$) during which a search is made for the next instruction and for which the control flip-flops, are set to the $\overline{K1}.K2.\overline{K3}$ configuration (FIGURE 32). When these flip-flops are in this configuration, the gate 1604 of FIGURE 29 is opened from P13 to P9 digit times. This enables the flip-flops S1–S5 of the track selector register 700 to be set to a configuration corresponding to the alpha track number in the instruction circulating in the instruction register 12. This, as noted above, is the track number of the next instruction.

Then, the gate 1606 is opened from P8 to P3 digit times for each word time of the instruction circulating in the instruction register, so that the alpha sector number in the instruction circulating in the instruction register may be compared in the coincidence detector 20 with the sector numbers on the (S*ot*) channel of the memory drum 662. When coincidence occurs, the coincidence flip-flop (K*c*) causes the control flip-flop (K1) to be triggered true so that the computer enters its next phase for an interval corresponding to the following sector on the drum. This is the "instruction read-in (I*r*) phase."

It should be noted that when the computer is first placed in operation, the instruction register is cleared so that each of its positions exhibits a "1" numeral. This causes the track address set up in the track selector register 700 and the sector address introduced to the coincidence detector 20 to be such that the first instruction will always be found in sector 0 of (M*oy*) channel 31.

(2) The second phase of the computer is, as noted above, the "instruction read-in phase (I*r*)." During the instruction read-in phase, the next instruction is read from the selected (M*oy*) track and sector of the magnetic memory drum 662 through the gate 1600 of FIGURE 29 into the instruction register 12. When coincidence is achieved by the detector 20 in the ($W_A$) phase, the control flip-flop (K1) is triggered true, as shown in FIGURE 32. This causes the control flip-flops to have a K1.K2.K3 configuration for this phase. When this occurs, the gate 1600 of FIGURE 29 becomes conductive for one word time to permit the next instruction to be read into the instruction register 12. The instruction also shifts through the flip-flops O1, O2 and O3 of the order register 14, as mentioned previously, and in the end of the (I*r*) phase, the last three digits P2–P0, corresponding to the order code remain in that register. The new instruction now circulates in the instruction register (I), and it continues to circulate until the next time that an instruction read-in phase (I*r*) occurs.

(3) The third phase of the computer is the "wait for beta" ($W_B$) phase. For this latter phase, the control flip-flops are set to a $\overline{K1}.K2.K3$ configuration (FIGURE 32). This causes the gate 1604 of FIGURE 29 to be conductive for P18–P14 digit times of the instruction circulating in the instruction register 12. This, in turn, enables the track number in that instruction to set the flip-flop in the track selector register 700 to a configuration corresponding to the track in the drum 662 in which the desired operand occurs.

Then, the P24–P19 digit time of each word time of the instruction in the instruction register 12, the gate 1606 is rendered conductive. The latter operation enables the beta sector number in the instruction to be compared with the sector numbers in the (S*ot*) channel on the drum. When equality is reached, the control flip-flop (K*c*) is triggered false, the gate 1602 is rendered conductive; and the computer normally enters its first word phase (F*w*) (FIGURE 32) for the following word time during which the selected operand is read into the arithmetic unit.

There are several exceptions to the normal operation of the computer described immediately above. For example, when the operation specified is a conditional transfer ($T_c$) (FIGURE 31) the ($W_B$) phase returns to the ($W_A$) phase at P24 digit time if the contents of the accumulator register (A) are negative. Otherwise the beta address specifies the address of the next instruction, rather than the address of an operand.

Another exception is for a normal store order (S*r*). Here, the beta address of the instruction being executed either specifies where the contents of the accumulator register (A) are to be stored in the memory. For the modified store orders, the beta address further specifies any one of several operations which will be explained.

(4) The further phase of the computer is the "first word (F*w*) phase, as mentioned above. To enter this phase from the third phase ($W_B$), the control flip-flop (K1) is triggered true (FIGURE 32). This occurs when an equality is reached at the coincidence detector 20 between the beta sector number in the instruction circulating through the instruction register 12 and the corresponding numer on the (S*ot*) track on the magnetic drum. Now, as noted above, the gate 1602 of FIGURE 29 opens for one word time and the selected operand flows from the magnetic memory drum to the arithmetic unit. This operand may be from one of the (M*oy*) channels of the drum, or it may be from one of the (M*ox*, M*ov*, M*oz*) channels, as selected by the read amplifier 204 in FIGURE 7 under the control of the selection matrix 16. The amplifier is controlled by the selection matrix in the manner described, and the selection matrix is controlled by the flip-flops in the track selector register 700.

When the selected operand is read in to the arithmetic unit during the (F*w*) phase, an operation is performed on it during this phase. This operation is detected by the configuration the flip-flops O1, O2, and O3 in the order register 14, and in accordance with the order code of FIGURE 31. For the A*t* (clear and transfer), S*u* (subtract) A*d* (add), E*x* (extract) and S*r* (normal store) instructions, the operation is completed in this phase. In the M*u* (multiplication) instruction, the multiplicand is read into the (D) register and the first step of the multiplication is completed, with the result being placed in the accumulator register (A) in this phase (F*w*). In the D*v* (division) instruction, the divisor is read into the (D) register during the (F*w*) phase, and the (R) register is cleared to 0 during this phase. Nothing occurs during the first word (F*w*) phase for the modified store orders.

(5) The fifth phase of operation is the "additional words" (A*w*) phase. The flip-flops K1, K2 and K3 are set to the K1.$\overline{K2}$.K3 configuration (FIGURE 32) for this phase. In this latter phase, the division is completed and all but the last step of multiplication is completed. Moreover, the special operations of the modified store order (FIGURE 31) are completed in this phase.

(6) The sixth phase is the last word (L*w*) phase. The control flip-flops K1, K2 and K3 are set to the K1.$\overline{K2}$.$\overline{K3}$ configuration (FIGURE 32). For this phase, multiplication is completed and the quotient is transferred from the (R) register to the (A) register for division. The relay-set signals, to be described, are still "on" in this phase.

(7) The seventh phase is the "stop" (S*p*) phase. In this phase, the control flip-flops K1, K2 and K3 are set to the K1.K2.K3 configuration (FIGURE 32). For the latter phase, all computing is terminated, and the computer is turned "off" if the control switch is in the "off" position.

The configurations of the control flip-flops K1, K2 and K3 in the block 22 for the seven different computer phases, and the possible sequences of the phases, are represented by the diagram of FIGURE 32. As described above, the "wait alpha" phase ($W_A$) is represented by the configuration $\overline{K1}$.K2.$\overline{K3}$; the "instruction read-in" phase (I*r*) is represented by the configuration K1.K2.$\overline{K3}$; the "wait beta" phase ($W_B$) is designated by the configuration $\overline{K1}$.K2.K3; the "first word" phase (F*w*) is represented by the configuration $\overline{K1}$.$\overline{K2}$; the "additional words" phase (A*w*) is represented by the configuration K1.$\overline{K2}$.K3; the "last word" phase (L*w*) is represented by the configuration K1.$\overline{K2}$.$\overline{K3}$; and the "stop" phase (S*p*) is represented by the configuration K1.K2.K3. For the "first word" phase (F*w*) only the flip-flops K1 and K2 are used, as the flip-flop K3 is used during this phase in the accumulator register (A) to delay the feed of the flip-flop (A*o*) of the accumulator register into the (R) register during the first word of a multiplication instruction.

The transition from the "wait alpha" ($W_A$) phase to the "instruction read-in" (I*r*) phase occurs at the end of the word time at which the alpha sector address in the instruction register 12 is equal to the number on the sector address channel (S*ot*). This is shown by the fact that the coincidence flip-flop (K*c*) in the coincidence detector 20 is still high at P0 digit time. During the digit times (P18–P9) inclusive, of the "wait alpha" ($W_A$) phase, the alpha track number of the instruction in the instruction register is read into the track selector flip-flops (S1–S5) of the track selector register 700 of the FIGURE 29, as described above. This causes the selection of matrix 16 to select the desired (M*oy*) channel of the magnetic memory 662 for the next instruction, so that the instruction can be read from the selected sector of that channel into the instruction register 12 through the gate 1600 during the (I*r*) phase.

The alpha track number is placed ahead of the alpha sector number in the instruction (FIGURE 30), so as to provide the channel selection matrix 16 of FIGURE 29 with more time to switch into circuit the read head associated with the desired track of the magnetic memory drum 662. The beta track number is also read into the track selector flip-flops of the register 700 during the ($W_A$) phase. However, this latter number is shifted out during the digit times P13–P9 as the alpha track number is read in, and the alpha track number remains in the track selector register 700 for this phase.

During the (I*r*) phase, the next instruction is read into the instruction register 12, as described above, and its last three digits P2, P1 and P0 (which contain the order code) are read into the flip-flops O1, O2 and O3 of the order register 14 of FIGURE 29. The instruction is read into these registers in one word time, so that the (I*r*) phase proceeds to the ($W_B$) phase at the end of one word time.

The ($W_B$) phase returns to the ($W_A$) phase for the conditional transfer order (T*c*) (FIGURE 31) if the contents of the accumulator register (A) is negative. This latter sequence occurs at P24 digit time if the flip-flop (A*i*) is true. So that, if the accumulator register (A) contains a negative number, the ($W_B$) phase lasts for only one bit time with a (T*c*) order. The comparison of the beta address is started during this operation, but since the control returns to the ($W_A$) phase before the alpha address occurs, it does not affect this operation. As noted above, the previous contents of the track selector register 700 are shifted out of that register during (P13–P9) digit times as the alpha address is read into register. This is the only circumstance under which the phase of the computer changes at a time other than P0 digit time.

The "wait beta" ($W_B$) phase of the computer returns to the "instruction read-in" (I*r*) phase for a conditional transfer (T*c*) operation at the end of the word in which the data address in the instruction compares with the sector address channel number. This is indicated by the flip-flop (K6) being true at the end of the word. During the digit times (P18–P14) the contents of the instruction register 12 are read into the track selector flip-flops (S1–S5) of the register 700 so that the next instruction is read from the track and sector specified by the beta address of the instruction circulating in the instruction register.

The "wait beta" ($W_B$) phase of the computer goes to the 'first word" (F*w*) phase for all instructions except the conditional transfer instruction (T*c*), and this occurs at the end of the word in which the beta address sector number of the instruction compares in the coincidence detector 20 with the sector address channel number (S*ot*). This again is signified by the flip flop (K*c*) in the coincidence detector being true at P0 digit time. The track selector flip-flops are set during the (P18–P14) digit times.

The "first word" (F*w*) phase lasts for one word time only, and the computer returns to the "wait alpha" ($W_A$) phase at the end of the following instructions: A*d*, A*t*, S*u*, E*x*, and normal S*r* (see table of FIGURE 31).

As will be explained, a normal store order (S*r*) is specified by a 0 in the fourth digit of the beta track number in the instruction circulating in the instruction register, this being contained in the flip-flop (S4) during the "first word" (F*w*) phase. The "first word" (F*w*) phase of the computer goes to the "additional words" (A*w*) phase at the end of one word time for the following orders: M*u*, D*v* and modified S*r* (see table of FIGURE 53). A modified store order is specified by a 1 in the fourth digit of the beta track number in the instruction circulating in the instruction register, which is contained in the flip-flop S4 during the "first word" (Fw) phase.

The "additional words" (Aw) phase of the computer goes to the "stop" (Sp) phase on certain ones of the modified store orders (S1 and Sr), these being denoted by a given track number with a store order code as shown by the table of FIGURE 31. The "additional words" (Aw) phase of the computer goes to the "last word" (Lw) phase, for all the modified store orders except the special stop orders, at the end of the word time specified by the alpha sector address contained in the instruction circulating in the instruction register.

The arithmetic section of the computer is made up of three one-word recirculating registers A, D and R, two delay flip-flops (Ai) and (Di), and a serial adder with a carry flip-flop (Ca), as described above. Some of the control flip-flops K1, K2 and K3, and some of the track selector flip-flops S1–S5 are also used in the arithmetic section of a time shared basis, as will be described.

The accumulator register (A) of FIGURE 18 stores the results of all operations performed by the adder included in the logic associated with the write amplifier 616 of FIGURE 18. Therefore, the accumulator register contains at the end of the "first word" phase (Fw) the results of the following instructions: Ad, Su, At, and Ex; these instructions being listed in the table of FIGURE 31. In multiplication, the accumulator register (A) stores the sum of all partial product terms which have been generated during the operation, so that when the multiplication operation is completed, the product is contained in the (A) register. In division, the dividend is in the accumulator register (A) at the beginning of the operation, and during the "additional words" phase (Aw) this register contains the remainder at the end of each step; finally, during the "last word" (Lw) phase the quotient is transferred to the accumulator register (A) from the multiplier register (R).

As mentioned above, the accumulator register (A) includes twenty-four binary bits on the magnetic drum 662 itself and one bit in the Ai flip-flop, so that one computer word may be circulated in the register. The accumulator register (A) recirculates its contents through the adder through all phases and operations which do not generate a new result.

The multiplicand and divisor register (D) of the FIGURE 19 is twenty-four bits long on the magnetic drum, and it is used to store the multiplicand during the multiplication operation (Mu), or the divisor during the division operation (Dv). Recirculation in this register is obtained by using the track selector flip-flop (S2) for these two operations. The register (D) is filled during the "first word" (Fw) phase of the computer and recirculated during the "additional words" (Aw) phase for these operations.

The multiplier and quotient register (R) of FIGURE 20 is twenty-four bits long on the magnetic drum, and it is used to store the multiplier during the multiplication operation, or the quotient during the division operation. During the "first word" (Fw) phase of the multiplication instruction, the multiplier is transferred from the accumulator register (A) through the control flip-flop (K3). This is the only time that the flip-flop (K3) is time shared in the arithmetic section. During the "additional words" (Aw) phase of the multiplication instruction, the multiplier and quotient register (R) recirculates its contents through two of the track selector flip-flops, namely, the flip-flops (S3) and (S4). This causes the multiplier to shift left one bit per word so that the next multiplier digit is available at the proper time.

During the "first word" (Fw) phase of the division (Dv) instruction, the multiplier and quotient register (R) is cleared to "0." Then, during the "additional words" (Aw) phase it receives a "1" at (P24) digit time and it retains the 0's at each bit position from (P 23) through (P1) digit time. At (P0) digit time, the contents of the register (R) again receives a "1." This latter "1" acts as an index digit to tell when to write the quotient digit into the register (R).

Two track selector flip-flops, namely the flip-flops S3 and S4, are used to recirculate the previous quotient digits in the multiplier and quotient register (R) and to control the insertion of the new quotient digit. The flip-flop (S3) is now used to delay the quotient digits one bit to make the register (R) look like a twenty-five bit word. This keeps the quotient from shifting so that each digit remains in the position where it was inserted. By doing this it is possible to terminate the operation at any time and have the quotient in the proper position for storage in the memory.

The 0's preceding the index digit and the index digit are recirculated without delay in the register (R) so that the index digit shifts one bit to the right for each word. This shifting index digit then tells where to insert the quotient digit. The flip-flop (S4) is used as a control to sense the index digit and control whether the output from the flip-flop (Ro) is to be recorded or if the output from the flip-flop (S3) is to be recorded. The flip-flop (S4) is triggered false at P24 digit time, and it is triggered true by the index digit. The index digit causes the quotient digit to be copied from the coincidence flip-flop (Kc) into the flip-flop (S3) so that it will be recorded into the multiplier and quotient register (R). After the flip-flop (S4) is set true, the flip-flop (S3) copies the output from the flip-flop (Ro) to recirculate the previous quotient digits in the register (R). This process continues from the second word time of the "additional words" phase through the remaining word times of that phase. During the "last word" (Lw) phase of the division instruction, the quotient is transferred to the accumulator register (A) along with a final correction term with proper rounding of the quotient.

The components and connections required to execute the (At) instruction are shown in FIGURE 33. As listed in the table of FIGURE 31, this instruction is executed upon an $\overline{01}.\overline{02}.\overline{03}$ configuration of the order register flip-flops. The (At) instruction requires that the accumulator register (A) be cleared and that the contents of the designated (Moy) location be transferred to the accumulator register. The (At) instruction is executed during the "first word" (Fw) phase of the computer, for which the control flip-flops K1 and K2 have the $\overline{K1}.\overline{K2}$ configuration. The operation is completed in one word time, and the components return to the "wait alpha" ($W_A$) phase at the end of the "first word" (Fw) phase, so that a search may be made for the next instruction.

For the instruction (At), the accumulator register is cleared of its previous contents by setting the flip-flop (Ai) to all zeros during this operation. The contents of the selected (Moy) channel and sector are passed through the read flip-flop (Moy) to the flip-flop (Di). The outputs of the flip-flops (Ai) and (Di) are both read into the adder. This causes the contents of the selected (Moy) channel and sector to be passed through the adder (added to zero) into the accumulator register (A). At the end of the word time, the computer returns to the "wait-alpha" ($W_A$) phase and the flip-flop (K2) is triggered true. This completes the circulating loop from the flip-flop (Ao) to the flip-flop (Ai) and the new contents of the register are circulated.

As illustrated in FIGURE 33, the read flip-flop (Ao) is coupled through the term (K2) to the input terminals of the flip-flop (Ai). The output terminals of the flip-flip (Ai) are connected to the adder which, in turn, is connected to the input terminals Ao and $\overline{Ao}$ of the write amplifier 616.

The selected (Moy) channel on the magnetic drum has its contents read through the read amplifier 204 to the read flip-flop (Moy). The output terminal Moy of the flip-flop is coupled by the term $\overline{K1}.\overline{K2}.\overline{02}.\overline{03}$ to the input terminal $d_1$ of the flip-flop (D*i*). The term $\overline{K1}$ couples the output terminal $\overline{Moy}$ to the input terminal $\overline{d}_1$ of the flip-flop (D*i*). The output terminals of the flip-flops (A*i*) and (D*i*) are all connected to the input terminals of the adder, as mentioned above.

The carry flip-flop (C*a*) is also connected to the adder. The term $\overline{Kc}.Ai.\overline{P24}$ couples the output terminal D*i* of the flip-flop (D*i*) to the input terminal $c_a$ of the carry flip-flop (C*a*). Likewise, the term $\overline{Kc}.\overline{Ai}$ couples the output terminal $\overline{Di}$ of the flip-flop (D*i*) to the input terminal $\overline{c}_a$ of the carry flip-flop (C*a*). The term P24 is also introduced to the input terminal $\overline{c}_a$.

The term K1.D*i* couples the output terminal $\overline{K2}$ of the flip-flop (K2) to the input terminal $\overline{a}_i$ of the flip-flop (A*i*). The term $\overline{K1}.\overline{O1}.\overline{O2}.P0$ is introduced to the input terminal $k_2$ of the flip-flop (K2). The term P0.K2 is introduced to the input terminal $\overline{k}_2$ of the flip-flop (K2).

The adder introduces the term $$(Ai.\overline{Ca}+\overline{Ai}.Ca)\overline{Di}+(Ai.Ca+\overline{Ai}.Ca)Di$$

to the input terminal $a_0$ of the write amplifier 616. The adder also introduces the term $$(Ai.\overline{Ca}+\overline{Ai}.Ca)Di+(Ai.Ca+\overline{Ai}.\overline{Ca})\overline{Di}$$

to the input terminal $\overline{a}_0$ of the amplifier 616.

At the end of the wait beta ($W_B$) phase, the flip-flop (K2) is triggered false by the term P0.K2. This breaks the circulating loop of the accumulating register from the flip-flop (A*o*). At this time the flip-flop (A*i*) is false, and for the A*t* instruction, the term $\overline{K1}.\overline{Di}$ is true so that the flip-flop (A*i*) is set to zero during the first word (F*w*) phase of this operation.

During the wait beta ($W_B$) phase, the read amplifier 214 is controlled to select the desired sector of the designated (M*oy*) channel so that during the first word phase (F*w*), the read flip-flop (M*oy*) passes the selected contents to the flip-flop (D*i*). This is accomplished by the term $\overline{K1}.\overline{K2}.\overline{O2}.\overline{O3}$ and the term $\overline{K1}$ are both true during this phase of the A*t* instruction.

The flip-flop (K*c*) is set false for the first word phase (F*w*) of the A*t* instruction by the term $\overline{K1}$.K2.O2.P0 which is true at the end of the ($W_B$) phase. This permits the carry flip-flop (C*a*) to be set false during the first word phase of this instruction, by the P24 term, and to remain false throughout the phase because the A*i* term is always false.

Therefore, the contents of the selected (M*oy*) sector and channel are circulated through the adder and added to zero and then passed to the write amplifier 616 to be circulated in the accumulator register. At the end of the first word phase (F*w*) of this instruction, the flip-flop (K2) is triggered true by the term $\overline{K1}.\overline{O1}.\overline{O2}.P0$. This restores the circulating loop and breaks the connection of the flip-flop (D*i*) from the read flip-flop (M*oy*).

Figures 34, 35:
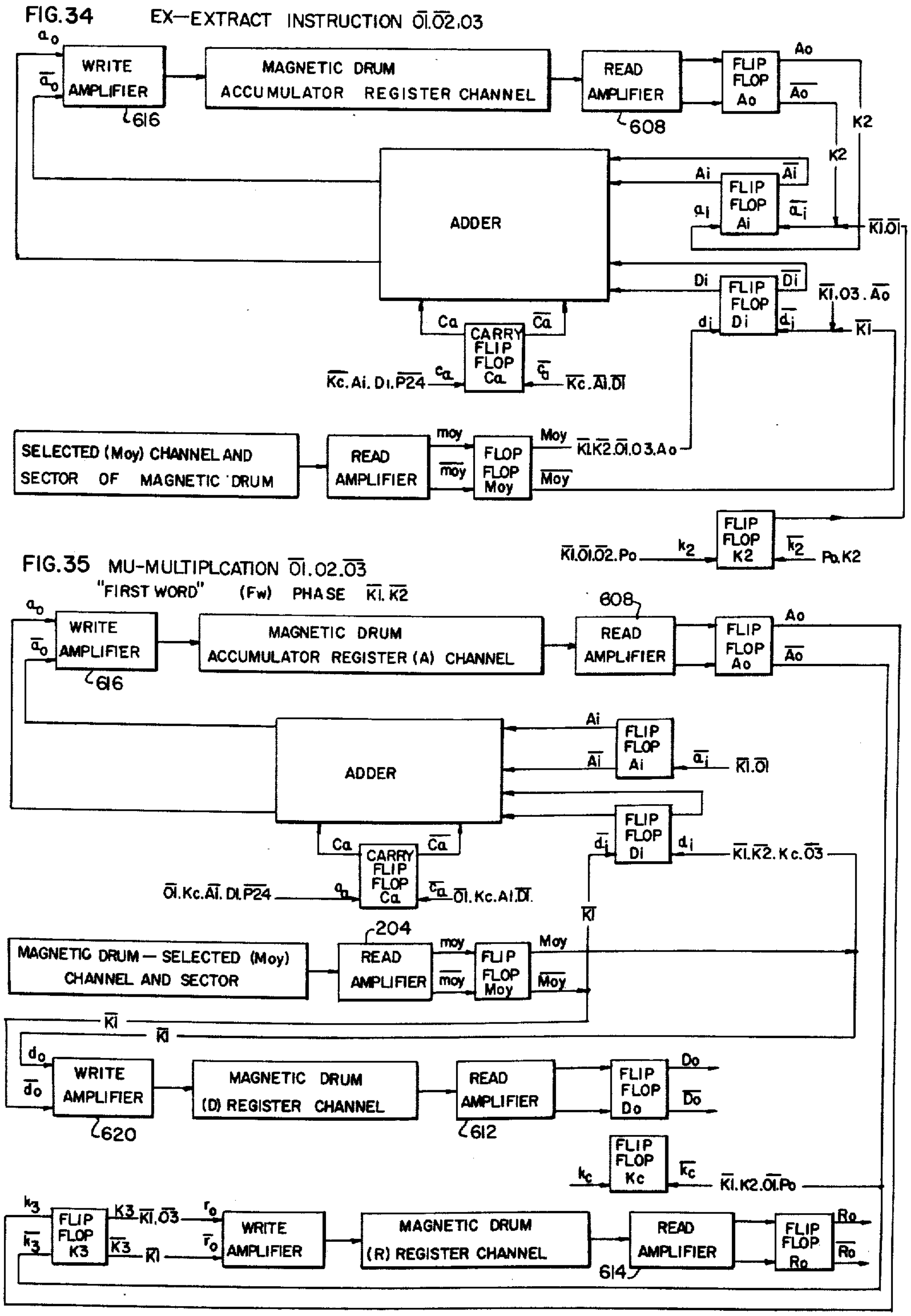
FIGURE 34 is a diagrammatic representation of the components and circuitry required to execute an "extract" instruction.
FIGURES 35, 36, 37 and 38 are logic diagrams of the circuitry required to execute a multiplication instruction.

The components and connections required to execute the E*x* (extract) instruction are shown in FIGURE 34. As listed in the table of FIGURE 31, this instruction is executed upon the $\overline{O1}.\overline{O2}.O3$ configuration of the flip-flops of the order register. The E*x* instruction is normally used to modify other instructions by changing the address portion of such other instruction. The operation calls for writing a "1" in the accumulator register (A) whenever there is a "1" in both the (A*o*) flip-flop and in the (M*oy*) flip-flop; and for writing a "0" in the accumulator register (A) for all other relative conditions of the flip-flops. The E*x* instruction, therefore, represents a masking type of operation. By this operation, data continued in a given part of a word can be selected by a control word which has 1's only in the part of the control word corresponding to the part desired of the other word. The control word can be placed in the memory or in the accumulator register (A) as the two numbers are treated identically.

As with the (A*t*) instruction, the (E*x*) instruction is a one word operation and it is executed during the "first word" (F*w*) phase when the control flip-flops have the $\overline{K1}.\overline{K2}$ configuration. The computer then returns to the wait alpha ($W_A$) phase ($\overline{K1}.K2.\overline{K3}$) so that a search may be made for the next instruction.

For the E*x* instruction, as was the case of the A*t* instruction, the flip-flop (A*i*) is set to all zeros during the first word (F*w*) phase of this operation. The contents of the selected (M*oy*) channel and sector of the magnetic memory drum are passed through the read flip-flop (M*oy*) and are introduced to the flip-flop (A*i*), together with the output of the flip-flop (A*o*), and through an "and" gate. This causes a new word, corresponding to the contents of the register (A) and the contents of the selected (M*oy*) channel and sector, after these contents have been passed by the "and" gate, to be read into the adder and through the adder to the accumulator register write amplifier 616. The "and" word is added to zero in the adder, due to the false state of the flip-flop (A*i*) during the "first word" (F*w*) phase of this operation.

At the end of the word time of the "first word" (F*w*) phase of the E*x* instruction, the flip-flop (K2) is triggered true to return the computer to the "wait alpha" ($W_A$) phase. This breaks the feed of the (A*o*) and (M*oy*) flip-flops to the (D*i*) flip-flop and restores the normal circulating loop of the accumulator register (A) from the (A*o*) flip-flop to the (A*i*) flip-flop. The "anded" word now circulates through the accumulator register (A).

The logic for carrying out the E*x* instruction is set out for the most part in FIGURE 34. Some of the logic required for this operation is the same as that required in FIGURE 33 for carrying out the A*t* instruction and, to avoid repetition, some of the previous logic is not repeated in FIGURE 34.

As shown in FIGURE 34, the flip-flop (K2) is triggered false by the term P0.K2 at the end of the "wait for beta" ($W_B$) phase of the E*x* instruction. This breaks the circulating loop from the A*o* flip-flop to the (A*i*) flip-flop and the term $\overline{K1}.\overline{O1}$ sets the flip-flop (A*i*) false. The computer now enters the "first word" (F*w*) phase of the E*x* instruction. Moreover, the terms $\overline{K1}.\overline{K2}.\overline{O1}.O3$ and $\overline{K1}.O3$ and $\overline{K1}$ become true which permits the flip-flop (A*o*) and the flip-flop (M*oy*) to feed their outputs in an "anded" manner into the (D*i*) flip-flop. The logic is such that a typical "and" gate is formed. That is, the flip-flop (D*i*) is set to "one" if both the terms (A*o*) and (M*oy*) are 1, and it is set to 0 if either of these terms is 0.

The output of the (D*i*) flip-flop as was the case in the execution of the A*t* instruction is introduced to the adder and added to zeros from the flip-flop (A*i*) in the adder. This output from the adder is fed to the input terminals $a_0$ and $\overline{a}_0$ of the write amplifier 616. As before, the adder exhibits "add" logic because the flip-flop (K*c*) is false for the "first word" (F*w*) phase of the E*x* operation, as it was for the (F*w*) phase of the A*t* operation. The carry flip-flop (C*a*) remains false during the (F*w*) phase because the flip-flop (A*i*) is false throughout this phase.

Figure 36:
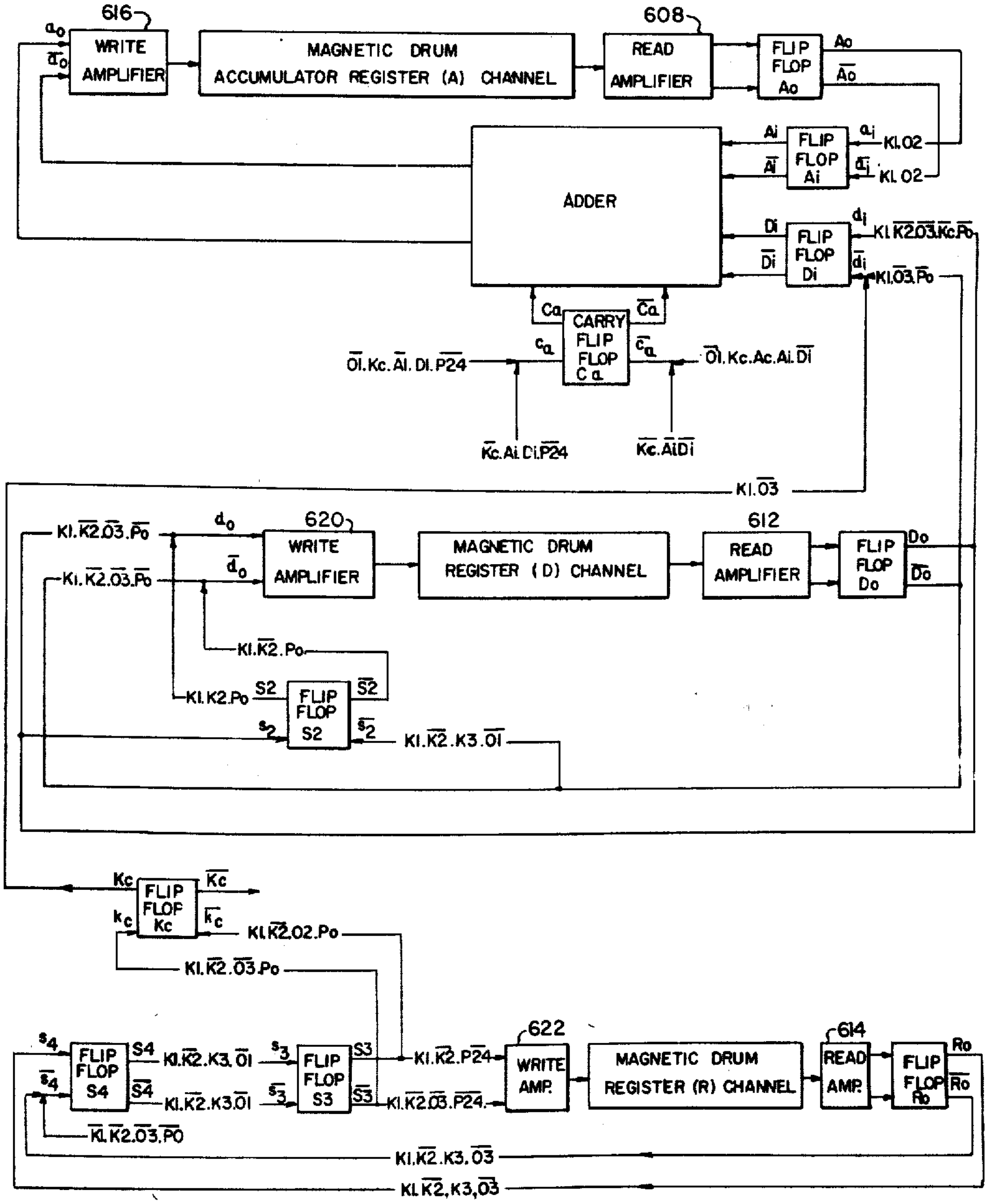
Figure 37:
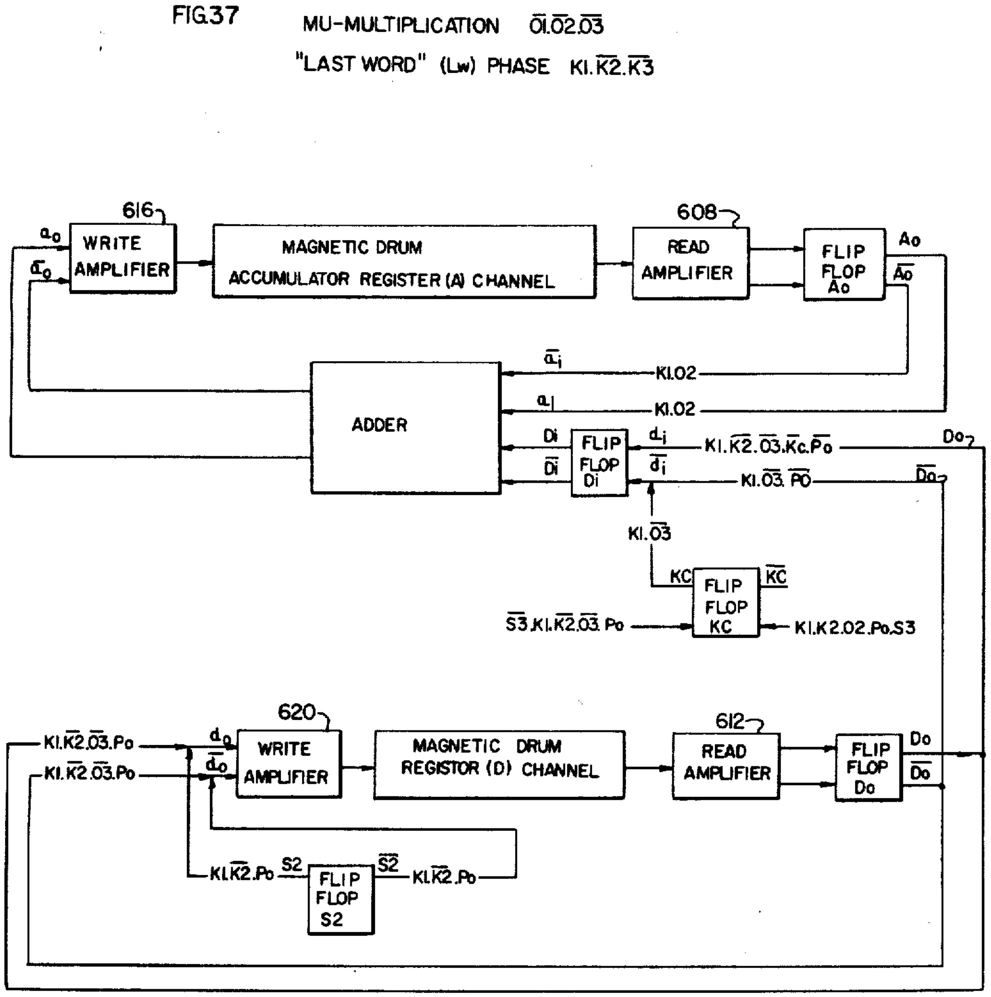

The components and connections required to execute the multiplication instruction (M*u*) are shown in FIGURES 35, 36 and 37. It should be noted that all negative numbers in the machine are stored as a two's complement, and such numbers are identified by a "1" at the sign digit position. The (M*u*) instruction, as listed in the table of FIGURE 31, is executed upon the $\overline{O1}.O2.\overline{O3}$ configuration of the flip-flops in the order register. The multiplication operation forms the product of the number contained in the accumulator register (A) and the number in the selector channel and sector of the (M*oy*) section of the magnetic memory (as specified by the beta address of the instruction).

The number in the accumulator register (A) is the multiplier, and it is transferred to the multiplier and quotient register (R) during the first word (F*w*) phase. The number in the selected channel and sector of the main memory (M*oy*) is the multiplicand, and it is read into the multiplicand and divisor register (D) during the first word phase (F*w*).

The multiplication operation is started in the first word phase (F*w*) and continues through the additional words phase (A*w*), and the operation is completed during the last word phase (L*w*). The number of additional words required during the (A*w*) phase is determined by the alpha sector address of the next instruction. This allows the operation to be terminated when the desired accuracy has been obtained in the product merely by causing the address of the following instruction being executed by a number of word times corresponding to the desired accuracy. This feature of termianting the operation at any desired point is possible because the most significant digits of the product are generated first. That is, the most significant digit of the multiplier is used in the first step, and in successive steps the multiplier is shifted left so that its digits are used in decreasing order of significance.

The multiplicand is shifted to the right one bit for each step during the execution of the M*u* instruction, and a bit is dropped from the least significant end of the multiplicand for each step. There is, therefore, a truncation operation at each step of the multiplication which results in the product always being low. This normally does not present a serious problem if the numbers to be multiplied are not too large, and if such numbers are scaled so that the most significant digit of the number (exclusive of the sign bit) occurs at P1 digit time when the function is at its maximum magnitude.

The logic required to carry out the multiplication instruction (M*u*) during the first word phase (F*w*) of that instruction is set out in FIGURE 35. As shown in that figure, the input terminal $\overline{a_1}$ of the flip-flop (A*i*) receives the term $\overline{K1}.\overline{O1}$. The input terminal $d_1$ of the flip-flop (D*i*) receives the term $Moy.\overline{K1}.K2.Kc.\overline{O3}$. The input terminal $\overline{d_1}$ of that flip-flop receives the term $\overline{Moy.K1}$. The carry flip-flop (C*a*) receives the term $\overline{O1}.Kc.Ai.Di.\overline{P24}$ at its input interminal $c_a$, and it receives the term $\overline{O1}.Kc.Ai.\overline{Di}$ at its input terminal $\overline{c_a}$. All these flip-flops are connected to the adder in the accumulator register (A) which, as described above, is connected to the input terminals $a_0$ and $\overline{a_0}$ of the write amplifier 616 of that register.

The flip-flop (A*o*) of the register (A) has its output terminal A*o* connected to an "and" gate to form the term $Ao.\overline{K1}.\overline{K2}.\overline{O1}.O2$, the "and" gate being connected to the input terminal $k_3$ of the flip-flop (K3). Likewise, the output terminal $\overline{Ao}$ and the term $\overline{K1}.\overline{K2}.\overline{O1}.O2.\overline{P0}$ are connected to an "and" gate which, in turn, is connected to the input terminal $\overline{k_3}$ of the flip-flop (K3).

The output terminal $\overline{Ao}$ of the flip-flop (A*o*) is connected to an "and" gate with the term $\overline{K1}.K2.\overline{O1}.P0$, and the latter "and" gate is connected to the input terminal $\overline{k_c}$ of the flip-flop (K*c*). These connections to the flip-flop (K*c*), and the connections to the flip-flop (K3) represent a time-shared use of these flip-flops, the flip-flop (K*c*) normally serving as a coincidence detector flip-flop and the flip-flop (K3) normally serving as a control flip-flop.

The output terminal K3 of the flip-flop (K3) is connected to an "and" gate, as is the term K1.O3, and this "and" gate is connected to the input terminal $r_0$ of the write amplifier 622. The output terminal $\overline{K3}$ of the flip-flop (K3) is "anded" with the term $\overline{K1}$ and introduced to the input terminal $\overline{Ko}$ of the write amplifier 622. The terms M*oy* and $\overline{Moy}$ from the flip-flop (M*oy*) are anded with the term K1 and introduced to the input terminal $d_0$ and $\overline{d_0}$ of the write amplifier 620.

During the first word of the multiplication (M*u*) instruction, the sign digit of the multiplier in the accumulator register (A) is copied into the flip-flop (K*c*) at P0 digit time of the wait beta ($W_B$) phase just prior to the first word (F*w*) phase. It should be pointed out that the sign of the operand numbers in the register occurs at P0 digit time. The flip-flop (K*c*) is always true during the wait beta ($W_B$) phase, and it remains true during the first word (F*w*) phase unless it is triggered false by the term $\overline{K1}.K2.\overline{O1}.P0.\overline{Ao}$. This latter term is true if the multiplier is positive.

The multiplicand is subtracted from the "0" in the adder if the multiplier is negative, as represented by the flip-flop (K*c*) in its true state. When that condition arises, the multiplicand is fed from the flip-flop (M*oy*) to the flip-flop (D*i*) because of the truth of the term $\overline{K1}.\overline{K2}.Kc.\overline{O3}$ and of the term $\overline{K1}$. The flip-flop (A*i*) is set to "0" by the term $\overline{K1}.\overline{O1}$. The carry flip-flop (C*o*) is now operative because the term $\overline{Ai}.Kc$ is true, and it causes the number from the flip-flop (D*i*) to be subtracted in the adder from "0" because the carry flip-flop (C*a*) is held true by the term $\overline{Ai}$ term throughout the word time. Therefore, if the multiplier is negative, the complement of the multiplicand is read into the accumulator register (A) during the first word (F*w*) phase of the multiplication (M*u*) operation.

The multiplicand is also read from the flip-flop (M*oy*) into the write amplifier 620 of the register (D) during the first word (F*w*) phase because the term $\overline{K1}$ is true. Since the channel (D) is one bit short of a one word length, the multiplicand is shifted one bit to the right for the first 24 bits, and the last digit of the multiplicand is extended one bit to form a new sign digit.

The multiplier is copied into the register (R) during the first word phase (F*w*) from the accumulator register (A). Since the register (R) is also one bit short of 25 bits, the output from the accumulator register (A) is copied through th flip-flop (A*o*) into the flip-flop (K3) before being introduced to the write amplifier 622 of the register "R" through the true terms $\overline{K1}.\overline{O3}$ and $\overline{K1}$. The multiplier is read from the flip-flop (A*o*) to the flip-flip (K3) during the first word (F*w*) phase of the (M*u*) instruction because the terms $\overline{K1}.\overline{K2}.\overline{O1}.\overline{O2}.\overline{P0}$ and $\overline{K1}.\overline{K2}.\overline{O1}.\overline{O2}$ are true.

Therefore, at the end of the first word (F*w*) phase, a partial product is placed in the accumulator register (A). This partial product is "0" if the multiplier is positive, and it is zero—the multiplicand if the multiplier is negative. Also, at the end of the (F*w*) phase, the multiplier is in an on-time position in the register (R), and the multiplicand is shifted one position to the right in the register (D). The extreme right hand digit of the multiplicand has now been lost.

The computer now enters the additional words (A*w*) phase of the (M*u*) instruction. For each word time in this phase, the shifted multiplicand in the (D) register is fed to the flip-flop (D*i*) to be added to the partial product in the accumulator register (A) if the multiplier digit is "1" for that word time. However, if the multiplier digit is "0" for that word time, the contents of the (A) register are merely circulated through the adder. The multiplier digits are successively stored in the flip-flop (K*c*), the flip-flop being triggered false if the multiplier digit is a "1" and being triggered true if the multiplier digit is a "0." The sign digit extension of the multiplicand occurs at P0 digit time, and that digit is not copied into the flip-flop (D*i*).

The multiplication instruction (M*u*) in its additional words (A*w*) phase requires for its execution the logic configuration illustrated in FIGURE 36. As illustrated in that figure, the term K1.O2 couples the output terminals of the flip-flop (A*o*) to the input terminals of the flip-flop (A*i*). The term K1.O2 is true for the (A*w*) phase of the (M*u*) instruction, and the partial products in the accumulator register therefore circulate through the adder during this phase.

The D*o* and $\overline{Do}$ output terms of the flip-flop (D*o*) in the register (D) are coupled to the input terminals $d_1$ and $\overline{d_1}$ and of the (D*i*) flip-flop by the terms $$K1.\overline{K2}.\overline{O3}.\overline{Kc}.\overline{P0}$$

and $K1.\overline{O3}.\overline{P0}$, respectively. The first term is true only when the flip-flop (K*c*) is false, indicating a multiplier digit of "1." When the flip-flop (K*c*) is true indicating a multiplier digit of "0," a term $K1.\overline{O3}.Kc$ introduced to the input terminal $\overline{d}_1$ holds the flip-flop (D*i*) false for that word time.

A first pair of terms $\overline{Kc}.Ai.Di.\overline{P24}$ and $\overline{Kc}.\overline{Ai}.\overline{Di}$ are introduced respectively to the input terminals $c_a$ and $\overline{c_a}$ of the carry flip-flop (C*a*). These are normal add terms, so that when the flip-flop (K*c*) is false, the contents of the (D) register flowing through the flip-flop (D*o*) are passed on to the flip-flop (D*i*) and added to the contents of the (A) register past through the flip-flop (A*i*). This occurs when a unity multiplier digit is in the flip-flop (K*c*).

A second pair of terms $\overline{O1}.Kc.\overline{Ai}.Di.\overline{P24}$ and $\overline{O1}.Kc.Ai.\overline{Di}$, which are also introduced to the input terminals $c_a$ and $\overline{c_a}$ respectively of the flip-flop (C*a*), are normal subtract terms. Because the flip-flop (K*c*) holds the flip-flop (D*i*) false when the flip-flop (K*c*) is true, these terms cause "0" to be subtracted from the contents of the (A) register when a "0" multiplier digit is in the flip-flop (K*c*). In other words, the partial product in the (A) register merely circulates through the adder when a "0" multiplier digit is in the flip-flop (K*c*).

It will be noted that the $\overline{P0}$ terms in the input of the flip-flops (D*i*) and (C*a*) suppress the sign digit of the multiplicand and do not permit that digit to pass through the adder.

Because the register (D) is a 24 bit register, the multiplicand is shifted to the right each time it circulates through that register. This causes, as noted above, the least significant digit of the multiplicand to be lost for each such circulation. The flip-flop (D*o*) has its output terminals D*o* and $\overline{Do}$ respectively coupled to the input terminals $d_0$ an $\overline{d_0}$ of the write amplifier 620 through the terms $K1.\overline{K2}.\overline{O3}.\overline{P0}$. This term is true during the additional words (A*w*) phase of the (M*u*) instruction. Therefore, so long as the (A*w*) phase exists, the multiplicand is circulated through the register (D), and it is shifted to the right by one digit for each such circulation.

To process the sign digit of the multiplicand, the multiplicand is normally copied for right shift from the flip-flop (D*o*) into the write amplifier 620, except at P0 digit time. The contents of the flip-flop (D*o*) are also shifted through the flip-flop (S2) and through the term $K1.\overline{K2}.K3.\overline{O1}$ which is true for the additional words (A*w*) phase of the (M*u*) instruction. Then, at P0 digit time, the term $\overline{K1}.\overline{K2}.P0$ becomes true so that the contents of the S2 flip-flop are introduced to the write amplifier at that time. The sign of the multiplier is therefore stored in the flip-flop S2 for each circulation of the multiplicand through the register (D), and the sign is then introduced to the register (D) at P0 digit time by that flip-flop.

The flip-flops S3 and S4 are used in the circulating loop of the register (R) to provide the desired left shift for the multiplier. The output terminals of the flip-flop (R*o*) are coupled through a term $K1.\overline{K2}.K3.O3$ to the input terminals $s_4$ and $\overline{s_4}$ of the flip-flop (S4), this term being true for the (A*w*) phase of the (M*u*) instruction. The term $\overline{K1}.\overline{K2}.\overline{O3}.P0$ introduced to the right input terminal $s_4$ of the flip-flip (S4) sets the sign digit of the multiplier to "0" during the first word phase of the (M*u*) instruction.

The term $K1.\overline{K2}.K3.\overline{O1}$ couples the output terminals of the flip-flop (S4) to the input terminals of the flip-flip (S3). This latter term is also true for the additional words (A*w*) phase of the multiplication (M*u*) instruction, so that the contents of the flip-flop S4 may be copied into the flip-flop (S3). The terms $K1.\overline{K2}.\overline{P24}$ and $K1.\overline{K2}.\overline{O3}.P24$ respectively couple the S3 and $\overline{S3}$ of the output terminals of the flip-flop (S3) to the input terminals $r_0$ and $\overline{r_0}$ of the write amplifier 622. These terms permit the contents of the flip-flop (S3) to be copied into the write amplifier 622 during the (A*w*) phase of the (M*u*) instruction, and the latter terms sets each used multiplier digit to "0."

The flip-flop (S3) has its $\overline{S3}$ output terminal coupled through a term $K1.\overline{K2}.\overline{O3}.P0$ to the $k_c$ input terminal of the flip-flop (K*c*). Likewise, the flip-flop (S3) has its output terminal $S_3$ coupled to the $\overline{k_c}$ input terminal of the flip-flop (K*c*) through a term $K1.\overline{K2}.O2.P0$. These terms cause the multiplier digits passing through the flip-flop (S3) at P1 digit time during the (A*w*) phase of the (M*u*) instruction to be stored in the flip-flop (KC) for one word time.

A unity multiplier digit now triggers the flip-flop (K*c*) false, which is desired for the reasons described above, and a "0" multiplier digit causes the flip-flop (K*c*) to be true, which also is desired for the reasons described above. As also previously mentioned the multiplier digits pass through the flip-flop (K*c*) mode with the most significant digit first. This, as explained, enables the partial products in the accumulator register (A) to actually represent the final answer at all times and with increased accuracy for each additional word in the (A*w*) phase.

As also mentioned above, the computer remains in the additional words (A*w*) phase for a number of word times as determined by the alpha sector address of the next instruction. When equality is achieved by the alpha sector address and the S*ot* sector number, as compared in the (S5) flip-flop, the (M*u*) operation of the computer enters its last word (L*w*) phase($K1.\overline{K2}.\overline{K3}$) of FIGURE 37.

When the computer enters the last word (L*w*) phase of the (M*u*) operation, it performs one more multiplication operation and then returns to the instruction read-in (I*r*) phase.

Figure 38:
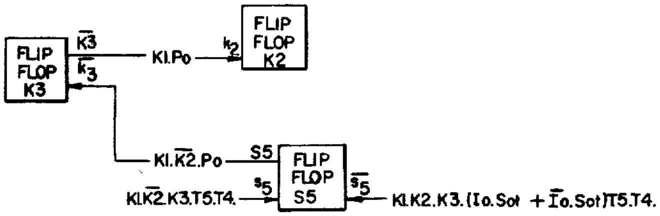

During the additional words phase of the (M*u*) instruction, the flip-flop (S5) in FIGURE 38 is set true during each word time just before the alpha sector number in the instruction, this being accomplished by the term $K1.\overline{K2}.K3.T5.T4$ introduced to its $s_5$ input terminal. The flip-flop (S5) is then set false by the alpha sector portion of the instruction by the term $$K1.\overline{K2}.K3(Io.Sot+\overline{Io}.\overline{Sot})\overline{T5}.\overline{T4}$$

introduced to its input terminal $\overline{s_5}$ unless the alpha sector number in the instruction is the same as the $S_{ot}$ sector number on the drum. When the latter condition occurs, the flip-flop (S5) remains true, and the flip-flop (K3) is triggered false at the end of the following word time by the term $K1.\overline{K2}.P0$ introduced to its input terminal $k_3$ (see FIGURE 38). This triggering of the flip-flop (K3) to a false state causes the computer to enter the "last word" phase ($K1.\overline{K2}.\overline{K3}$) of the (M*u*) instruction. Then, one word time later, the flip-flop (K2) is triggered true by the term $\overline{K3}.K1.P0$ introduced to its input terminal $k_2$. This latter triggering causes the computer to return to its instruction "read-in" (I*r*) phase ($K1.K2.\overline{K3}$).

Just before the last word phase of the computer, and as shown in FIGURE 37, the flip-flop (K*c*) is set true or false by the terms $\overline{S3}.K1.\overline{K2}.\overline{O3}.P0$ and $K1.\overline{K2}.O2.P0.S3$ introduced to its input terminals and in accordance with the state of the flip-flop (S3). As before, the flip-flop (K*c*) is set true if the multiplier digit is a "0" and it is set false if the multiplier digit is a "1."

As in the previous instance, the partial product in the register (A) shifts through the adder during the "last word" (L*w*) phase and is added to the shifted multiplicand in the register (D) if the multiplier in the flip-flop (K*c*) is a "1." However, if the multiplier in the flip-flop (K*c*) is a "0," the partial product is merely passed through the adder. The multiplicand is able to pass though the register (D) for the last word (L*w*) phase of the (M*u*) instruction because the term $K1.\overline{K2}.\overline{O3}.P0$ at the input terminals of the write amplifier 620 are still true for the (L*w*) phase. Also, the flip-flop (S2) is able to insert the sign digit into the P0 position of the multiplicand during the last word phase because the term $K1.\overline{K2}.P0$ is still true for that phase.

Then, at the end of the last word (L*w*) phase, the product is in the register (A) with the proper sign and desired accuracy. Then, and as described above in conjunction with FIGURE 38, the computer is returned to the instruction read-in (I*r*) phase and the next instruction is read into the register (I). This next instruction is selected by the coincidence detection by the flip-flop (S2) of the alpha sector number of the present instruction and the corresponding (S*ot*) number.

The logic required to execute the select ($T_c$) instruction is set out in FIGURE 39. This instruction is identified by the $\overline{O1}.O2.O3$ configuration of the order flip-flops. The ($T_c$) instruction specifies that the next instruction is to be selected from the (M*oy*) memory location indicated by the beta address section of the ($T_c$) instruction if the contents of the accumulator register (A) are equal to or greater than "0." The ($T_c$) instruction further specifies that the next instruction is to be selected from the (M*oy*) memory location indicated by the alpha address section of the ($T_c$) instruction with the contents of the accumulator register (A) are less than 1.

When the contents of the accumulator register (A) are greater than "0" or equal to "0," the sign digit is "0." This "0" sign digit sets the flip-flop (A*i*) false at P24 digit time. Conversely, if the contents of the accumulator register (A) are less than "0," the sign digit is a "1." This unity sign digits sets the flip-flop (A*i*) true at P24 digit time.

As illustrated in FIGURE 39, the selection matrix 16 is controlled by the flip-flops S1, S2, S3, S4 and S5 in the track selector register 700. These flip-flops, in turn, are controlled by the logic follower ($F_s$). The term $$\{\overline{K3}.\overline{T4}.K1.\overline{K2}+\overline{K1}.K2[\overline{T4}.\overline{K3}+T4(T3+T1.T2)]\}T5$$

is introduced to the logic follower ($F_s$) and it causes the flip-flops of the track selector register 700 to be activated for track selection purposes during the alpha track and beta track address sections of the instruction. These sections, as illustrated in FIGURE 30, extend from P8–P3 and from P18–P14 in the instructions. The output from the instruction register flip-flop (I*o*) is introduced to the flip-flop (S5), and that output is shifted through the flip-flops S4, S3, S2 and S1 under the control of the follower ($F_s$). The control is such that the beta address track number is in the track selector register 700 during the wait beta ($W_B$) phase of the computer, and the alpha address is in the register during the wait alpha ($W_A$) phase of the computer.

The selection matrix 16 is controlled in the manner described above, so that the channel selected by the register 700 may have its contents read into the flip-flop (M*oy*). The term $K1.\overline{K3}$ couples the output of the flip-flop (M*oy*) to the input terminals $i_o$ and $\overline{i_o}$ of the write amplifier 618 of the instruction register. The term $Io(\overline{K1}+K3)$ is introduced to the input terminal $i_o$ of the write amplifier 618, and the term $\overline{Io}(\overline{K1}+K3)$ is introduced to the input terminal $\overline{i_o}$ of the write amplifier 618.

During the execution of the select instruction (T*c*) a term $K2.\overline{O1}.O2.O3.P0$ couples the output terminal K*c* of the coincidence detector flip-flop (K*c*) to the input terminal $k_1$ of the control flip-flop (K1). Likewise, a term $\overline{K1}.K2.P0$ couples the output terminal K*c* to the input terminal $k_3$ of the control flip-flop (K3). A term $P0.K2.\overline{K3}$ is introduced to the input terminal $\overline{k_1}$ of the flip-flop K1, a term $K1.K2.P0$ is introduced to the input terminal $k_3$ of the flip-flop (K3). Finally, a term $$K1.\overline{K3}(P13-P9)+P0.\overline{K1}.K2$$

is introduced to the input terminal $k_c$ of the coincidence detector flip-flop (K*c*), and a term $$\overline{K1}.K2(Io.\overline{Sot}+\overline{Io}.Sot)(P24-P19+P8-P3)$$

is introduced to the input terminal $\overline{k_c}$ of the flip-flop (K*c*).

The select instruction (T*c*) is executed during the first word phase of (F*w*) of the computer. During the wait alpha ($W_A$) phase of the previous instruction, the flip-flops K1, K2 and K3 are set to the $\overline{K1}.K2.\overline{K3}$ configuration and the alpha track address of the (T*c*) instruction is shifted into the track selector flip-flops S1–S5, as described above. Upon coincidence of the alpha sector address in the coincidence detector flip-flop (K*c*), the computer enters the instruction read-in phase (I*r*) in which the control flip-flops have the configuration $K1.K2.\overline{K3}$, and the ($T_c$) instruction is read into the instruction register (I). The instruction is read from the flip-flop (M*oy*) through the $K1.\overline{K3}$ term (which are now true) to the write amplifier 618 of the instruction register (I).

The computer then enters the wait beta ($W_B$) phase (K1.K2.K3) because the term P0.K2.K3 triggers the flip-flop (K1) false at the end of the (I*r*) phase, the term (K1.K2.P0) triggers the flip-flop (K3) true at the end of that phase. If the number in the accumulator register (A) is less than zero, the term A*i*.P24 is true and the flip-flop (K3) is immediately triggered false by the term $\overline{K1}.\overline{O1}.O2.O3.Ai.P24$ to return the computer to the wait alpha ($W_A$) phase. This enables the next instruction to be selected from the (M*oy*) channel and from the sector in that channel addressed by the alpha address section of the instruction, as is desired under these conditions.

However, if the term A*i*.P24 is false, a number greater than or equal to zero is indicated as being in the accumulator register (A). This flip-flop (K3) now remains true, and the computer is able to enter the wait beta ($W_B$) phase.

The beta track address section of the ($T_c$) instruction is now read into the track selector register 700. Then, upon sector coincidence, the term $Kc.K2.\overline{O1}.O2.O3.P0$ is true at the P0 time to trigger the flip-flop (K1) true. The term $Kc.\overline{K1}.K2.P0$ is true at the time time to trigger the flip-flop (K3) false. This causes the computer to enter the instruction read-in (I*r*) phase, so that the instruction addressed by the beta section of the ($T_c$) instruction is read into the instruction register (I) which is desired under the latter conditions.

The logic required to perform the (A*d*) instruction is set out in FIGURE 40. As noted above, this instruction requires that the contents of the designated memory location (M*oy*) be added to the contents of the accumulator register (A), with the sum being left in the accumulator register (A). The order flip-flop configuration for this instruction is $O1.\overline{O2}.\overline{O3}$. The instruction is carried out in the first word phase ($F_w$) in which the control flip-flops have the configuration $\overline{K1}.\overline{K2}$. The contents of the accumulator register may be a number inserted into the accumulator register by the clear and transfer command (A*t*), or the number may be the sum of a previous execution of the (A*d*) command.

The flip-flop (K*c*) is used in this command to control the carry flip-flop (C*a*). When the flip-flop (K*c*) is set false, the carry flip-flop (C*a*) is set to a normal "add" configuration. The flip-flop (K*c*) is set false for the (A*d*) instruction by a term $\overline{K1}.K2.\overline{O2}.P0$ which is introduced to the input terminal $\overline{k}_c$ of the flip-flop (K*c*). This term sets the flip-flop (K*c*) false at the end of the wait beta ($W_B$) phase, and it remains false during the first word (F*w*) phase while the addition is being performed. The term $\overline{Ai}.\overline{Di}$ couples the terms $\overline{Kc}$ to the input terminal $\overline{c}_a$ of the carry flip-flop (C*a*). In like manner, the term $Ai.Di.\overline{P24}$ couples the term $\overline{Kc}$ to the input terminal $c_a$ of the carry flip-flop (C*a*). The term $P_{24}$ is also introduced to the input terminal $\overline{c}_a$ of the carry flip-flop (C*a*).

The numbers to be added flow through the adder from $P_{23}$ digit time to $P_{24}$ digit time of the following word time. The term $P_{24}$ introduced to the input terminal $\overline{c}_a$, and the term $P_{24}$ included in the general term introduced to the input terminal $c_a$ of the carry flip-flop (C*a*) cause that flip-flop to be set false at the beginning of each new addition. This is desired, and the carry flip-flop (C*a*) remains low until it receives a "1" from both the numbers passing through the (A*i*) and (D*i*) flip-flops.

At the first word phase (F*w*) of the A*d* instruction the selected (M*oy*) channel and sector of the magnetic drum flows through the flip-flop (M*oy*). A first term $\overline{K1}$ couples that flip-flop to the input terminal $d_i$ of the flip-flop (D*i*), and a term $\overline{K1}.\overline{K2}.\overline{O3}.\overline{O2}$ couples the output terminal M*oy* to the input terminal $d_i$ of the flip-flop (D*i*). These terms are true during the first word phase, so that the contents of the selected (M*oy*) channel are read during that phase through the flip-flop (D*i*) into the adder.

A term K2 couples the output terminals of the flip-flop (A*o*) to the input terminals of the flip-flop (A*i*) during the wait beta ($W_B$). This permits the number in the accumulator register (A) to circulate through the register. Then, during the first word (F*w*) phase, a term $\overline{K1}$.O1 coupling the flip-flop (Ao) to the input terminals of the flip-flop (A*i*) becomes true. This permits the contents of the accumulator register to circulate through the adder at the same time as the contents of the selected channel and sector from the magnetic drum. Also, the carry flip-flop (C*a*) is set to a normal add condition, so that a binary addition is carried out between the contents of the accumulator register and the contents of the selected channel and sector of the magnetic drum. The sum is then read into the accumulator register. At the end of the first word phase, the term K2 becomes true, and the new number is circulated through the (A) register.

It will be appreciated that the addition begins in the adder at P23 digit time with the least significant digits and proceeds to the most significant digits of the two numbers at P0 digit time. Then, the adder acts on the sign digits of two numbers at P24 digit time of the following word time, after which the carry flip-flop is set low by the P24 term to be ready for the next addition or other instruction. The new number circulating in the (A) register then, as mentioned above, represents the sum of the original two numbers, and the sign digit of the new number correctly represents the sign of the new number.

The logic required to execute the subtract instruction (S*u*) is set out in FIGURE 41. This instruction requires that the contents of the accumulator register (A) be subtracted from the contents of the designated memory location (M*oy*) with the difference being left in the accumulator register (A). This is opposite from the subtraction operations of most prior art computers in which it is normal, under a subtract instruction, to subtract the contents of the designated memory location from the contents of the accumulator register. The present S*u* instruction results in a simplification of logic.

The subtract instruction S*u* is represented by the order register configuration $O1.O2.\overline{O3}$. When the computer enters the first word (F*w*) phase of this instruction, the term $\overline{K1}$.O1 couples the flip-flop (A*o*) to the input terminals of the flip-flop (A*i*). At the same time, the terms $\overline{K1}.\overline{K2}.Kc.\overline{O3}$ and $\overline{K1}$ couples the output of the flip-flop (M*oy*) to the input of the flip-flop (D*i*). These connections cause the contents of the flip-flop (A*o*) and (M*oy*) to be read simultaneously into the adder. The carry flip-flop is set to the subtract configuration by the term $\overline{K1}.\overline{K2}.O1.Ai.\overline{Di}.P24$. K*c* introduced to its left input terminal and the term $\overline{K1}.\overline{K2}.O1.\overline{Ai}.Di.Kc$ introduced to its input terminal $\overline{c}_a$. The carry flip-flop (C*a*) is set to the subtraction configuration by the flip-flop (K*c*) in its true state. This flip-flop is triggered true by the term $P0.\overline{K1}.K2$ at the end of the wait beta ($W_B$) phase, and the flip-flop remains true during the first word (F*w*) phase during the subtract instruction. Therefore, the contents of the selected memory location (M*oy*) are subtracted from the contents of the accumulator (A) register during the first word phase of the subtract instruction.

Figure 43:
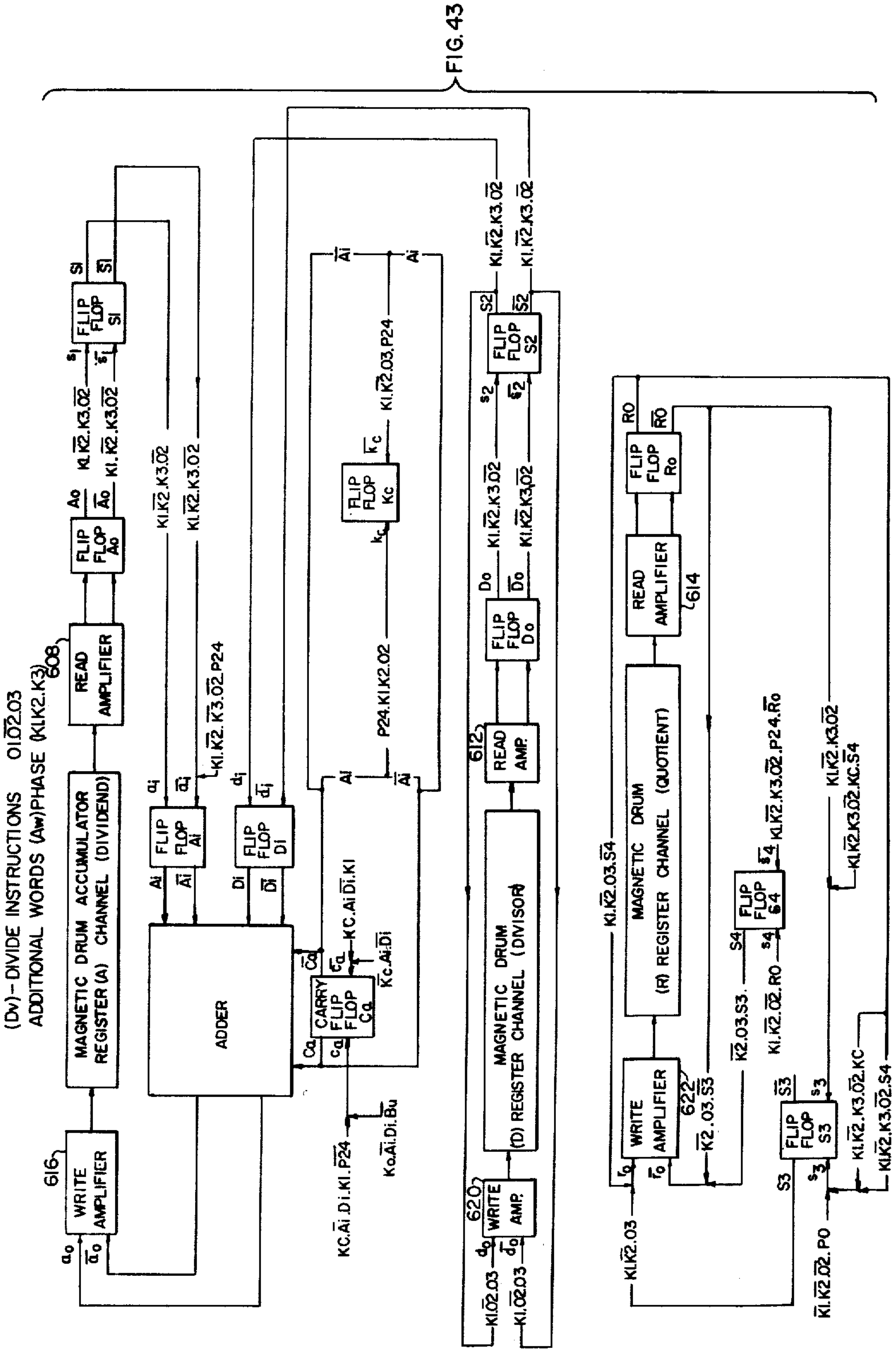
Figure 44:
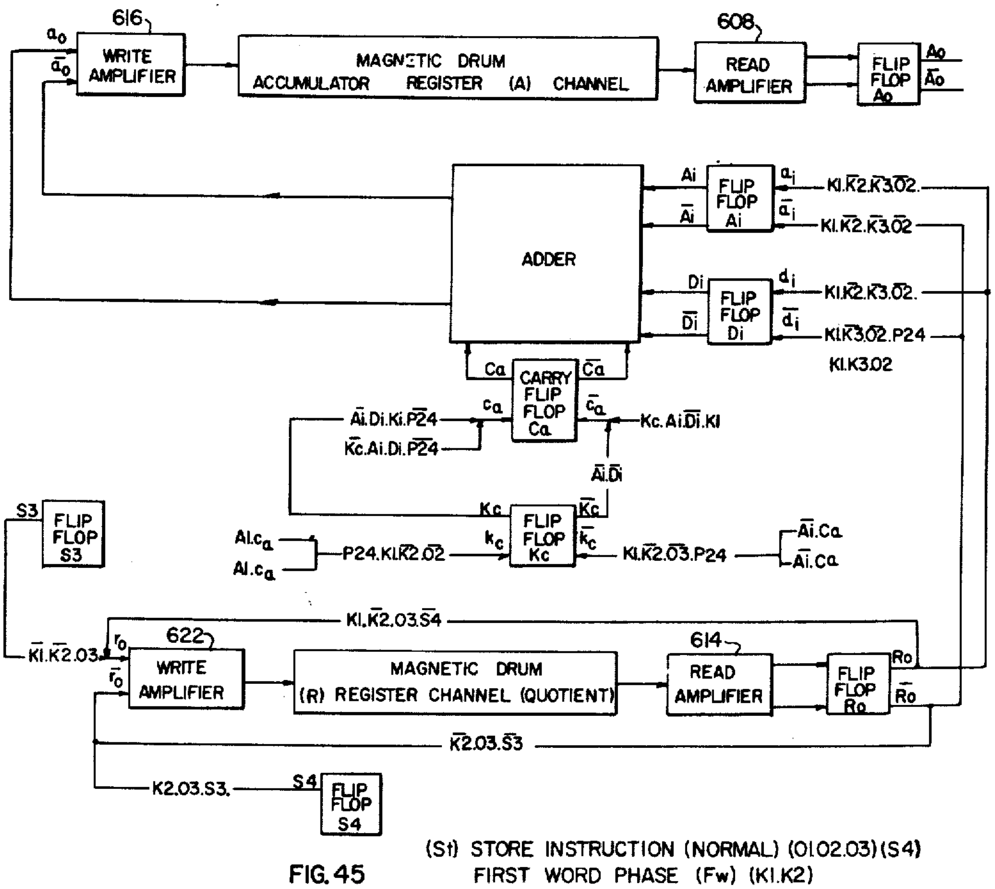

The logic required to perform the (D*v*) divide instruction is illustrated in FIGURES 42, 43 and 44. For this instruction the dividend is first placed in the accumulator register (A) and circulates in that register at the beginning of the operation. During the additional words (A*w*) phase, the accumulator register contains the remainder at the end of each step. The divisor is stored in the register (D), and the quotient is formed in the register (R). During the last word (L*w*) phase, the quotient is transferred from the register (R) to the accumulator register (A).

The divide instruction (D*v*) is represented by the order flip-flop configuration $\overline{O1}.\overline{O2}.O3$. FIGURE 42 illustrates the logic required during the first word (F*w*) phase of the (D*v*) instruction. The first word (F*w*) phase, as mentioned above, it represented by the configuration $\overline{K1}.\overline{K2}$ of the control flip-flops. For a division, the control flip-flop K3 is set false during the first word (F*w*) phase.

As illustrated in FIGURE 42, the term $\overline{K1}$.O1 couples the output terminals of the flip-flop (A*o*) to the input terminals of the flip-flop (A*i*). The term K2 is introduced to the input terminal $\overline{d}_i$ of the flip-flop ($\overline{D}i$).

The term $O1.\overline{O2}.O3.\overline{P24}.P0.\overline{K1}.\overline{K2}$ couples the output terminal M*oy* of the flip-flop (M*oy*) to the input terminal C*a* of the carry flip-flop (C*a*). The digit timing pulses P24 are applied to the input terminal $\overline{C}_a$ of the carry flip-flop (C*a*).

The output terminals of the flip-flop (M*oy*) are coupled to the input terminal $d_o$ and $\overline{d}_o$ of the write amplifier 620 of the (D) register channel by the term $\overline{K1}$.

The term $P0.\overline{K1}.K2$ is introduced to the input terminal $k_c$ of the flip-flop (K*c*) to set that flip-flop high for the ($W_B$) phase of the computer. The output terminal $K_c$ of the flip-flop (K*c*) is coupled by the term $\overline{K1}.K2.P0$ to the input terminal $\overline{k}_3$ of the flip-flop (K3). The output terminal $\overline{K}_3$ is coupled by the term $\overline{K1}.\overline{K2}$ to the input terminal $r_o$ of the write amplifier 622 of the (R) register channel.

As shown in FIGURE 42, the dividend is circulated through the accumulator register (A) and through the adder during the (F*w*) phase of the (D*v*) instruction be cause of the term $\overline{K1}$.O1 (which couples the flip-flop A*o* to the flip-flop (A*i*) is true. The flip-flop (D*i*) is set false by the term K2 during the ($W_B$) phase of the instruction (D*v*), and that flip-flop stays false during the (F*w*) phase.

The divisor is read from the selected (M*oy*) channel and sector of the magnetic memory drum during the (Fw) phase into the register (D). This information passes through the flip-flop (Moy) and through the term $\overline{K1}$ to the write amplifier 620 of the register channel (D). Also during the first word (Fw) phase, the register (R) is cleared to zero by the term $\overline{K1}.\overline{K2}.\overline{K3}$ introduced to the input terminal $r_o$ of the write amplifier 620. The flip-flop (K3) is triggered false to provide the $\overline{K3}$ term at the end of the wait beta ($W_B$) phase by the term $K_c.\overline{K1}.K2.P0$. The flip-flop (Kc) is true at the end of the ($W_B$) phase because it is triggered true by the term $P0.\overline{K1}.K2$ at the beginning of that phase, and it remains true when the beta sector address is reached to terminate the ($W_B$) phase.

Also during the first word (Fw) phase, the term $Moy.O1.\overline{O2}.O3.\overline{P24}.P0.\overline{K1}.\overline{K2}$ causes the carry flip-flop (Ca) to be triggered true if the sign of the divisor is negative, this term being introduced to the input terminal $c_a$ of the carry flip-flop. The first quotient digit is the sign of the answer, and this is determined by the sign of the divisor and dividend. If both are negative or positive, the sign of the answer is positive. However, if the signs of the divisor and dividend are different, the sign of the answer is negative.

The term $Moy.O1.\overline{O2}.O3.\overline{P24}.P0.\overline{K1}.\overline{K2}$ introduced to the carry flip-flop cause a "1" to be added to the sign digit of the dividend if the divisor is negative. Then, if the dividend is originally negative, the resulting sign digit is "0" to represent a positive answer, which is desired. By the same token, if the divisor is positive, a "0" is added to the dividend sign digit. This latter condition provides a sign digit of "0" in the answer if the dividend is positive, which also is desired. For the other two relative sign conditions of the dividend and divisor, the sign digit in the answer is a "1" to represent a negative number, which is also desired.

During the first word (Fw) phase, the register (R) is cleared to "0." This is achieved by the term $\overline{K3}.\overline{K1}.\overline{K2}$ introduced to the input terminal $r_o$ of the write amplifier 622. The term $\overline{K1}.\overline{K2}$ is true during the first word (Fw) phase. Also, the flip-flop (K3) is triggered false during this phase of the (Dv) instruction to make the term $\overline{K3}$ true. The flip-flop (K3) is triggered false by the term $K_c.\overline{K1}.K2.P0$ at the end of the ($W_B$) phase. The term $\overline{K1}.K2$ is true during the ($W_B$) phase, and the flip-flop (Kc) is set high for that phase to make the term Kc true. The flip-flop (Kc) is set high by the term $K1.\overline{K2}.P0$ introduced to its input terminal $k_c$.

The (Dv) instruction now enters the first word time of the additional words (Aw) phase. In the (Aw) phase the control flip-flops are set to the $K1.\overline{K2}.K3$ configuration.

The flip-flop (S1) is inserted in the circulating loop of the (A) register during the (Aw) phase. The term $K1.\overline{K2}.K3.\overline{O2}$ couples the output terminals of the flip-flop (Ao) to the input terminals of the flip-flop (S1). Likewise, the same term $K1.\overline{K2}.K3.\overline{O2}$ couples the output terminals of the terms (S1) to the input terminals of the flip-flop (Ai). The term $K1.\overline{K2}.K3.\overline{O2}.\overline{P24}$ is also introduced to the input terminal $\overline{a_i}$ of the flip-flop (Ai), and this term sets the least significant digit of the number passing through that flip-flop to zero during a left shift of the number.

The flip-flop (S2) is inserted in the circulating loop of the register channel (D). The term $K1.\overline{K2}.K3.\overline{O2}$ couples the flip-flop (Do) to the flip-flop (S2). Likewise, the term $K1.\overline{K2}.\overline{O3}$ couples the flip-flop (S2) to the input terminals $d_o,\overline{d_o}$ of the write amplifier 620. A pair of terms $K_c.\overline{Ai}.Di.K1.\overline{P24}$ and $\overline{K_c}.Ai.Di.\overline{P24}$ are introduced to the input terminal $c_a$ of the carry flip-flop (Ca). The terms $Kc.\overline{Ai}.\overline{Di}$ and $Kc.Ai.\overline{Di}.K1$ are introduced to the input terminal $\overline{c_a}$ of the carry flip-flop.

The output terminals of the carry flip-flop (Ca) are coupled by a term $P24.K1.\overline{K2}.\overline{O2}$ to the input terminal $k_c$ of the flip-flop (Kc), the term Ai being anded with the Ca term and the term $\overline{Ai}$ being anded with the $\overline{Ca}$ term. The output terminals of the carry flip-flop are coupled to the input terminal $\overline{k_c}$ of the flip-flop (Kc) by the term $K1.\overline{K2}.O3.P24$, the term $\overline{Ai}$ being anded with the Ca term and the term Ai being anded with the $\overline{Ca}$ term. The flip-flops S3 and S4 are used in conjunction with the register (R). The term $\overline{K2}.O3.\overline{S3}$ couples the output terminal $S_4$ of the flip-flop (S4) to the input terminal $\overline{r_o}$ of the write amplifier 622. The term $K1.\overline{K2}.K3.\overline{O2}.Ro$ is introduced to the input terminal $s_4$ of the flip-flop (S4), and the term $K1.\overline{K2}.K3.\overline{O2}.P24.\overline{Ro}$ is introduced to the input terminal $\overline{s_4}$ of that flip-flop.

The output terminal Ro of the flip-flop (Ro) is coupled by the term $\overline{K1}.O3.\overline{S3}$ to the input term $\overline{r_o}$ of the write amplifier 622. The term $K1.\overline{K2}.O3.\overline{S4}$ couples the output terminal Ro of the flip-flop (Ro) to the input terminal $r_o$ of the write amplifier 622.

The term $K1.\overline{K2}.K3.\overline{O2}$ couples the output terminal $\overline{Ro}$ to the input terminal $\overline{s_3}$ of the flip-flop (S3). A term $K1.\overline{K2}.K3.\overline{O2}.\overline{Kc}.\overline{S4}$ is also introduced to that input terminal. A pair of terms $K1.\overline{K2}.K3.\overline{O2}.K_c$ and $K1.\overline{K2}.K3.\overline{O2}.S4$ couples the output terminal $R_o$ to the input terminal $s_3$ of the flip-flop (S3). A term $\overline{K1}.\overline{K2}.\overline{O2}.P0$ is also introduced to the input terminal $s_3$ of that flip-flop. A term $K1.\overline{K2}.O3$ couples the output terminal $S_3$ of the flip-flop (S3) to the input terminal $r_o$ of the write amplifier 622.

At the end of the first word (Fw) phase, the flip-flop (S3) is set high by the term $\overline{K_1}.\overline{K_2}.O_2.P_0$ introduced to its input terminal ($s_3$). The flip-flop (S3) then inserts a "1" into the write amplifier 622 at P24 digit time of the first word time of the (Aw) phase by virtue of the term $K1.\overline{K2}.O3$ which couples the output terminal $S_3$ to the input terminal $r_o$ of the write amplifier. Because the register (R) is one bit short, the inserted index digit is read at P0 digit time of the first word time of the (Aw) phase by the flip-flop (Ro).

Also at the beginning of the first word time of the (Aw) phase, the term $K1.\overline{K2}.K3.\overline{O2}.P24.\overline{Ro}$ sets the flip-flop (S4) false, the term Ro being true because of the cleared condition of the register (R). This causes the term $K1.\overline{K2}.O3.\overline{O4}$ to be true so that the write amplifier 622 copies the flip-flop (Ro). This causes 0's to be copied into the register (R) until P0 digit time of the first word time. Then, the index digit triggers the flip-flop (S4) true, this being achieved by virtue of the term $K1.\overline{K2}.K3.\overline{O2}.Ro$ introduced to the input terminal $s_4$ of that flip-flop. Therefore, at the end of P0 digit time of the first word time of the (Aw) phase, the flip-flop (S4) is set true.

During the first word time of the (Aw) phase of the (Dv) instruction, the dividend circulates through the register (A) and through the flip-flop (S1), so that the dividend is shifted to the left before it is introduced to the flip-flop (Ai). This is because the term $K1.\overline{K2}.K3.\overline{O2}$ is true. The divisor from the register (D) is introduced to the flip-flop (Di) because the term $K1.\overline{K2}.K3.\overline{O2}$ is true. The divisor is added to the left-shifted dividend if the flip-flop (Kc) is false, and it is subtracted from the left-shifted dividend if the flip-flop (Kc) is true. This is because the carry flip-flop (Ca) is set to the add configuration by the terms $\overline{Kc}.Ai.Di.\overline{P24}$ introduced to its input terminal $c_a$, and the term $\overline{Kc}.\overline{Ai}.\overline{Di}$ introduced to its input terminal $\overline{c_a}$; and because the carry flip-flop (Ca) is set to the subtract configuration by the terms $Kc.\overline{Ai}.Di.K1.P24$ and $Kc.Ai.\overline{Di}.K1$ introduced respectively to its input terminals $c_a$ and $\overline{c_a}$.

The flip-flop (Kc) is controlled at each $P_{24}$ digit time by the terms $$k_c=(Ca.Ai+\overline{Ca}.\overline{Ai})P24$$
$$\overline{k}_c=(Ca.\overline{Ai}.+\overline{Ca}.\overline{Ai})P24$$

For the first word time of the (Aw) phase the flip-flop (Kc) is set true if the sign digits of the divisor and dividend are both negative or both positive, and the flip-flop (Kc) is set false if the divisor and dividend are different. If the flip-flop (Kc) is set false, the term $\overline{K1}.\overline{K2}.\overline{K3}.O2.\overline{Kc}.S4$ will set the flip-flop (S3) false. Therefore, at the beginning of the first word time of the (Aw) phase, a "0" will be inserted in the sign digit position of the quotient indicative of a positive answer. This "0" will later be corrected in the last word phase, because under the conditions described in the preceding paragraph the answer is negative.

Conversely, if the flip-flop (Kc) is set true, the term $K1.\overline{K2}.K3.\overline{O2}.Kc.P0$ will set the flip-flop (S3) true, at P0 time of the first word time of the (Aw) phase. This causes a "1" to be inserted in the register (R) at the digit time following the index digit. This "1" is in the sign digit position of the answer and indicative of a negative quotient. However, under the conditions described above, the quotient should be positive, and this sign digit is later corrected during the last word phase.

During the first word time of (Aw) phase, the divisor is added or subtracted from the left-shifted dividend, depending on the state of the flip-flop (Kc) to provide the first remainder in the register (A). The computer now enters the second word time of the (Aw) phase. The flip-flop (S4) is set false by the term $\overline{K1}.\overline{K2}.K3.\overline{O2}.P24.\overline{Ro}$ introduced to its input terminal $\overline{s}_4$, and the contents of the flip-flop (Ro) are copied into the write amplifier 622 directly by the term $K1.\overline{K2}.O3.\overline{S4}$. This causes a right shift in the register (R) because the circulating loop causes the register to have 24-bit positions only.

The flip-flop (S4) remains false until the index digit again sets it true, this beng caused by the term $$K1.\overline{K2}.K3.\overline{O2}.Ro$$

introduced to the input terminal $s_4$ of the flip-flop. Then, the write amplifier 622 copies the contents of the flip-flop (S3) by means of the terms $S3.K1.\overline{K2}.O3$ and $\overline{S3}.\overline{K2}.O3.S4$. The flip-flop (S3) copies the contents of the flip-flop (Ro) so long as the flip-flop (S4) is true, this being achieved through the terms $K1.\overline{K2}.K3.\overline{O2}.S4.Ro$ and $K1.\overline{K2}.K3.\overline{O2}.\overline{Ro}$. Also, the flip-flop (S3) is set true by the term $K1.\overline{K2}.K3.\overline{O2}.\overline{Kc}.Ro$ when the flip-flop (Kc) is true and the flip-flop (Ro) is true.

The terms described above mean that for the first word time of the (Aw) phase, the index digit is inserted in the register (R) at P1 digit time and the sign digit is inserted (with an erroneous designation) at P0 digit time, the remaining digits in the register (R) are "0's" at that time. Then, during the second word time of the (Aw) phase, the index digit is inserted in the register (R) at P2 digit time. Then, following the index digit a "1" is inserted into the register (R) at P1 digit time if the flip-flop (Kc) is true and if the sign digit was a "1"; and the sign digit is again inserted in the register (R) at P0 digit time.

In like manner, during the third word time of the (Aw) phase, the divisor is added to or subtracted from the left-shifted remainder depending upon the state of the flip-flop (Kc) and the result of that operation sets the flip-flop (Kc) for the next word time of the (Aw) phase. The next index digit is inserted in the register (R) at P3 digit time. Then, a "1" is inserted into the register (R) at P2 digit time if the flip-flop (Kc) is true and if the previous P1 digit was a "1," the previous P1 digit is copied into the P1 digit position in the register (R) and the previous P1 sign digit is copied into the P0 position in the register (R). A similar operation continues from word time to word time in the (Aw) phase of the (Dv) instruction. It is noted, that the quotient appears with a fixed position in the register (R) from word time to word time. The most significant digits of the quotient are formed first, and in the proper unshifted position in the register (R). This, like in the multiplication process permits the operation to be terminated after any desired number of word times in the (Aw) phase so that a properly formed answer may be derived at any desired time. Of course, as the word times proceed in the (Aw) phase, the answer is formed with greater and greater accuracy.

Briefly, therefore, during the first word phase (Fw) of the (Dv) instruction, the register (R) is cleared to "0." Then, during the first word time of the additional word (Aw) phase, the register writes a "1" at P24 digit time and then copies "0's" through P1 digit time. At P0 digit time it writes a "1" again. This "1" acts as an index digit to tell when to write the digits into the register (R).

The two track selector flip-flops (S3) and (S4) are used to recirculate the previous quotient digits and to control the insertion of the new quotient digits. The flip-flop (S3) is used to delay the quotient digits by one bit to make the register (R) look like a 25-bit register for those digits. The above operations keeps the quotient from shifting, as noted, so that each digit remains in the position where it was inserted. By doing this, as also noted above, it is possible to terminate the operation at any time and have the quotient in the proper position for storage in the memory. The "0's" preceding the index digit and the index digit itself are recirculated without delay from the flip-flop (Ro) so that the index digit shifts one bit to the right for each word. This shifting index digit then indicates where the next quotient digit is to be inserted.

The flip-flop (S4) is used as a control to sense the index digit and to control when the contents of the flip-flop (Ro) are to be directly recorded in the register (R), or when the contents of the flip-flop (Ro) are to be delayed through the flip-flop (S3) before being recorded in the register (R). The flip-flop (S4) is set false at P24 digit time, and it is set true by the index digit in the manner described above. The index digit causes the next quotient digit to be copied from the flip-flop (Kc) into the flip-flop (S3) so that it may be recorded into the register (R). After the flip-flop (S4) is triggered true by the index digit, the flip-flop (S3) copies the contents of the flip-flop (Ro) to recirculate the previous quotient digit with a one-bit delay in the register (R). This process continues from the second word time of the (Aw) phase through the remainder of the word time of that phase. At the end of the (Aw) phase, the control flip-flop (K3) is triggered false, and the computer enters the last word phase (Lw). During this (Lw) phase, the quotient is transferred to the register (A) along with a final correction term, with proper rounding of the quotient, and by means illustrated in FIGURE 44.

In the logic circuitry of FIGURE 44, a term $$K1.\overline{K2}.\overline{K3}.\overline{O2}$$

couples the output of the flip-flop (Ro) to the input terminals of the flip-flop (Ai). Also, a term $$K1.\overline{K2}.\overline{K3}.\overline{O2}$$

couples the output terminal Ro of the flip-flop (Ro) to the input terminal $d_1$ of the flip-flop (Di).

The same terms described in conjunction with FIGURE 43 are introduced to the carry flip-flop (Ca) and to the flip-flop (Kc). The digit timing pulses P24 are introduced to the input terminal $\overline{c}_a$ of the carry flip-flop to set that flip-flop false at each $P_{24}$ digit time. The same terms couple the flip-flop (Ro) to the write amplifier 622, and couple the flip-flops ($S_3$) and ($S_4$) to that amplifier.

When the computer enters the last word (Lw) phase, the flip-flop (K3) is triggered false, as noted above. At $P_{24}$ digit time of that phase, the carry flip-flop (*Ca*) is triggered false. Also, the flip-flop (A*i*) is false at this digit time because the term $K1.\overline{K2}.\overline{K3}.\overline{O2}.P24$ of FIGURE 43 triggered it false during the least significant digit bearing the (A*w*) phase to set that digit to 0. Therefore, at $P_{24}$ digit time, the term $\overline{Ai}.\overline{Ca}$ sets the flip-flop (K*c*) false for the (L*w*) phase. The carry flip-flop (C*a*) is therefore set to the subtract configuration for the last word phase (L*w*) of the divide (D*v*) instruction.

Now, during the (L*w*) phase, the quotient is read out of the register (R) into the flip-flop (A*i*). This is achieved by the term $K1.\overline{K2}.\overline{K3}.\overline{O2}$ which causes the contents of the flip-flop (R*o*) to be read into the flip-flop (A*i*). A term $K1.\overline{K3}.\overline{K2}.P24.\overline{Ro}$ sets the flip-flop (D*i*) false for the start of quotient round-off (assuming that the least significant digit in the register (R) is "0"). Then, as the contents of the (R) register are circulated through the flip-flop (A*i*) and through the adder into the accumulator register, "0's" are subtracted, until the flip-flop (D*i*) is set true. This occurs, for the first 1 on the quotient to enter the flip-flop (A*i*). That 1 causes the term $K1.\overline{K2}.\overline{K3}.\overline{O2}.Ro$ to be true to set the flip-flop (D*i*) true. Then, during the succeeding digit times, the flip-flop (D*i*) introduces "1's" to the adder. This sets up a round-off operation. The term $K1.\overline{K3}.\overline{O2}.P0$ sets the flip-flop (D*i*) to "0" at the sign digit time. This causes the sign in the quotient to be reversed, to correct for the previous erroneous designation.

Therefore, as a result of the operation described above, the rounded-off quotient is read into the accumulator register (A) with the sign digit reversed to the proper designation during the last word phase (L*w*) of the divide instruction (D*v*). At the end of the last word phase, the computer will enter the wait alpha ($W_A$) phase for the next instruction, and the rounded-off answer will then be circulated in the accumulator register.

Figure 45:
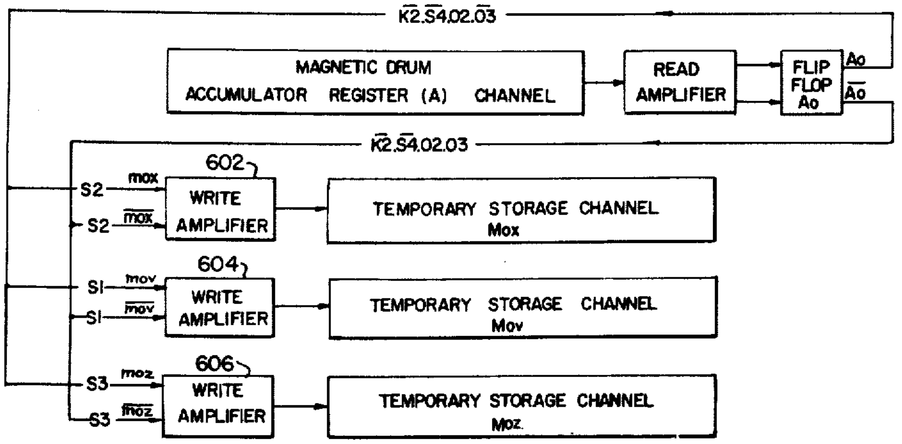
FIGURE 45 is a logic diagram of the components used to perform a store order.

In the logic diagram of FIGURE 45, a general term $\overline{K2}.\overline{S4}.O2.O3$ prepares a path from the flip-flop (A*o*) of the accumulator register (A) to the write amplifiers 602, 604 and 606. These amplifiers, as described in conjunction with FIGURE 7, are respectively coupled to the temporary storage channels ($M_{ox}$), $M_{oy}$), and ($M_{oz}$). The term $S_2$ completes this path to the input terminals of the write amplifier 602 associated with the temporary storage channel ($M_{ox}$), the term $S_1$ completes the path to the write amplifier 604 associated with the temporary storage ($M_{oy}$), and the term $S_3$ completes the path to the write amplifier 606 of the temporary storage channel ($M_{oz}$).

During the wait beta ($W_B$) phase of the normal store ($S_r$) instruction, the beta sector number designated by the instruction is selected in the described manner, and the contents of the accumulator register are then moved into the selected sector of the selected storage channel. The latter selection is determined by the beta track number portion of the instruction. The number in that portion is chosen to render the flip-flop (S4) false so that the normal store instruction may be carried out, also, the number in the beta track section of the instruction is chosen to render the flip-flop (S1), (S2) or (S3) true, depending on which storage channel the information is to be stored.

As indicated in the table of FIGURE 31, the modified store orders use the same configuration of the order flip-flops O1, O2 and O3 as the normal store order, namely, O1.O2.O3. However, for the modified store orders, use is made of the track selector flip-flop (S3) to extend the possible instruction that may be carried out by the computer, and this is achieved without the concomitant requirement for additional order flip-flops. This is possible, because the normal store order uses three only of the four track selector flip-flops. This permits the use of the track selector flip-flop (S4) in its true state to provide an additional pattern of configurations of the flip-flops (S3), (S2) and (1) so that a plurality of "modified store orders" may be carried out. The first modified store order is to shift the contents of the register (A) to the left by the number of bits specified by the alpha sector number in the instruction, and then stop the computer. This instruction is designated by the term $O1.O2.O3.S4.S3.\overline{S2}.\overline{S1}$.

The first modified store order—left shift—is carried out by a O1.O2.O3.S4.S3.S2.S1 configuration of the order and track selector flip-flops. As mentioned above, this instruction calls for a shift of the contents of the (A) register to the left by the number of bits specified by the alpha sector number in the instruction. To carry out this modified instruction, the order register flip-flops O1, O2 and O3 have the normal O1.O2.O3 configuration for the normal store order. However, the flip-flop (S4) is set true to indicate a modified store order. For the particular modified store order under discussion, the flip-flops S1, S2 and S3 are also set true.

In the logic circuitry of FIGURE 46, the term $\overline{K1}.O1$ and the term K1.O2 both couple the flip-flop (A*o*) to the input terminals of the flip-flop (A*i*). The term $K1.\overline{K2}.K3.O2.O3.S3$ couples the output terminal A*o* of the flip-flop (A*o*) to the input terminal $d_1$ of the flip-flop (D*i*). The term O2.O3 couples the output terminal $\overline{Ao}$ of the flip-flop (A*o*). to the input terminal $\overline{d}_1$ of the flip-flop (D*i*). The term K2 is also introduced to the input terminal $\overline{d}_1$ of the flip-flop (D*i*).

The term $Ai.Di.\overline{P}24$ couples the output terminal $\overline{Kc}$ of the flip-flop (K*c*) to the input terminal $c_a$ of the carry flip-flop (C*a*). The term $\overline{Ai}.\overline{Di}$ couples the output terminal $\overline{Kc}$ to input terminal $\overline{c}_a$ of the flip-flop (C*a*).

The output terminal $\overline{K2}$ of the control flip-flop (K2) is coupled by the term O1.O3.S4.P0 to the input terminal $k_1$ of the flip-flop ($K_1$). The term $\overline{K1}.O1.O2.S4.P0$ couples the output terminal $\overline{K2}$ of the flip-flop (K2) to the input terminal $k_3$ of the flip-flop (K3).

The term $K1.\overline{K2}.K3(P13-P9)$ is introduced to the input terminal $s_5$ of the flip-flop (S5). The term $(Io.\overline{S}ot+\overline{I}o.Sot)(P8-P3)$ is introduced to the input terminal $\overline{s}_5$ of the flip-flop (S5). The term $K1.\overline{K2}.P0$ couples the output terminal $S_5$ of the flip-flop (S5) to the input terminal $\overline{k}_3$ of the flip-flop (K3).

To carry out the left shift (S*r*) instruction, the computer passes through the first word (F*w*) phase, the additional words (A*w*) phase and the last word (L*w*) phase. To enable the computer to provide single left shifts, the logic is arranged so that the one or more left shifts occur only during the (A*w*) phase. It will be noted from an examination of the logic associated with the flip-flop (K2), as set forth in the appendix, that by making the terms S1 and S2 false in the instruction, the computer may be made to undergo a single shift to the left and then enter the stop phase (S*p*) (K1.K2.K3).

During the first word (F*w*) phase, the term $\overline{K1}.O1$ is true, so that the contents of the register (A) are circulated from the flip-flop (A*o*) and through the flip-flop (A*i*) to the adder. During this time, the flip-flop (D*i*) is false, having been set false at the wait beta phase by the term K2 introduced to its input terminal $\overline{d}_1$. Also, the flip-flop (K*c*) is set false at the end of the wait beta phase, and it stays false during the first word (F*w*) phase, and during the additional words (A*w*) and last word (L*w*) phases. The flip-flop (K*c*) in its false state sets the carry flip-flop (C*a*) to its add configuration, as described above.

Therefore, during the first word (F*w*) phase, the contents of the accumultaor register (A) are circulated through the adder in which they are added to 0. The resulting contents in an unshifted condition are again written into the magnetic drum channel by the write amplifier 616. At the end of the first word (F*w*) phase, however, the flip-flop (K1) is triggered true by the term $\overline{K1}.O1.O3.S4.P0$ and the flip-flop (K3) is triggered true by the term K2.$\overline{K}$1.O1.O2.S4.P0. Therefore, the computer enters its additional words (A*w*) phase. The terms K1.$\overline{K}$2.K3.O2.O3.S3 and O2.O3 now are both true, so that the contents of the flip-flop (A*o*) are read into the flip-flop (D*i*). The contents of the flip-flop (A*o*) continue to be read into the flip-flop (A*i*). Therefore, the contents of the accumulator register is passed through the adder from both the flip-flops (A*i*) and (D*i*). The flip-flop (C*a*) is set so that the contents is added to itself in the adder effectively to provide a left shift. This occurs during each word time in the additional words (A*w*) phase.

At the first word time of the additional words (A*w*) phase, the term *K1.K2.K3(P13−P9)* sets the flip-flop (S5) true at the beginning of the time of the alpha sector number in the instruction circulating through the instruction register. As long as that number is different from the $S_{ot}$ channel number, the flip-flop (S5) is returned false before the end of the word time by the term (*Io.$\overline{S}$ot+$\overline{I}$o.Sot*)(*P8−P3*). Each time that occurs, the computer stays in its additional words (A*w*) phase for an additional word time, and the contents of the accumulator register (A) undergo a further left shift. However, when coincidence does occur, the flip-flop S5 remains true, and at $P_0$ digit time, the flip-flop K3 is set false so that the computer enters its last word (L*w*) phase. The last digit of the word in the accumultaor register (A) is previously set to 0, so that the term $\overline{A}$*o*.O2.O3 sets the flip-flop (D*i*) remains false during that phase so that no further left shift occurs in the register (A).

In like manner, different configurations of the track selector relays can be used for additional modified store orders, and without changing the configuration of the order flip-flops, or requiring any additional order flip-flops. In a constructed embodiment of the invention, for example, the configuration S4.$\overline{S}$3.$\overline{S}$2.$\overline{S}$1, in conjunction with O1.O2.O3 configuration of the order flip-flops, was used to set the control flip-flops K1, K2, K3 to the K1.K2.K3 configuration which set the computer to the "stop" phase. Also, in a constructed embodiment of the invention, other configurations of the track selector flip-flops, in conjunction with O1.O2.O3 configuration of the order flip-flops is used to control certain relays. In each instance, the S4 flip-flop is set true to distinguish the modified store orders from the normal store order. Then, the $\overline{S}_3.S_1.\overline{S}_2$, the $\overline{S}_3.\overline{S}_1.S_2$ and the $\overline{S}_3.S_1.S_2$ configurations of the other track selector flip-flops are used to reset a manual input relay, set a "fix" relay and reset the "fix" relay respectively. As noted above, the flip-flop S4 in its false state was used in conjunction with the $O_1.O_2.O_3$ configuration for normal store orders. Then, when the flip-flop S1 is triggered true, the storing is placed on (M*ov*) channel, when the flip-flop *S2* is true the storing is on the (M*ox*) channel, and when the flip-flop S3 is true, the storing is on the (M*oz*) channel, as described above.

A plurality of manually initiated control signals $R_1$, $R_2$ and $R_3$ are utilized to start up the computer. For example, the control signal $R_3$, for example, sets the computer initially to its stop phase (S*p*), and clears the instruction register (*Io*) to all 1's. This control signal R3 sets the control flip-flops to the K1.K2.K3 configuration for the stop phase (S*p*). Also, this signal sets the order flip-flops to a one word operation, such as add (O1.$\overline{O}$2.$\overline{O}$3) or extract ($\overline{O}$1.$\overline{O}$2.$\overline{O}$3).

Then, the manually initiated control signal R1 takes the computer into the wait beta ($W_B$) phase and it stays there for one drum revolution. Then, it causes the computer to pass through a first word (F*w*) to a wait alpha ($W_A$) phase. During this initial wait alpha ($W_A$) phase, and as mentioned above, the first instruction is looked for in sector "0" of channel "31" in the (M*oy*) section of the drum.

An accurate record of the total elapsed time from the beginning of the program is maintained on the (M*ox*) channel of the magnetic drum. This is achieved without precisely synchronizing the drum with a timing source, and without driving the drum at a precisely determined rotational speed. The total elapsed time is maintained in binary code on the (M*ox*) channel, and may be read by the read head associated with the read amplifier 600 (FIGURE 7). As mentioned in the description of FIGURE 7, the M*ox*) channel has a separate read head which is displaced eight words from the write head of that channel, and this read head introduces its signal to the read amplifier 600. The amplifier 600, in turn, activates the read flip-flop (M*ox*). This record of elapsed time enables different matrices to be driven by the flip-flop (M*ox*) which are to respond after particular time intervals have elapsed, or which are to control circuits at predetermined intervals. Such a system is particularly useful, when the computer of the invention is utilized for the solution of celestial navigational problems.

A representation of the system used for recording the total elapsed time is illustrated in FIGURE 47. The system includes a precision frequency source (PFS), and this source is used to supply a train of output pulses which have a precisely controlled repetition frequency. This repetition frequency may, for example, be 720 pulses per second. The source (PFS) may be frequency stabilized, for example, by a tuning fork. Commercial units are known which are suitable for constituting the source (PFS). Such units, for example, are known which have an error which is less than one part in ten thousand.

The (M*ox*) channel on the magnetic drum has a plurality of its sectors allocated for time standard purposes. These sectors are chosen, for example, to be read into the read amplifier 608 every eight word times, and they may be identified by the ($\overline{W}$1.W2.W3) configurations of the word counter of counter of FIGURE 13. As described above, the word counter is synchronized with the magnetic memory drum, and it is controlled to undergo sixty-three successive configurations, as shown by the table of FIGURE 48. As illustrated in that table, the ($\overline{W}$1.W2.W3) configurations of the word counter identify the sixth, fourteenth, twenty-second, thirtieth, thirty-eighth, forty-sixth, fifty-fourth and sixty-second sectors.

The magnetic memory drum of the computer may have a rotational speed, for example, of 100 revolutions per second. Therefore, a time standard word sector of the (M*ox*) channel of the drum reaches the write head associated with the write amplifier 602 at a rate of $$64/8\times 100=800$$

times per escond, there being 64 sectors in the (M*ox*) channel on the drum (as explained above). The read head associated with the read amplifier 600 reads each time standard word sector eight word times after it passes the write head mentioned immediately above. Therefore, any information written into a time standard sector on the (M*ox*) channel of the drum at a $\overline{W}$1.W2.W3 word time is read out of that sector at the next $\overline{W}$1.W2.W3 word time for recirculation, as will be described.

The system of FIGURE 47 includes the precision frequency source (PFS) referred to above. This source includes an output terminal at which the 720 p.p.s. output pulses appear. These output pulses are designated (Y), and they are introduced to the input terminal $t_s$ of the flip-flop (T*s*). A term P24.$\overline{W}$1.W2.W3 couples the output terminal C*n* of the flip-flop (C*n*) to the input terminal $\overline{t}_s$ of the flip-flop (T*s*), and a term W1.$\overline{W}$2.W3.P0 couples the output terminal $T_s$ of the flip-flop (T*s*) to the input terminal $c_n$ of the flip-flop (C*n*).

A term $\overline{W}$2.W3.P0 is introduced to the input terminal $\overline{c}_n$ of the flip-flop (C*n*). Also, a term $\overline{W}$1.W2.W3 couples the output terminal $\overline{M}ox$ of the flip-flop (*Mox*) to the input terminal $\bar{c}_n$. A term $$W1.W2.W3(C_n.\overline{Mox}+\overline{C_n}.Mox)$$

is introduced to the input terminal $M_{ox}$ of the write amplifier 602. A term $(Cn.\overline{Mox}+\overline{Cn}.Mox)$ is introduced to the input terminal $\overline{Mox}$ of the amplifier 602.

All the time standard sectors in the (*Mox*) channel on the magnetic drum are originally cleared to zeros before a particular program begins. The flip-flop ($C_n$) serves as a "carry" flip-flop for a simple incremental adder formed by it and the flip-flop (*Ts*).

At the beginning of the program, the term $\overline{W2}.W3.P0$ sets the flip-flop (*Cn*) false at the end of the word time ($\overline{W2}.W3$) just preceding the time standard sector word time $\overline{W1}.W2.W3$ (see FIGURE 48). Then the first pulse (Y) from the source (PFS) sets the flip-flop (*Ts*) true. This causes the flip-flop (*Cn*) to be set true at the end of the word time $W1.\overline{W2}.W3$ just preceding a time standard sector word time $\overline{W1}.W2.W3$ by the term $$W1.\overline{W2}.W3.P0.Ts$$

The flip-flop (*Cn*) remains true, in typical carry manner until a zero digit during that time standard sector word time causes the term $\overline{Mox}.\overline{W1}.W2.W3$ to be true so as to set the flip-flop (*Cn*) false.

Therefore, during the first time standard word time of the program, the time standard word in one of the time standard sectors in the (*Mox*) channel (which is now zero) is read through the circuitry of FIGURE 47, and a "1" is added to the least significant digit position of that word. The new time standard word is written into the next time standard sector of the (*Mox*) channel through the write amplifier 602. This new word is read during the next time standard word time and introduced to the read amplifier 600, and the above described operations are repeated so that another "1" may be added to the time standard word. In this manner, the time standard word is circulated through the circuitry of FIGURE 47 from one time standard sector to the next on the (*Mox*) channel, and with a "1" being added to the number for each such circulation. This action continues for each successive pulse from the source (PFS). Each such pulse causes a digit to be added to the time standard word as it is circulated from one sector to the next on the (*Mox*) channel of the magnetic memory drum.

It will be appreciated, however, that the magnetic memory drum is assumed to be rotating at 100 revolutions a second, and therefore assumed to be a time standard word at each eighth sector position in the (*Mox*) channel. Therefore, the time standard words are read by the read head associated with the amplifier 600 at a rate of 800 times a second. However, the pulses from the source (PFS) recur at a rate of 720 pulses per second. Therefore, after a number of drum revolutions, a term $\overline{W2}.W3.P0$ will reoccur prior to a succeeding pulse from the source (PFS) and when the flip-flop (*Cn*) is still false. When the next pulse from the source (PFS) does occur, and the carry flip-flop (*Cn*) is again triggered true by the term $W1.\overline{W2}.W3.P0.Ts$ in the described manner, a "1" will again be added to the time standard word of the (*Mox*) channel. However, in the interim, the previous time standard word in that channel is circulated without change due to the composition of the input terms to the write amplifier 602.

In a manner described in the preceding paragraph, each pulse from the precision frequency source (PFS) causes the total time record on the (*Mox*) channel, which is in binary coded form, to increase by one digit. Moreover, this is achieved without the need for any precise driving speed of the magnetic drum, or for precise synchronization between the drum and a timing source. It has been found that an accurate total elapsed time record can be maintained on the drum, so long as the speed of the drum remains within 10 percent of the equality value with the established time standard.

The logic required to perform a typical output operation is illustrated in FIGURE 49. In such an operation, for example, the digital output numbers are converted to analog quantities, and each analog quantity is used to control the charge on a capacitor unit. The resulting charge across the capacitor unit represents a computed result from the computer, and may be used to perform any desired control or indicating function. The charges across the different capacitor units are also converted back to digital numbers and fed back into the computer. The resulting returned digital numbers are then compared with the respective output numbers so that appropriate charges may flow into the capacitor unit until servo equilibrium is established. When such establishment has been achieved, the charge across the particular capacitor unit is the analog equivalent of the corresponding computed output number from the computer. A plurality of such capacitor units may be used in conjunction with the computer, and the word counter described in conjunction with FIGURE 13 and in the table of FIGURE 48 may be used to control an appropriate matrix, so that the different capacitor units may be gated into circuit at different particular word times. Such an arrangement provides a continuous cyclic control of the capacitor units.

The different output numbers are fed from the accumulator register to the (*Mox*) temporary storage channel on the magnetic memory, as mentioned above. This storing is in response to a normal store (*Sr*) instruction, together with the S2 address designation. Therefore, and as illustrated in FIGURE 49, a particular output number is stored in a designated sector of the (*Mox*) temporary storage channel by means of the term $\overline{K1}.\overline{K2}.O2.O3.\overline{S4}.Ao.S2$ which is introduced to the input terminal $m_{ox}$ of the write amplifier 602, and by the term $\overline{K1}.\overline{K2}.O2.O3.\overline{S4}.\overline{Ao}.S2$ introduced to the input terminal $\overline{m}_{ox}$ of the write amplifier 602.

The output system utilizes the flip-flop (*Cc*), the input-output flip-flop (*Mn*), and the borrow flip-flop (*Cn*). The system of FIGURE 49 also uses an analog-to-digital converter (CON1). This converter may be similar to the analog-to-digital converter described in the copending application Serial No. 836,537, filed August 27, 1959, of Robert McIntyre. A plurality of capacitor units, such as those referred to above are also utilized, four such units being illustrated in FIGURE 50 and designated C1, C2, C3 and C4.

The term $W1.W2.W3(Mox.\overline{M}n+\overline{M}ox.Mn)$ is introduced to the input terminal $c_c$ of the flip-flop (*Cc*). The term $\overline{W1}.\overline{W2}.P24.Cn$, and the term $\overline{W1}.\overline{W2}.W3.P24$ are both introduced to the input terminal $\bar{c}_c$ of the flip-flop (*Cc*). The term $Mn.W1.W2.W3.\overline{M}ox.\overline{P0}$, and the term $W1.W2.W3(\overline{M}ox.Mn+Mox.\overline{M}n)P0$ are introduced to the input terminal $c_n$ of the flip-flop (*Cn*). The term $Mox.W1.W2.W3.\overline{M}n.\overline{P0}$, the term $$W1.W2.W3(Mox.\overline{M}n+\overline{M}ox.Mn)P0$$

and the term $\overline{W1}.W2.W3.P0$ are all introduced to the input terminal $\bar{c}_n$ of the flip-flop (*Cn*).

The output terminal *Cn* of the flip-flop (*Cn*) is coupled by a term W1.W2.W3.P0 to the input terminal of a control unit No. 1. A term $W4.\overline{W5}.\overline{W6}$ couples the control unit No. 1 to the capacitor unit C1; a term $\overline{W4}.W5.\overline{W6}$ couples the control unit No. 1 to the capacitor unit C2; a term $W4.W5.\overline{W6}$ couples the control unit No. 1 to the capacitor unit C3; a term $\overline{W4}.\overline{W5}.W6$ couples the control unit No. 1 to the capacitor unit C4.

The output terminal *Cc* of the flip-flop (*Cc*) is coupled by a term $\overline{W1}.\overline{W2}.\overline{W3}.P0$ to a control unit No. 2. A term $W4.\overline{W5}.\overline{W6}$ couples the control unit No. 2 to the capacitor unit C1; a term $\overline{W4}.W5.\overline{W6}$ couples the control unit No. 2 to the capacitor unit C2; a term W4.W5.$\overline{W6}$ couples the control unit No. 2 to the capacitor unit C3; and a term $\overline{W4}.\overline{W5}$.W6 couples the control unit No. 2 to the capacitor unit C4.

The control unit No. 1 may be of any known construction, and it responds to an input signal to supply a particular negative charge increment to a corresponding one of the capacitor units C1–C4 whenever a path is completed to that capacitor unit. The control unit No. 2 may be similar to the control unit No. 1, with the exception that the control unit No. 2 responds to an input signal to supply a particular positive charge increment to respective ones of the capacitor units C1–C4 upon the selection completion of appropriate paths to the capacitor units.

The capacitor unit C1 is coupled to the analog-to-digital converter (CON1) by the term $\overline{W4}.\overline{W5}.\overline{W6}$. A term W4.$\overline{W5}.\overline{W6}$ couples the capacitor unit C3 to the converter (CON1), and a term W4.W5.$\overline{W6}$ couples the capacitor C4 to the converter (CON1). It will be appreciated that more or less capacitor units may be used, and that the W4, W5 and W6 terms are word timing terms which couple the different capacitor units into the activating circuits at different word times.

The output numbers on the (Mox) temporary storage channel may be stored at sectors occurring each eight word times. For example, with reference to FIGURE 49, the output numbers may be stored at the sectors occurring at the seventh, fifteenth, twenty-third, thirty-first, thirty-ninth, forty-seventh, fifty-fifth and sixty-third word times. Each of the sectors is identified by the W1.W2.W3 configuration of the word counter, this configuration occurring every eighth word time of the word counter.

The terms associated with the capacitor units C1–C4 cause a different capacitor unit to be brought into the circuit for each one of these different output number word times. For example, the capacitor unit C1 feeds its output into the analog-to-digital converter (CON1) during the first eight word times of the table of FIGURE 49 during which the term W4.W5.W6 is true, and the resulting digital output from the converter (CON1) actuates the flip-flop (Mn). During the eighth word time of the table of FIGURE 49, when the term W1.W2.W3 is true, the resulting output from the flip-flop (Mn) due to its actuation by the digital signal from the converter (CON1) and corresponding to the charge across the capacitor unit C1 is introduced to the flip-flop (Cn). At the same time, the corresponding output number from the temporary storage channel flip-flop (Mox) is introduced to the flip-flop (Cn).

The flip-flop (Cn) is set false at the end of the seventh word time by the term $\overline{W1}$.W2.W3.P0 which is introduced to its input terminal $\bar{c}_n$. Then, during the eighth word time, the output from the flip-flop (Mn) is compared with the output from the flip-flop (Mox) in the flip-flop (Cn). This comparison is carried out from P24–P1 digit times in the eighth word time by the term Mn.$\overline{Mox}$.W1.W2.W3.$\overline{P0}$ introduced to the input terminal $c_n$, and by the term $\overline{Mn}$.Mox.W1.W2.W3.$\overline{P0}$ introduced to its input terminal $\bar{c}_n$.

If the number from the flip-flop (Mn) is greater than the corresponding number from the flip-flop (Mox), the flip-flop (Cn) will be in a true state at P0 digit time at the end of the eighth word time. This means that the charge across the capacitor unit C1 is too high, and the control unit No. 1 is activated through the term W1.W2.W3.P0 from the output terminal Cn. Then, at the ninth word time, the term W4.$\overline{W5}.\overline{W6}$ becomes true so that a negative charge from the control unit No. 1 is introduced to the capacitor unit C1 to reduce the charge on that unit. This is, repeated for each revolution of the drum until the charge on the capacitor unit is reduced to a level such that the output number from the flip-flop (Mn) is the same as the output number read out of the flip-flop (Mn).

The same operation is performed for the capacitor unit C2 during the following word times. At the ninth word time, the term W4.$\overline{W5}.\overline{W6}$ becomes true to connect the capacitor unit C2, rather than the capacitor unit C1, to the analog-to-digital converter (CON1). Then, if the charge on the capacitor unit C2 is too high; the control unit No. 1 is activated at the end of the sixteenth word time, and the charge on the capacitor unit C2 is reduced during the seventeenth word time as the term W4.W5.W6 becomes true. In like manner, the capacitor units C3 and C4 are successively connected at subsequent word times to the analog converter (CON1) and the charge of these capacitor units is reduced to be the equivalent of their corresponding output numbers, if their original charge is too high.

If, on the other hand, the charge on a capacitor unit, such as the unit C1 is too low, so as to introduce a negative error, the output number from the flip-flop (Mn) will be less than the output number from the flip-flop (Mox), and the flip-flop (Cn) will be in a false state at the end (P0) of the eighth word time W1.W2.W3. This will cause the flip-flop (Cc) to be in a true state during the ninth word time ($\overline{W1}.\overline{W2}.\overline{W3}$). This is because the flip-flop (Cc) is set false at the beginning of the fifth word time of the term $\overline{W1}.\overline{W2}$.W3.P24, and it is set true at the end of the eighth word time by the term $W1.W2.W3(Mox.\overline{Mn}+\overline{Mox}.Mn)$ so long as the number read out of the flip-flop (Mn) during the eighth word time is not equal to the number read out of the flip-flop (Mox) at that word time. However, if the number read out of the flip-flop (Mn) is greater than the number read out of the flip-flop (Mox) during the eighth word time, the flip-flop (Cn) is true at the end of that word time, as described above. This causes the term $\overline{W1}.\overline{W2}$.P24.Cn to trigger the flip-flop (Cc) false at the beginning of the ninth word time. The flip-flop (Cc) is, therefore, true during the ninth word time, only if the charge on the capacitor unit C1 is too low.

The true condition of the flip-flop (Cc) during the ninth word time causes the control unit No. 2 to be activated and this latter control unit introduces a positive charge to the capacitor unit (C1) at the tenth word time when the term W4.$\overline{W5}.\overline{W6}$ is true. In like manner, the capacitor units C2, C3 and C4 have their charges increased when the presence of too high a charge on any one of these units causes the flip-flop (Cn) to be false at the end of the comparison period.

The term $W1.W2.W3.(\overline{Mox}.Mn+Mox.\overline{Mn})P0$ introduced to the left and right input terminals of the flip-flop (Cn) together with the appropriate cross terms Cn and $\overline{Cn}$ (not included) causes the flip-flop to be unaffected by the sign digits of the numbers from the flip-flop (Mn) and from the flip-flop (Mox) if the signs are the same. However, if the signs are different, the flip-flop (Cn) is caused to be triggered to its opposite state at the P0 digit time to reverse the procedure and operations described above.

Therefore, if one of the compared numbers is greater than the other, the term W1.W2.W3.P0.Cn causes the selected capacitor unit to be charged negatively by the control unit 1 so as to overcome a positive error. However, if the error is negative, the term $\overline{W1}.\overline{W2}.\overline{W3}$.P0.Cc causes the corresponding capacitor unit to be charged positively in the following word time by the control unit #2 to overcome this negative error. For each succeeding drum revolution, the comparison is made of each of the capacitor units, and at successive W1.W2.W3 word times. When equality is reached, and the charge across a particular capacitor unit corresponds to its output number on the (Mox) storage channel, the flip-flop (Cn) is false at the corresponding W1.W2.W3 word time, and the flip-flop (Cc) is false at the word time $\overline{W1}.\overline{W2}.\overline{W3}$, for the reasons explained above. Under these conditions, no compensating voltage flows into the capacitor units of either polarity, and the voltage across the capacitor unit remains at its value of equality. The flip-flop (C*c*) is false during this latter condition, because the term $W1.W2.W3.(Mox.\overline{M}n+\overline{M}ox.Mn)$ does not become true to set the flip-flop (C*c*) true during the W1.W2.W3 word time.

A suitable circuit for the capacitor units, such as the units C1, C2, C3 and C4 in FIGURE 49, is shown in FIGURE 50. Each of these capacitor units may incorporate, for example, a capacitor 2000 and a capacitor 2002. Each of these capacitors has a grounded terminal. The ungrounded terminal of the capacitor 2000 is connected to the cathode of a diode 2004 and to an output terminal 2006. The ungrounded terminal of the capacitor 2002 is connected to the anode of a diode 2008 and to an output terminal 2010. The output from the unit is derived across the output terminals 2006 and 2010.

The anode of the diode 2004 is connected to a resistor 2012 and to the anode of a diode 2014. The resistor 2012 is connected to the positive terminal of a source of direct voltage which may, for example, have a potential of 25 volts. The cathode of the diode 2008 is connected to the anode of a diode 2016 and to a resistor 2018. The resistor 2018 is connected to the negative terminal of a direct voltage source. This direct voltage source may have a potential, for example, of 25 volts. A first input terminal 2020 is connected to the cathode of the diode 2014. This input terminal may, for example, receive a positive input from the control unit #1 when the flip-flop (C*n*) is true at W1.W2.W3.P0 time. Otherwise, the voltage of the input terminal 2020 is reduced to zero.

The cathode of the diode 2016 is connected to the emitter of a transistor 2022. The transistor 2022 may be an NPN transistor, and it is connected as an emitter follower. The emitter of the transistor 2022 is connected to a resistor 2024 which, in turn, is connected to the negative terminal of a direct voltage source. This source may have a potential of, for example, 35 volts.

The collector of the transistor 2022 is connected to the positive terminal of a direct voltage source. This latter direct voltage source may, for example, have a potential of 25 volts. A second input terminal 2026 is connected to the base of the transistor 2022. The input terminal 2026 may, for example, receive a positive potential from the control unit #2 during the comparisons made in the system of FIGURE 49 and when the flip-flop (C*c*) is true at $\overline{W1}.\overline{W2}.\overline{W3}$.P0 time. Otherwise, the potential introduced to the input terminal 2026 is reduced to zero.

Whenever the potential introduced to the input terminal 2020 is reduced to zero, the diode 2014 becomes conductive, and reduces the potential at the anode of the diode 2004 essentially to ground potential. A positive charge is normally developed across the capacitor 2000, so that the diode 2004 is rendered non-conductive. Likewise, whenever the potential at the input terminal 2026 is reduced to zero or ground potential, the resulting negative potential, the transistor 2002 is non-conductive and the emitter potential is substantially at zero volts. This causes the diode 2016 to be conductive, and to establish the cathode of the diode 2008 at essentially zero or ground potential. A negative charge is normally established across the capacitor 2002, so that the diode 2008 is non-conductive.

Under the conditions described in the preceding paragraph, in which the input voltage at the terminals 2020 and 2026 is essentially zero, a positive charge exists across the capacitor 2000, and an equal and opposite negative charge exists across the capacitor 2002. Therefore, the error voltage across the output terminals 2006 and 2010 is essentially zero.

However, when a positive voltage is introduced to the input terminal 2020, the diode 2014 becomes non-conductive, and the diode 2004 becomes conductive to permit a current flow into the capacitor 2000 to increase the positive charge across that capacitor. This occurs when the flip-flop (C*n*) is false and the flip-flop (C*c*) is true to indicate a negative error, and this charge compensates for that error.

Likewise, when a positive voltage is introduced to the input terminal 2026 indicative of a positive error, and when the flip-flop (C*n*) is true at P0 digit time, the resulting conductivity of the transistor 2022 causes the emitter of that transistor to be positive. The diode 2016 is now rendered non-conductive, and a negative current flows through the diode 2018 to increase the negative charge on the capacitor 2002. This produces the desired compensation for the positive error.

The invention provides, therefore, an improved electronic digital computer which is constructed to be extremely compact in size and light in weight.

To assist in the reduction of size of the computer, the number of instructions which may be handled by the computer directly have been reduced to a minimum. However, the dual use of the track selector flip-flops for order register purposes, in accordance with the concepts of the invention, extends the number of possible instructions which may be executed by the computer without a corresponding increase in the number of components required, or in a concomitant increase in associated logic circuitry.

The above factors, and other considerations, cooperate in the present invention to result in an extremely useful and flexible general purpose digital computer. The resulting computer of the present invention is capable of operating with a high degree of speed and precision and yet it may be packaged into an extremely small housing.

*Appendix*

The following is a list of the terms and logic utilized in the computer described in the preceding specification, and an indication as to how the different logic equations are derived. The various terms have been fully identified in the specification.

(A) Emitter followers:

$$f_s=\{\overline{K3}.\overline{T4}.K1.\overline{K2}+\overline{K1}.Kw[T4.\overline{K3}+Tr(T3+T1.T2)]\}T5$$

$$f_t=(Io.\overline{Sot}+\overline{Io}.Sot)$$

$$f_a=(Ca.\overline{Ai}+\overline{Ca}.Ai)$$

$$\overline{f_a}=(Ca.Ai+\overline{Ca}.\overline{Ai})$$

$$\overline{P0}=\overline{T5}+T3+\overline{T2}+T1$$

$$\overline{P24}=T5+\overline{T4}+T3+T1$$

$$P0=T5.\overline{T3}.T2.\overline{T1}$$

$$P24=\overline{T5}.T4.\overline{T3}.\overline{T1}$$

(B) Signals:

[T*s*—Time standard]

R1, R2 and R3—Control face

E*f*,E*f*, E*f**, G, G*, G,L,L, J, J, M*d*, E, E—Test and fill equipment signals (C) Coincidence flip-flop (K*c*):

$k_c$ (1) $P0.\overline{K1}.K2 \ldots (W_A+W_B)P0$ (2) $P0.\overline{K1}.\overline{K3}.\overline{O3} \ldots (F_W+W_A)\overline{K3}.P0(Ad+Su+At+Mu)$ (3) $K1.\overline{K2}.\overline{S3}.O3.P0 \ldots (Aw+Lw)(Ad+Su+At+Mu)\overline{S3}.P0$ (4) $K2.\overline{K3}(P13-P9) \ldots (W_A+Ir)(P13-P9)$ (5) $K1.\overline{K2}.\overline{O2}(Ai.Ca+\overline{Ai}.Ca)P24 \ldots (Aw+Lw)(Ad+At+Ex+Dv)\overline{Fa}.P24$ Therefore:

$$k_c=P0.\overline{K1}(K2+\overline{K3}.\overline{O3})+T5.\overline{T4}.K2.\overline{K3}+K1.\overline{K2}(P0.\overline{O3}.\overline{S3}+\overline{O2}.\overline{Fa}.24)$$

$\overline{k_c}$ (1) $\overline{K1}.\overline{K2}.\overline{O2}.P0 \ldots (W_A+W_B)(Ad+At+Ex+Dv)P0$ (2) $\overline{K1}.K2.O3.P0 \ldots (W_A+W_B)(Tc+Dv+Ex+Sr)P0$ (3) $\overline{K1}.K2.\overline{O1}.\overline{Ao}.P0 \ldots (W_A+W_B)(At+Mu+Tc+Ex)\overline{Ao}.P0$ (4) $\overline{K1}.\overline{K2}.K3.\overline{O3}.P0 \ldots (Fw)K3(Ad+Su+At+Mu)P0$ (5) $K1.\overline{K2}.O2.S3.P0 \ldots (Aw+Lw)(Su+Mu+Tc+Sr)S3.P0$ (6) $K1.\overline{K2}.O3.P24(Ai.\overline{Ca}+\overline{Ai}.Ca) \ldots (Aw+Lw)(Tc+Ex+\underline{Dv}+\underline{Sr})Fa.P24$ (7) $\overline{K1}.K2(Io.\overline{Sot}+\overline{Io}.Sot)\overline{T5}.T4 \ldots (W_A+W_B)Fi(P24-P19)$ (8) $\overline{K1}.K2(Io.\overline{Sot}+\overline{Io}.Sot)\overline{T5}.\overline{K3} \ldots (W_A)(Fi)P24/P19+P8/P3)$ Therefore:

$$\overline{k_c}=\overline{K1}\{K2[P0(\overline{O2}+O3.\overline{O1}.\overline{Ao})+Ft.\overline{T5}(T4+\overline{K3})]+\overline{K2}.K3.\overline{O3}.P0\}+K1.\overline{K2}(O3.Fa.P24+O2.S3.P0)$$

(D) First control flip-flop (K1):

$k_1$ (1) $R3$ (2) $\overline{K2}.\overline{O1}.O2.P0 \ldots (Lw+Aw+Fw)(\underline{Mu}=Tc)P0$ (3) $\overline{K2}.O1.03.S4.P0 \ldots (Lw+Aw+Fw)(Dv+Sr)S4.P0$ (4) $\overline{K2}.O1.O3.\overline{O2}.P0 \ldots (Lw+Aw+Fw)(Dv)P0$ (5) $K2.Kc.\overline{K3}.P0 \ldots (W_A+Ir)Kc.P0$ (6) $K2.Kc.\overline{O1}.O2.O3.P0 \ldots (W_A+W_B+Ir+Sr)Tc.P0.Kc$ (7) $J.P0$ Therefore:

$$k_1=R3+P0\{\overline{K2}[\overline{O1}.O2+O1.O3(S4+\overline{O2})]+K2.Kc(\overline{K3}+\overline{O1}.O2.O3)+\overline{J}\}$$

$\overline{k_1}$ (1) $P0.J.K2.\overline{Ef} \ldots (W_A+W_B+Sr+Ir)P0.J.\overline{Ef}$ (2) $P0.J.K2.R1.\overline{W6} \ldots (W_A+W_B+Sr+Ir)R1.\overline{W6}.P0.J$ (3) $P0.J.K2.\overline{K3} \ldots (W_A+Ir)J.P0$ Therefore:

$$\overline{k_1}=P0.J\{\overline{Ef}+R1.\overline{W6}+\overline{K3}\}K2$$

(E) Second control flip-flop (K2):

$k_2$ (1) $R3$ (2) $J.P0$ (3) $K1.\overline{K3}.P0 \ldots (Ir+Lw)P0$ (4) $K1.O1.O2.\overline{S1}.\overline{S2}.P0 \ldots (Sr+Ir+Aw+Lw)(Su+Sr)\overline{S1}.\overline{S2}.P0$ (5) $\overline{K1}.O1.O3.P0 \ldots (W_A+W_B+Fw)(Ad+Su)P0$ (6) $\overline{K1}.O1.O2.\overline{S4}.P0 \ldots (W_A+W_B+Fw)(Su+Sr)P0.\overline{S4}$ (7) $\overline{K1}.\overline{O1}.\overline{O2}.P0 \ldots (W_A+W_B+Fw)(At+Ex)P0$ Therefore:

$$k_2=R3+P0\{J+K1(\overline{K3}+O1.O2.\overline{S2}.\overline{S1})+\overline{K1}[O1(\overline{O3}+O2.\overline{S4})+\overline{O1}.\overline{O2}]\}$$

$\overline{k_2}$:

(1) $K1.K2.Kc.J(\overline{O3}+O1+\overline{O2})P0 \ldots (W_B+Fw)\overline{Tc}.J.Kc.P0$ Therefore:

$$\overline{k_2}=\overline{K1}.K3.Kc.J(\overline{O3}+O1+\overline{O2})P0$$

(F) Shared control flip-flop (K3):

$k_3$ (1) $R3$ (2) $P0.\overline{J}$ (3) $K1.K2.P0 \ldots (Sr+Ir)P0$ (4) $\overline{K1}.\overline{K2}.O1.O3.S4.P0 \ldots (Fw)(Dv+Sr)S4.P0$ (5) $\overline{K1}.\overline{K2}.O1.\overline{O2}.O3.P0 \ldots (Fw)(Dv)P0$ (6) $\overline{K1}.\overline{K2}.\overline{O1}.O2.Ao \ldots (Fw)(\underline{Mu}+Tc)Ao$ (7) $\overline{K1}.\overline{K2}.\overline{O1}.O2.P0 \ldots (Fw)(Mu+Tc)P0$ Therefore:

$$k3=R3+P0\{\overline{J}+K1.K2+\overline{K1}.\overline{K2}.O1.O3(S4+\overline{O2})\}+\overline{K1}.\overline{K2}.\overline{O1}.O2[Ao+P0]$$

$\overline{k_3}$ (1) $\overline{K1}.\overline{K2}.\overline{O1}.\overline{O2}.\overline{Ao}.\overline{P0} \ldots (Fw)(Mu+Tc)\overline{Ao}.\overline{P0}$ (2) $\overline{K1}.\overline{O12}.O2.O3.Ai.P24 \ldots (W_A+W_B+Fw)Tc.Ai.P24$ (3) $K1.\overline{K2}.S5.P0.J \ldots (Lw+Aw)S5.P0.J$ (4) $K1.K2.Md.\overline{Ef^*}.P0.J \ldots (Sr+Ir)Md.\overline{Ef^*}.P0.J$ (5) $\overline{K1}.K2.Kc.P0.J \ldots (W_A+W_B)Kc.P0.J$ Therefore:

$$\overline{k_3}=\overline{K1}.\overline{O1}.O2[\overline{Ao}.\overline{K2}.\overline{P0}+O3.Ai.P24]+P0\{K1[K2.S5+Md.K2.\overline{Ef^*}]+\overline{K1}.K2.Kc\}J$$

(G) Order flip-flop (O1, O2 and O3):

$o_1=(K1.K2.\overline{K3}+L)O2$ $\overline{o_1}=(K1.K2.\overline{K3}+L)\overline{O2}$ $o_2=(K1.K2.\overline{K3}+L)O3$ $\overline{o_2}=(K1.K2.\overline{K3}+L)\overline{O3}+R3$ $o_3=(K1.K2.\overline{K3}.Moy+L.E+R3)$ $\overline{o_3}=(K1.K2.\overline{K3}.\overline{Moy}+L.\overline{E}+R3)$ (H) Word counter (W1–W6):

$w_1=P0+Sot.T5.\overline{T4}$ $\overline{w_1}=P0$ $w_2=P0W1+Sot(P13-P9)$ $\overline{w_2}=P0W1$ $w_3=P0.W1.W2+Sot(P13-P9)$ $\overline{w_3}=P0.W1.W2$ $w_4=P0.W1.W2.W3+Sot(P13-P9)$ $\overline{w_4}=P0.W1.W2.W3$ $w_5=P0.W1.W2.W3.W4+Sot(P13-P9)$ $\overline{w_5}=P0.W1.W2.W3.W4$ $w_6=P0.W1.W2.W3.W4.W5+Sot(P13-P9)$ $\overline{w_6}=P0.W1.W2.W3.W4.W5$ (I) Bit counter (T1–T5):

$t_1=\overline{T5}+T3+T2.Sot$ $\overline{t_1}=\overline{T4}+\overline{T3}+\overline{T2}$ $t_2=T1$ $\overline{t_2}=T1(\overline{T4}.\overline{T5}+\overline{T3})$ $t_3=T1.T2$ $\overline{t_3}=T1.T2$ $t_4=T1.T2.T3.\overline{T5}$ $\overline{t_4}=T1.T2.T3.T5$ $t_5=T1.T2.T3$ $\overline{t_5}=T2(\overline{T3}.\overline{T1}+\overline{T4}.T3.T1)$ (J) Track selector flip-flop (S1):

$s_1$ (1) $K1.\overline{K2}.K3.Ao.\overline{O2} \ldots (Aw)Ao(Ad+At+Er+\underline{Dv})$ (2) $S2.Fs \ldots S2\{(W_A+W_B)(P18-P9)+(W_A+Lm)(P13-P9)\}$ Therefore:

$$s_1=K1.\overline{K2}.K3.Ao.\overline{O2}+S2.Fs$$

$\overline{s}$ (1) $K1.\overline{K2}.K3.\overline{Ao}.\overline{O2} \ldots (Aw)(Ad+At+Ex+Dv)\overline{Ao}$ (2) $\overline{S2}.Fs$ Therefore:

$\overline{s_1}=K1.\overline{K2}.K3.\overline{Ao}.\overline{O2}+\overline{S2}.Fs$ (K) Track selector flip-flop (S2):

$s_2$ (1) $Do.\overline{K1}.\overline{K2}.\overline{O2}.P0$ . . . $(Fw)Do.P0(Dv+Ao+At+Ex)$ (2) $K1.\overline{K2}.K3(\overline{O2}+\overline{O3})Do$ . . . $(Aw)(Ex+Dv+Ad+Su+At+Mu)Do$ (3) $S3.Fs$ . . . $S3\{(W_A+W_B)(P18-P14)+(W_A+Lw)(P13-P9)\}$ Therefore:

$s_2=Do.\overline{K2}[\overline{K1}.\overline{O2}.P0+K1.K3(\overline{O2}+\overline{O3})]+S3.Fs$ $\overline{s_2}$ (1) $\overline{K1}.\overline{K2}.\overline{O2}.P0.\overline{Do}$ . . . $(Fw)\overline{Do}.P0(Dv+Ao+At+Ex)$ (2) $K1.\overline{K2}.K3(\overline{O2}+\overline{O3})\overline{Do}$ . . . $(Aw)(Ex+\underline{Dv}+Ad+Su+At+Mu)\overline{Do}$ (3) $\overline{S3}.Fs$ Therefore:

$\overline{s_2}=\overline{Do}.\overline{K2}[\overline{K1}.\overline{O2}.P0+K1.K2(\overline{O2}+\overline{O3})]+\overline{S3}.Fs$ (L) Track selector flip-flop (S3):

$s_3$:

(1) $K1.\overline{K2}.K3.\overline{O2}.Ro(Kc+S4)$ . . . $(Aw)(Ad+At+Ex+Dv)Ro(Kc+S4)$ (2) $\overline{K1}.\overline{K2}.\overline{O2}.P0$ . . . $(Fw)(Dv+Ao+At+Ex)P0$ (3) $K1.\overline{K2}.K3.\overline{O1}.S4$ . . . $(Aw)(At+\underline{Mu}+Tc+Ex)S4$ (4) $S4.Fs$ . . . $S4\{(W_A+W_B)(P18-P14)+(W_A+Lw)(P13-P9)\}$ Therefore:

$s_3=\overline{K2}\{K1.\overline{K3}[\overline{O2}.Ro(Kc+S4)+\overline{O1}.S4]+\overline{K1}.\overline{O2}.P0\}+S4.Fs$ $\overline{s_3}$:

(1) $K1.\overline{K2}.K3.\overline{O2}(\overline{Sr}.\overline{KC}+\overline{Ro})$ . . . $(Aw)(Ad+At+Ex+Dv)(\overline{S4}.\overline{K2}+\overline{Ro}$ (2) $K1.\overline{K2}.K3.\overline{O1}.\overline{S4}$ . . . $(Aw)(At+\underline{Mu}+Tc+Ex)\overline{S4}$ (3) $\overline{S4}.Fs$ Therefore:

$\overline{s_3}=K1.\overline{K2}.K3\{\overline{S4}(\overline{O2}.\overline{Kc}+\overline{O1})+\overline{O2}.\overline{Ro}\}+\overline{S4}.Fs$ (M) Track selector flip-flop (S4):

$s_4$ (1) $K1.\overline{K2}.K3.\overline{O3}.Ro$ . . . $(Aw)(Ad+Su+At+\underline{Mu})Ro$ (2) $K1.\overline{K2}.K3.\overline{O2}.Ro$ . . . $(Aw)(Ad+At+Ex+\underline{Dv})Ro$ (3) $S5.Fs$ . . . $S5[(W_A+W_B)(P18-P14)+(W_A+W_B)(P13-P9)]$ Therefore:

$s_4=K1.\overline{K2}.K3.P0(\overline{O3}+\overline{O2})+S5.Fs$ $\overline{s_4}$ (1) $K1.\overline{K2}.\overline{O3}.K3.\overline{Ro}$ . . . $(Aw+Lw)(Ad+At+Ex+\underline{Dv})P24.\overline{Ro}$ (2) $K1.\overline{K2}.\overline{D2}.P24.\overline{Ro}$ . . . $(Aw+Lw)(Ad+At+Ex+\underline{Dv})P24.\overline{Ro}$ (3) $\overline{K1}.\overline{K2}.\overline{O3}.P0$ . . . $(FW)(Ad+Su+At+\underline{Mu})P0$ (4) $\overline{S5}.Fs$ Therefore:

$\overline{s_4}=\overline{K2}[\overline{Ro}.K1(\overline{O3}.K3+\overline{O2}.P24+\overline{K1}.\overline{O3}.P0)]+\overline{S5}.Fs$ (N) Track selector flip-flop (S5):

$s_5$ (1) $K1.\overline{K2}.K3(P13-P9)$ . . . $(Aw)(P13-P9)$ (2) $Io.Fs$ . . . $[(W_A+W_B)(P18-P14)+(W_A+Lw)(P13-P9)]$ Therefore:

$s_5=K1.\overline{K2}.K3(P13-P9)+Io.Fs$ $\overline{s_5}$ (1) $\overline{Io}.Fs$ (2) $K1.\overline{K2}.K3.Fi.\overline{T5}.\overline{T4}$ . . . $(Aw)(P8-P3)(Io.\overline{Sot}+\overline{Io}.Sot)$ Therefore:

$\overline{s_5}=K1.\overline{K2}.K3.Fi.\overline{T5}.\overline{T4}+\overline{Io}.Fs$ (O) Accumulator flip-flop (A$i$):

$a_1$:

(1) $Ao.K2$ . . . $(Sr+Ir+W_A+W_B)Ao$ (2) $Ao.\overline{K1}.O1$ . . . $(W_A+W_B+Fw)(Ad+Su+Dv+Sr)Ao$ (3) $K1.Ao.O2$ . . . $(Sr+Ir+Aw+Lw)Ao(Su+Mu+Tc+Sr)$ (4) $K1.\overline{K2}.\overline{K3}.\overline{O2}.Ro$ . . . $Lw.Ro(Ad+At+Ex+Dv)$ (5) $K1.\overline{K2}.K3.\overline{O2}.S1.\overline{P24}$ . . . $Aw.S1.\overline{P24}(Ad+At+Ex+Dv)$ Therefore:

$a_1=Ao[K2+\overline{K1}.O1+K1.O2]+\overline{K2}\{K1.\overline{O2}[Ro.\overline{K3}+S1.\overline{P24}.K3]\}$ $\overline{a_1}$ (1) $\overline{Ao}.K2$ . . . $(Sp+Ir+W_A+W_B)\overline{Ao}$ (2) $\overline{Ao}.\overline{K1}.O1$ . . . $(W_A+W_B+Fw)(Ad+Su+Dv+Sr)\overline{Ao}$ (3) $\overline{Ao}.K1.O2$ . . . $(Sp+Ir+Aw+Lw)\overline{Ao}(Su+Mu+Tc+Sr)$ (4) $\overline{K1}.\overline{K2}.\overline{O1}$ . . . $Fw(At+Mu+Tc+Ex)$ (5) $K1.\overline{K2}.\overline{O3}.\overline{Ro}.\overline{K3}$ . . . $Lw(Ex+Dv+Ad+At)\overline{Ro}$ (6) $K1.\overline{K2}.K3.\overline{O2}.\overline{S1}$ . . . $Aw(Ex+\underline{Dv}+Ad+At)\overline{S1}$ (7) $K1.\overline{K2}.K3.\overline{O2}.P24$ . . . $Aw(Ex+\underline{Dv}+Ad+At)P24$ Therefore:

$\overline{a_1}=\overline{Ao}[K2+\overline{K1}.O1+K1.O2]+\overline{K2}\{K1.\overline{O2}[\overline{Ro}.\overline{K3}+K3(\overline{S1}+P24)]+\overline{K1}.\overline{O1}\}$ (P) D-register flip-flop (D$i$):

$d_1$ (1) $\overline{K1}.\overline{K2}.Kc.O3.Moy$ . . . $Fw(Ad+Su+At+Mu)Kc.Moy$ (2) $\overline{K1}.\overline{K2}.\overline{O3}.\overline{O2}.Moy$ . . . $Fw(Ad+At)Moy$ (3) $\overline{K1}.\overline{K2}.\overline{O1}.O3.Ao.Moy$ . . . $Fw(Tc+Ex)Ao.Moy$ (4) $K1.\overline{K2}.\overline{O3}.\overline{Kc}.Do.P0$ . . . $\overline{Kc}.Do.\overline{P0}(Lw+Aw)(Ad+Su+At+Mu)$ (5) $K1.\overline{K2}.K3.\overline{O2}.S2$ . . . $Aw(Ad+At+Ex+Dv)S2$ (6) $K1.\overline{K2}.\overline{K3}.\overline{O2}.Ro$ . . . $Lw(Ad+At+Ex+Dv)Ro$ (7) $K1.\overline{K2}.K3.Ao.O2.O3.S3$ . . . $Aw(Tc+Sr)Ao.S3$ Therefore:

$d_1=\overline{K2}\{\overline{K1}.Moy[\overline{O3}(\overline{O2}+Kc)+Ao.\overline{O1}.O3]+K1(\overline{O2}[S2.K3+Ro.\overline{K3}]+Do.\overline{Kc}.\overline{O3}.\overline{P0}+Ao.K3.O2.O3.S3)\}$ $\overline{d_1}$ (1) $K2$ . . . $(W_A+W_B+Sr+Ir)$ (2) $\overline{K1}.\overline{Moy}$ . . . $(W_A+W_B+Fw)\overline{Moy}(Ad+Su+At+Mu+Tc+Ex+Dv+Sr)$ (3) $\overline{Ao}.O3.K1$ . . . $(W_A+W_B+Fw)\overline{Ao}(Tc+Ex+Dv+Sr)$ (4) $\overline{Do}.\overline{P0}.\overline{O3}.K1$ . . . $(Lw+Aw+Ir+Sp)\overline{Do}.\overline{P0}(Ad+Su+At+Mu)$ (5) $Kc.\overline{O3}.K1$ . . . $(Sp+Ir+Aw+Lw)Kc(Ad+Su+At+Mu)$ (6) $\overline{S2}.K1.K3.\overline{O2}$ . . . $(Aw+Sp)\overline{S2}(Ex+\underline{Dv}+Ad+At)$ (7) $K1.\overline{K3}.\overline{O2}(P0+P24+\overline{Ro})$ . . . $(Ir+Lw)(Ex+Dv+Ad+At)(P0+P24.\overline{Ro})$ (8) $\overline{Ao}.O2.O3$ . . . $\overline{Ao}(Tc+Sr)$ Therefore:

$$\overline{d_{i}}=K2+\overline{K1}(\overline{Moy}+\overline{Ao}.O3)+K1\{\overline{O3}[\overline{Do}.\overline{P0}+Kc]+\overline{O2}[K3.\overline{S2}+\overline{K3}(P0+P24.\overline{Ro})]\}\overline{Ao}.O2.O3$$

(Q) Carry flip-flop (C*a*):

$c_a$:

(1) $\overline{Kc}.Ai.Di.\overline{P24}$ . . . $\overline{Kc}.Ai.Di.\overline{P24}$ (2) $\overline{K2}.\overline{K1}.O1.\overline{O2}.O3.P24.P0.Moy$ . . . $(Fw)(Dv)Moy.\overline{P24}.P0$ (3) $K1.Kc.\overline{Ai}.Di.\overline{P24}$ . . . $(Sp+Ir+Aw+Lw)Kc.\overline{Ai}.Di.\overline{P24}$ (4) $\overline{O1}.Kc.\overline{Ai}.Di.\overline{P24}$ . . . $(At+Mu+Tc+Ex)Kc.\overline{Ai}.Di.\overline{P24}$ (5) $\overline{K1}.\overline{K2}.Kc.O1.Ai.\overline{Di}.\overline{P24}$ . . . $(Fw)(Ad+Su+Dv+Sr)Kc.Ai.Di.\overline{P24}$ Therefore:

$$c_a=\overline{P24}\{\overline{K1}.\overline{K2}.O1(\overline{O2}.O3.Moy.P0+Kc.Ai.\overline{Di})+Kc.\overline{Ai}.Di(K1+\overline{O1})+\overline{Kc}.Ai.Di\}$$

$\overline{c_a}$ (1) $\overline{Kc}.\overline{Ai}.\overline{Di}$ (2) $K1.Kc.Ai.Di$ . . . $(Sr+Ir+Aw+Lw)Kc.Ai.\overline{Di}$ (3) $\overline{O1}.Kc.Ai.Di$ . . . $(At+\underline{Mu}+Tc+Ex)Kc.Ai.\overline{Di}$ (4) $\overline{K1}.\overline{K2}.Kc.O1.\overline{Ai}.Di$ . . . $Fw(Ad+\underline{Su}+Dv+Sr)Kc.\overline{Ai}.Di$ (5) $P24$ Therefore:

$$\overline{c_a}=P24+\overline{K1}.\overline{K2}.O1.Kc.\overline{Ai}.Di+Kc.Ai.\overline{Di}.(K1+\overline{O1})+\overline{Kc}.\overline{Ai}.\overline{Di}$$

(R) Time standard flip-flop (T*s*):

$t_s=\Psi s$ (no clock)

$\overline{t_s}=Cn.P24.W3.W2.\overline{W1}$ (S) Output comparator flip-flop (C*c*):

$$c_c=W1.W2.W3(Mox.\overline{Mn}+\overline{Mox}.Mn)$$

$\overline{c_c}$ (1) $\overline{W2}.\overline{W1}.W3.P24$ (2) $\overline{W2}.\overline{W1}.Cn.P24$ Therefore:

$$\overline{c_c}=\overline{W2}.\overline{W1}.[W3+Cn]P24$$

(T) Output carry flip-flop (C*n*) (*Mox—Mn*):

$c_n$ (1) $W3.W2.S1.\overline{Mox}.Mn.\overline{P0}$ (2) $W3.W2.W1.P0(Mox.Mn+\overline{Mox}.Mn)$ (3) $W3.\overline{W2}.W1.Ts.P0.R2$ $\overline{c_n}$:

(1) $W3.\overline{W2}.P24$ (2) $\overline{W1}.W2.W3.\overline{Mox}$ (3) $W1.W2.W3.Mox.\overline{Mn}.\overline{P0}$ (4) $W1.W2.W3.P0(\overline{Mox}.Mn+Mox.\overline{Mn})$ (5) $W3.W2.\overline{W1}.P0$ (U) Accumulator register (A):

$a_o$:

(1) $(Ai.\overline{Ca}+\overline{Ai}.Ca)Di.G$ . . . $Fa.\overline{Di}.G$ (2) $(Ai.Ca+\overline{Ai}.Ca)Di.G$ . . . $\overline{Fa}.Di.G$ Therefore:

$$a_o=G(Fa.\overline{Di}+Fa.Di)$$

$\overline{a_o}$ (1) $\overline{G}$ (2) $(Ai.\overline{Ca}+\overline{Ai}.Ca)Di$ . . . $Fa.Di$ (3) $(Ai.Ca+\overline{Ai}.\overline{Ca})\overline{Di}$ . . . $Fa.\overline{Di}$ Therefore:

$$\overline{a_o}=\{\overline{G}+Fa.Di+\overline{Fa}.\overline{Di}\}$$

(V) Register (D):

$d_o$ (1) $K1.S2.O3.\overline{K2}$ . . . $(Aw+Lw)(Tc+Ex+Dv+Sr)S2$ (2) $K1.S2.P0.\overline{K2}$ . . . $(Aw+Lw)S2.P0$ (3) $K1.\overline{O3}.Do.\overline{P0}.\overline{K2}$ . . . $(Aw+Lw)(Ad+Su+At+Mu)Do.\overline{P0}$ (4) $\overline{K1}.Moy$ . . . $(W_A+W_B+Fw)Moy$ (5) $Ef.Io$ Therefore:

$$d_o=\overline{K2}.K1[S2(03+P0)+\overline{O3}.Do.\overline{P0}]+\overline{K1}.Moy+Ef.Io$$

$\overline{d_o}$:

(1) $K1.O3.\overline{S2}.\overline{K2}$ . . . $(Aw+Lw)(Tc+Ex+Dv+Sr)\overline{S2}$ (2) $K1.\overline{S2}.P0.\overline{K2}$ . . . $(Aw+Lw)\overline{S2}.P0$ (3) $K1.\overline{O3}.\overline{Do}.\overline{P0}.\overline{K2}$ . . . $(Aw+Lw)(Ad+Su+At+Mu)\overline{Do}.\overline{P0}$ (4) $\overline{K1}.\overline{Moy}$ . . . $(W_A+W_B+Fw)\overline{Moy}$ (5) $Ef.Io$ Therefore:

$$\overline{d_o}=\overline{K2}.K1[\overline{S2}(O3+P0)+\overline{O3}.\overline{Do}.\overline{P0}]+\overline{K1}.\overline{Moy}+Ef.\overline{Io}$$

(W) Register (R):

$r_o$:

(1) $K1.\overline{K2}.S3.\overline{P24}$ . . . $(Aw+Lw)S3.\overline{P24}$ (2) $K1.O3(S3+\overline{S4}.Ro)\overline{K2}$ . . . $(Aw+Lw)(Tc+Ex+Dv+Sr)(S3+\overline{S4}.Ro)$ (3) $\overline{K1}.K3.\overline{O3}$ . . . $(W_B+Fw)K3(Ad+Su+At+Mu)$ Therefore:

$$r_o=\overline{K2}.K1\{S3.\overline{P24}+O3(S3+\overline{S4}.Ro)\}+\overline{K1}.\overline{O3}.K3$$

$\overline{r_o}$ (1) $K1.\overline{O3}.P24.\overline{K2}$ . . . $(Aw+Lw)(Ad+Su+At+Mu)P24$ (2) $K1.\overline{O3}.\overline{S3}.\overline{K2}$ . . . $(Aw+Lw)(Ad+Su+At+Mu)\overline{S3}$ (3) $\overline{S3}.O3(S4+\overline{Ro})\overline{K2}$ . . . $(Fw+Aw+Lw)(Tc+Ex+Dv+Sr)\overline{S3}(S4+\overline{Ro})$ (4) $\overline{K1}.\overline{K2}.\overline{K3}$ . . . $(Fw)\overline{K3}$ Therefore:

$$\overline{r_o}=[K1.\overline{O3}(P24+\overline{S3})+\overline{K1}.\overline{K3}+O3.\overline{S3}(S4+\overline{Ro})]\overline{K2}$$

(X) Register (I):

$i_o$ (1) $K1.\overline{K3}.Moy$ . . . $(Ir+Lw)Moy$ (2) $L(\overline{K1}+K3)Io.\overline{R3}$ . . . $(\overline{Ir+Lw})Io$ (3) $\overline{L}.E$ (4) $R3$ Therefore:

$$i_o=K1.\overline{K3}.Moy+\{L(\overline{K1}+K3)Io+\overline{L}.E\}\overline{Ef}+R3$$

$\overline{i_o}$ (1) $K1.K3.\overline{Moy}$ . . . $(Ir+Lw)\overline{Moy}$ (2) $L(\overline{K1}+K3.\overline{R3})\overline{Io}$ . . . $(\overline{Ir+Lw})L.\overline{Io}.\overline{R3}$ (3) $\overline{L}.\overline{E}$.

Therefore:

$$\overline{i_o}=\{\overline{L}.\overline{E}.+K1.\overline{K3}.\overline{Moy}+L(\overline{K1}+K3.\overline{R3})\overline{Io}\}\overline{Ef}$$

(Y) Memory write amplifier (M*ov*):

$m_{ov}$ (1) $\overline{K2}.O2.O3.Ao.\overline{S4}.S1$ . . . $(Fw+Lw+Aw)(Sr+Tc)Ao.\overline{S4}.S1$ (2) $W1.W2.\overline{W3}.Mov$ Therefore:

$$m_{ov}=\overline{K2}.O2.O3.Ao.\overline{S4}.S1+W1.\overline{W2}.W3.Mn$$

$\overline{m_{ov}}$ (1) $\overline{K2}.O2.O3.\overline{Ao}.\overline{S4}.S1$ $\ldots (Fw+Lw+Aw)(Sr+Tc)\overline{Ao}.\overline{S4}.S1$ (2) $W1.W2.\overline{W3}.\overline{Mn}$ Therefore:

$$\overline{m_{ov}}=\overline{K2}.O2.O3.\overline{Ao}.\overline{S4}.S1+W1.W2.\overline{W3}.\overline{Mn}$$

(Z) Memory write amplifier (M$oz$):

$m_{oz}$ (1) $\overline{K2}.O2.O3.Ao.\overline{S4}.S3$ $\ldots (Fw+Lw+Aw)(Sr+Tc)Ao.\overline{S4}.S3$ (2) $Mn.W1.W2.W3$ (3) $Mn.W1.W2.\overline{W3}.\overline{W4}.\overline{W5}.\overline{W6}$ Therefore:

$$m_{oz}=\overline{K2}.O2.O3.Ao.\overline{S4}.S3+Mn.W1.W2.W3+Mn.W1.W2.\overline{W3}.\overline{W4}.\overline{W5}.\overline{W6}$$

$\overline{m_{oz}}$ (1) $K2.O2.O3.\overline{Ao}.\overline{S4}.S3$ (2) $\overline{Mn}.W1.W2.W3$ Therefore:

$$\overline{m_{cz}}=\overline{K2}.O2.O3.\overline{Ao}.\overline{S4}.S3+\overline{Mn}.W1.W2.W3$$

(A$a$) Memory write amplifier (M$ox$):

$m_{ox}$ (1) $\overline{K2}.Ao.\overline{S4}.S2.O2.O3 \ldots (Fw+Aw+Lw)(Sr+Tc)Ao.\overline{S4}.S2$ (2) $\overline{W1}.W2.S3(Cn.\overline{Mox}+\overline{Cn}.Mox)\overline{Ef}$ (3) $Ef.G$ Therefore:

$$m_{ox}=\overline{K2}.Ao.\overline{S4}.S2.O2.O3+Ef.\overline{G}+\{W2.\overline{W1}.W3(Cn.\overline{Mox}+\overline{Cn}.Mox)\}\overline{Ef}$$

$m_{ox}$ (1) $\overline{K2}.\overline{Ao}.\overline{S4}.S2.O2.O3 \ldots (Fw+Lw+Aw)(Sr+Tc)\overline{Ao}.\overline{S4}.S2$ (2) $\overline{W1}.W2.W3(Cn.Mox+\overline{Cn}.Mox)\overline{Ef}$ (3) $Ef.Md$ Therefore:

$$m_{ox}=\overline{K2}.O2.O3.\overline{Ao}.\overline{S4}.S2+\overline{W1}.W2.S3.\overline{Ef}(Cn.Mox+\overline{Cn}.\overline{Mox})+Md.Ef$$

(A$b$) Input-output scan flip-flop (M$n$):

$$m_n=B15^*.P16+B14^*.P15+\ldots B0^*.P1$$

$$m_n=P0+B14.P15+\ldots B0.P1$$

(A$c$) Modified store states:

$S4.S3.S2.S1$, $S4.S3.S2.\overline{S1}$, $S4.S3.\overline{S2}.S1$ — Left shift during (A$w$)

$S4.S3.\overline{S1}.\overline{S2}$—Left shift one bit during (A$w$) then stop (S$p$)

$S4.\overline{S3}.\overline{S1}.\overline{S2}$—Stop (S$r$)

$S4.\overline{S3}.S1.\overline{S2}$, $S4.\overline{S3}.\overline{S1}.S2$, $S4.\overline{S3}.S1.S2$ — Set and re-set relays (A$d$) Normal store (S$r$):

$\overline{S4}.S1$—Store on ($Mov$)

$\overline{S4}.S2$—Store on (M$ox$)

$\overline{S4}.S3$—Store on (M$oz$)

We claim:

1. A memory system for use in a digital computer, and the like, including: memory means including at least one information channel having a plurality of sectors therein with each sector including a number of digit positions, and said memory means further including a sector-identifying channel having a plurality of multi-digit words recorded therein for identifying the sectors in said information channel and with all of said words including a like binary digit at only one digit position in each word, a counter network actuable to a pluralty of different configurations for identifying the digit positions in each sector of said information channel, gate means included in said counter network for preventing the counter network from reacting to a particular configuration until the receipt of a particular binary signal corresponding to the like binary digits of said multi-digit words, means coupled to the memory means for sensing the words recorded in said sector-identifying channel and for producing binary signals in response thereto, and means coupled to the sensing means for introducing said binary signals to said gate means to cause the counter network to be synchronized with the memory means.

2. A memory system for use in a digital computer, and the like, including: a rotatable magnetic memory drum including at least one information channel extending around the periphery thereof and having a plurality of sectors therein with each sector including a like number of digit positions, said memory drum further including a sector-identifying channel extending around the periphery thereof spaced axially from the information channel and having a plurality of multi-digit words recorded therein for identifying the sectors in said information channel and with all said words including a like binary digit at only one digit position in each word, a counter network actuable to a pluralty of different configurations for identifying the digit positions in each sector of the information channel, gate means included in said counter network for preventing the counter from reaching a particular configuration until the receipt of a binary signal corresponding to the like binary digits of said multi-digit words, timing means coupled to the memory drum for introducing clock pulses to the counter to actuate the same from one configuration to another, means coupled to the memory drum for sensing the multi-digit words recorded in said sector-identifying channel and for producing binary signals in response thereto, and means coupled to the sensing means for introducing the binary signals therefrom to said gate means to cause the counter network to be synchronized with the memory means.

3. The combination defined in claim 2 in which said memory drum includes a clock channel having clock signals recorded therein, said clock channel extending around the periphery of the drum spaced axially from the information channel and from the sector-identifying channel, and in which said timing means includes transducer means coupled to the drum for sensing the clock signals recorded in said clock channel.

4. A memory system for use in a digital computer, and the like, including: memory means including at least one information channel having a plurality of multi-digit sectors therein, and said memory means further including a sector-identifying channel having a plurality of multi-digit words recorded therein for identifying the sectors in said information channel and with one of the words corresponding to a particular one of said sectors including a group of digits peculiar to that word only, a word counter network actuable to a plurality of different configurations corresponding to the number of sectors in said information channel, gate means included in the counter network for setting the counter to a particular configuration in response to a group of binary signals corresponding to said group of digits, means coupled to the memory means for sensing the words recorded in said sector-identifying channel and for producing binary signals in response thereto, and means coupled to the sensing means for introducing said binary signals to said gate means to cause the counter network to be synchronized with the memory means.

5. The combination defined in claim 4 and which includes a bit counter network for identifying the digit positions in each sector of said information channel, means coupled to said memory means for synchronizing said bit counter with said memory means, and means coupled to said bit counter and to said gate means for permitting said word counter network to be set to said particular configuration by said group of binary signals only when the bit counter is synchronized with said memory means.

6. A memory system for use in a digital computer, and the like, including: a rotatable magnetic memory drum including at least one information channel extending around the periphery thereof and having a plurality of multi-digit sectors therein, and said memory drum further including a sector-identifying channel extending around the periphery of the drum spaced axially from said information channel and having a plurality of multi-digit words recorded therein for identifying the sectors in said information channel and with one of the words corresponding to a particular one of the sectors of said information channels including a group of digits peculiar to that word only, a word counter network actuable to a plurality of different configurations corresponding to the number of sectors of said information channel, gate means included in the counter network for setting the counter to a particular configuration in response to a group of binary signals corresponding to said group of digits, timing means coupled to the memory drum for introducing clock pulses to the counter to actuate the same from one configuration to another, means coupled to the memory drum for sensing the multi-digit words recorded in said sector-identifying channel and for producing binary signals in response thereto, and means coupled to the sensing means for introducing said binary signals to said gate means to cause the counter network to be synchronized with the drum.

7. The combination defined in claim 6 in which said memory drum includes a clock channel having clock signals recorded thereon, said clock channel extending around the periphery of the drum spaced axially from said information channel and from said sector-identifying channel, and in which said timing means includes transducer means coupled to the drum for sensing the clock signals recorded in said clock channel.

8. A memory system for use in a digital computer, and the like, including: memory means including at least one information channel having a plurality of multi-digit sectors therein with each sector including a number of digit positions, and said memory means further including a sector-identifying channel having information recorded therein for identifying the sectors in said information channel and for further identifying the digit position in each sector, a first counter network actuable to a plurality of different configurations for identifying the digit positions in each sector of said information channel, a second counter network actuable to a plurality of different configurations for identfying the different sectors of said information channel, means coupled to the memory means for sensing the information recorded in said sector-identifying channel and for producing control signals in response thereto, and means coupled to said sensing means and to said first and second counter networks for introducing the control signals to the counter networks to cause the same to be synchronized with the memory means.

9. In combination: memory means on which signals representative of time-standard words may be recorded, means coupled to the memory means for writing signals representative of the time-standard words in said memory means, means coupled to the memory means for reading the signals representative of the time-standard words from the memory means a predetermined interval after the writing of the signals representative of corresponding ones of said words by the writing means, logical circulating circuitry intercoupling the reading means to the writing means for causing the signals representative of each time-standard word read by the reading means to be circulated and re-recorded in the memory means by said writing means, and a timing source coupled to the logical circulating circuitry for causing the signals representing the circulated time-standard word to be changed by a predetermined increment in synchronism with the timing source.

10. In combination: memory means on which signals representative of multi-digit time-standard words may be recorded, means coupled to the memory means for writing signals representative of the multi-digit time-standard words on said memory means, means coupled to the memory means for reading the signals representative of the time-standard words from the memory means a predetermined interval after the writing of the signals representative of corresponding ones of said words by the writing means, logical circulating circuitry inter-coupling the reading means to the writing means for causing the signals representative of each time-standard multi-digital word read by the reading means to be circulating and rerecorded in the memory means by said writing means, and a pulse-generating source coupled to the logical circulating circuitry for causing the signals representing the circulated multi-digit time-standard word to be increased by a predetermined increment for each pulse generated by the source.

11. In combination: a rotatable magnetic memory drum on which signals representative of a multi-digit time-standard word may be recorded in each of a plurality of equi-spaced sectors of the drum, means magnetically coupled to the memory drum for writing signals representative of the multi-digit time-standard words in said sectors of the magnetic memory drum, means magnetically coupled to the memory drum for reading the signals representatives of the multi-digit time-standard words from said sectors of the memory drum a predetermined interval after the writing of signals representative of corresponding ones of said words by said writing means, logical circulating circuitry intercoupling the reading means to the writing means for causing the signals representative of each time-standard multi-digit word read by the reading means to be circulated and re-recorded by said writing means, and a pulse-generating source coupled to the logical circulating circuitry for generating pulses so as to cause the signals circulated by said circuitry and representing the multi-digit time-standard words to be increased by a unity digit for each pulse generated by the source.

12. The combination defined in claim 11 and in which the pulses from said pulse-generating source have a predetermined precisely controlled repetition frequency, and which includes means for rotatably driving the magnetic memory drum at a predetermined rotational speed so that the rate at which the signals recorded in successive sectors on said drum are read by said reading means is greater than said predetermined repetition frequency of the pulses.

13. In a computer, and the like, the combination of: a rotatable magnetic memory drum including at least one channel having a plurality of equi-spaced sectors therein in which signals representative of multi-digital time-standard words may be recorded, means magnetically coupled to the memory means for writing signals representative of the multi-digit time-standard words in respective ones of the equi-spaced sectors, means magnetically coupled to the memory means for reading the signals representative of them ulti-digit time-standard words from respective ones of the spaced sectors a predetermined interval after the writing of signals representative of corresponding ones of said words by the writing means, logical circulating circuitry inter-coupling the reading means to the writing means for causing signals representative of a time-standard word recorded in a particular one of said sectors of the memory drum to be circulated and re-recorded in another one of the sectors thereof, and a precision frequency pulse-generating source included in the logical circulating circuitry for causing a predetermined increment to be added to the circulated time-standard word for each pulse generated by the source.

14. In a computer, and the like, the combination of: a rotatable magnetic memory drum including at least one channel having a plurality of equi-spaced sectors therein in which signals representative of multi-digit time-standard words may be recorded, means magnetically coupled to the memory means for writing signals representative of the multi-digit time-standard words in respective ones of the equi-spaced sectors, means magnetically coupled to the memory means for reading the signals representative of the multi-digit time-standard words from respective ones of the spaced sectors a predetermined interval after the writing of signals representative of corresponding ones of said words by the writing means, logical circulating circuitry inter-coupling the reading means to the writing means for causing signals representative of a time-standard word recorded in a particular one of the sectors of said memory drum to be circulated through the circuitry and re-recorded in another one of the sectors thereof, and a pulse-generating source coupled to the logical circulating circuitry for generating precisely timed pulses of a predetermined repetition frequency to cause the signals circulated by said circuitry and representing the multi-digit time standard words to be increased by a unity digit for each pulse generated by the source, and means for rotatably driving the magnetic memory drum at a predetermined rotational speed such that the rate at which the signals recorded in successive sectors of said drum are read by said reading means is greater than said predetermined repetition frequency of said pulses.

References Cited in the file of this patent

UNITED STATES PATENTS 2,770,797 Hamilton et al. ---------- Nov. 13, 1956
2,916,210 Selmer ---------------- Dec. 8, 1959